United States Patent
Ishibashi et al.

(10) Patent No.: US 7,099,846 B1
(45) Date of Patent: Aug. 29, 2006

(54) APPARATUS AND SYSTEM FOR PROVIDING FEE-BASED CONTENT

(75) Inventors: Yoshihito Ishibashi, Tokyo (JP); Shinako Matsuyama, Tokyo (JP); Tateo Oishi, Saitama (JP); Akihiro Muto, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/719,056

(22) PCT Filed: Apr. 7, 2000

(86) PCT No.: PCT/JP00/02288

§ 371 (c)(1), (2), (4) Date: Feb. 12, 2001

(87) PCT Pub. No.: WO00/62215

PCT Pub. Date: Oct. 19, 2000

(30) Foreign Application Priority Data

Apr. 9, 1999 (JP) ................................ 11-103338

(51) Int. Cl.
H04L 9/00 (2006.01)

(52) U.S. Cl. ......................................... 705/51; 705/52

(58) Field of Classification Search .................. 705/51, 705/52, 76, 50, 57; 380/30, 31; 194/217
See application file for complete search history.

(56) References Cited

U.S. PATENT DOCUMENTS

| | | | |
|---|---|---|---|
| 4,498,570 A * | 2/1985 | King et al. ................. 194/217 |
| 5,673,316 A * | 9/1997 | Auerbach et al. ............. 705/51 |
| 5,761,648 A | 6/1998 | Golden et al. |
| 5,867,579 A | 2/1999 | Saito ........................... 705/57 |
| 5,892,900 A * | 4/1999 | Ginter et al. ................ 713/200 |
| 6,002,771 A | 12/1999 | Nielsen |
| 6,226,618 B1 * | 5/2001 | Downs et al. .................. 705/1 |
| 6,320,829 B1 * | 11/2001 | Matsumoto et al. ...... 369/47.12 |
| 6,438,235 B1 * | 8/2002 | Sims, III ..................... 380/285 |
| 6,463,151 B1 * | 10/2002 | Iitsuka et al. ............... 380/201 |
| 6,611,812 B1 * | 8/2003 | Hurtado et al. ............... 705/26 |
| 6,728,379 B1 * | 4/2004 | Ishibashi et al. ............ 380/278 |

FOREIGN PATENT DOCUMENTS

| | | |
|---|---|---|
| JP | 10-55383 | 2/1998 |
| JP | 10-512074 | 11/1998 |
| WO | WO 96/27155 | 9/1996 |

* cited by examiner

Primary Examiner—Salvatore Cangialosi
(74) Attorney, Agent, or Firm—Finnegan, Henderson, Farabow, Garrett & Dunner, L.L.P.

(57) ABSTRACT

A user who repeatedly purchases the same electronic content is entitled to receive a discount price for the additional purchases. This is accomplished by establishing an "Accounting History" of accounting information that is prepared when the electronic content is repurchased. The price of the repurchased electronic content is set to "Discount Price," which is less than the original price at which the electronic content was purchased for the first time. Since accounts are settled based on the accounting information with "Accounting History" set to "Discount Price," the user who is purchasing the same content again can buy it at a discount price.

21 Claims, 51 Drawing Sheets

| | | | | |
|---|---|---|---|---|
| SAM ID | ID OF SAM62 | ID OF SAM212 | ID OF SAM311 |
| EQUIPMENT NUMBER | EQUIPMENT NUMBER (100) OF RECEIVERS 51 | EQUIPMENT NUMBER (100) OF RECEIVERS 201 | EQUIPMENT NUMBER (25) OF RECEIVERS 301 |
| SETTLEMENT ID | SETTLEMENT NUMBER | SETTLEMENT NUMBER | SETTLEMENT NUMBER |
| ACCOUNT-SETTLING USER INFORMATION | NAME | NAME OF USER F | NAME OF USER F | NAME OF USER F |
| | ADDRESS | ADDRESS OF USER F | ADDRESS OF USER F | ADDRESS OF USER F |
| | PHONE NUMBER | PHONE NUMBER OF USER F | PHONE NUMBER OF USER F | PHONE NUMBER OF USER F |
| | SETTLEMENT INSTITUTION INFORMATION | SETTLEMENT INSTITUTION INFORMATION OF USER F | SETTLEMENT INSTITUTION INFORMATION OF USER F | SETTLEMENT INSTITUTION INFORMATION OF USER F |
| | DATE OF BIRTH | DATE OF BIRTH OF USER F | DATE OF BIRTH OF USER F | DATE OF BIRTH OF USER F |
| | AGE | AGE OF USER F | AGE OF USER F | AGE OF USER F |
| | SEX | SEX OF USER F | SEX OF USER F | SEX OF USER F |
| | USER ID | USER ID OF USER F | USER ID OF USER F | USER ID OF USER F |
| | PASSWORD | PASSWORD OF USER F | PASSWORD OF USER F | PASSWORD OF USER F |
| SUBORDINATE USER INFORMATION | NAME | | NAME OF USER A | NAME OF USER A |
| | ADDRESS | | ADDRESS OF USER A | ADDRESS OF USER A |
| | PHONE NUMBER | | PHONE NUMBER OF USER A | PHONE NUMBER OF USER A |
| | DATE OF BIRTH | | DATE OF BIRTH OF USER A | DATE OF BIRTH OF USER A |
| | SEX | | SEX OF USER A | SEX OF USER A |
| | USER ID | | USER ID OF USER A | USER ID OF USER A |
| | PASSWORD | | PASSWORD OF USER A | PASSWORD OF USER A |

⋮

| | | | |
|---|---|---|---|
| USE POINT INFORMATION | USE POINT INFORMATION OF RECEIVERS 51 | USE POINT INFORMATION OF RECEIVERS 201 | USE POINT INFORMATION OF RECEIVER 301 |

SYSTEM REGISTRATION INFORMATION

FIG. 8

| | | |
|---|---|---|
| CONTENT ID | ID OF CONTENT A | |
| CONTENT PROVIDER ID | ID OF CONTENT PROVIDER 2 | |
| UCP ID | ID OF ucPA | |
| UCP VALIDITY PERIOD | VALIDITY PERIOD OF ucPA | |
| USAGE CONDITIONS 10 | USER CONDITIONS 10 | 200 POINTS OR HIGHER |
| | EQUIPMENT CONDITIONS 10 | NO CONDITION |
| USAGE CONDITIONS 11 | ID 11 | ID OF USAGE DETAILS 11 |
| | TYPE 11 | PURCHASE AND REPRODUCE |
| | PARAMETER 11 | x x x x |
| | CONTROL TRANSFER PERMISSION INFORMATION | PERMITTED |
| USAGE DETAILS 12 | ID 12 | ID OF USAGE DETAILS 12 |
| | TYPE 12 | FIRST-GENERATION DUPLICATE |
| | PARAMETER 12 | x x x x |
| | CONTROL TRANSFER PERMISSION INFORMATION | PERMITTED |
| USAGE DETAILS 13 | ID 13 | ID OF USAGE DETAILS 13 |
| | TYPE 13 | LIMITED-TIME REPRODUCTION |
| | PARAMETER 13 | x x x x |
| | CONTROL TRANSFER PERMISSION INFORMATION | PERMITTED |
| USAGE DETAILS 14 | ID 14 | ID OF USAGE DETAILS 14 |
| | TYPE 14 | Pay Per Copy N |
| | PARAMETER 14 | N TIMES |
| | CONTROL TRANSFER PERMISSION INFORMATION | NOT PERMITTED |
| USAGE DETAILS 15 | ID 15 | ID OF USAGE DETAILS 15 |
| | TYPE 15 | TYPE 13→TYPE 11 |
| | PARAMETER | x x x |
| | CONTROL TRANSFER PERMISSION INFORMATION | PERMITTED |
| USAGE DETAILS 16 | ID 16 | ID OF USAGE DETAILS 16 |
| | TYPE 16 | TYPE 11→TYPE 11 |
| | PARAMETER | x x x |
| | CONTROL TRANSFER PERMISSION INFORMATION | PERMITTED | ucPA

| CONTENT ID | | ID OF CONTENT A | |
|---|---|---|---|
| CONTENT PROVIDER ID | | ID OF CONTENT PROVIDER 2 | |
| UCP ID | | ID OF UCP A | |
| SERVICE PROVIDER ID | | ID OF SERVICE PROVIDER 3 | |
| PT ID | | ID OF PTA-1 | |
| PT VALIDITY PERIOD | | VALIDITY PERIOD OF PTA-1 | |
| PRICING CONDITIONS 10 | | USER CONDITIONS 10 | MALE |
| | | EQUIPMENT CONDITIONS 10 | NO CONDITIONS |
| PRICE 11 | | 2000YEN | |
| PRICE 12 | | 600YEN | |
| PRICE 13 | | 100YEN | |
| PRICE 14 | | 300YEN | |
| PRICE 15 | | 1950YEN | |
| PRICE 16 | | 1000YEN | |

(B)

| CONTENT ID | | ID OF CONTENT A | |
|---|---|---|---|
| CONTENT PROVIDER ID | | ID OF CONTENT PROVIDER 2 | |
| UCP ID | | ID OF UCP A | |
| SERVICE PROVIDER ID | | ID OF SERVICE PROVIDER 3 | |
| PT ID | | ID OF PTA-2 | |
| PT VALIDITY PERIOD | | VALIDITY PERIOD OF PTA-2 | |
| PRICING CONDITIONS 20 | | USER CONDITIONS 20 | FEMALE |
| | | EQUIPMENT CONDITIONS 20 | NO CONDITIONS |
| PRICE 21 | | 1000YEN | |
| PRICE 22 | | 300YEN | |
| PRICE 23 | | 50YEN | |
| PRICE 24 | | 150YEN | |
| PRICE 25 | | 1980YEN | |
| PRICE 26 | | 500YEN | |

FIG. 16

| CONTENT ID | ID OF CONTENT A |
|---|---|
| CONTENT PROVIDER ID | ID OF CONTENT PROVIDER 2 |
| UCP ID | ID OF ucpA |
| UCP VALIDITY PERIOD | VALIDITY PERIOD OF ucpA |
| SERVICE PROVIDER ID | ID OF SERVICE PROVIDER 3 |
| PT ID | ID OF ptA-1 |
| PT VALIDITY PERIOD | VALIDITY PERIOD OF ptA-1 |
| UCS ID | ID OF ucsA |
| SAM ID | ID OF SAM62 |
| USER ID | ID OF USER F |
| USAGE DETAILS | ID | ID OF USAGE DETAILS 13 |
| | TYPE | LIMITED-TIME REPRODUCTION |
| | PARAMETER | × × × |
| | CONTROL TRANSFER STATUS | SOURCE: ID OF SAM62, DESTINATION: ID OF SAM62 |
| USAGE STATUS | | × × × | ucsA

FIG. 21

| CONTENT ID | ID OF CONTENT A |
|---|---|
| CONTENT PROVIDER ID | ID OF CONTENT PROVIDER 2 |
| UCP ID | ID OF ucpA |
| UCP VALIDITY PERIOD | VALIDITY PERIOD OF ucpA |
| SERVICE PROVIDER ID | ID OF SERVICE PROVIDER 3 |
| PT ID | ID OF ptA-1 |
| PT VALIDITY PERIOD | VALIDITY PERIOD OF ptA-1 |
| UCS ID | ID OF ucsA |
| SAM ID | ID OF SAM62 |
| USER ID | ID OF USER F |
| USAGE DETAILS | ID | ID OF USAGE DETAILS 13 |
| | TYPE | LIMITED-TIME REPRODUCTION |
| | PARAMETER | × × × |
| | CONTROL TRANSFER STATUS | SOURCE: ID OF SAM62, DESTINATION: ID OF SAM62 |

ACCOUNTING INFORMATION A

FIG. 23

| | | |
|---|---|---|
| | SAM ID | ID OF SAM62 |
| | EQUIPMENT NUMBER | EQUIPMENT NUMBER (1000) OF RECEIVERS 51 |
| | SETTLEMENT ID | SETTLEMENT ID OF USER F |
| | CHARGE LIMIT | FORMAL REGISTRATION |
| ACCOUNT-SETTLING USER INFORMATION | NAME | NAME OF USER F |
| | ADDRESS | ADDRESS OF USER F |
| | PHONE NUMBER | PHONE NUMBER OF USER F |
| | SETTLEMENT INSTITUTION INFORMATION | SETTLEMENT INSTITUTION INFORMATION OF USER F |
| | DATA OF BIRTH | DATE OF BIRTH OF USER F |
| | AGE | AGE OF USER F |
| | SEX | SEX OF USER F |
| | USER ID | USER ID OF USER F |
| | PASSWORD | PASSWORD OF USER F |
| SUBORDINATE USER INFORMATION | NAME | |
| | ADDRESS | |
| | PHONE NUMBER | |
| | DATA OF BIRTH | |
| | SEX | |
| | USER ID | |
| | PASSWORD | |

⋮

| | |
|---|---|
| USE POINT INFORMATION | USE POINT INFORMATION OF RECEIVERS 51 |

REFERENCE INFORMATION 51

FIG. 25

| | | LIST SECTION | | | | | |
|---|---|---|---|---|---|---|---|
| SAM ID | USER ID | PURCHA-SING | ACCOUN-TING | EQUIPMENT BILLED | MASTER EQUIPMENT | STATUS FLAG | SIGNATURE TO CONDITIONS | SIGNATURE TO REGISTRATION LIST |
| REGISTRATION CONDITIONS OF RECEIVER 51 — ID OF SAM62 | USER ID OF USER F | YES | YES | ID OF SAM62 | NONE | NO RESTRI-CTION | x x x x | x x x x |
| REGISTRATION CONDITIONS OF RECEIVER 201 — ID OF SAM212 | USER ID OF USER F | YES | YES | ID OF SAM212 | ID OF SAM62 | NO RESTRI-CTION | x x x x | |
| REGISTRATION CONDITIONS OF RECEIVER 301 — ID OF SAM312 | USER ID OF USER F | NO | NO | NONE | ID OF SAM62 | NO RESTRI-CTION | x x x x | |

SAM ID: ID OF SAM62
VALIDITY PERIOD          x x x x
VERSION NUMBER           x x x x
NUMBER OF EQUIPMENT CONNECTED   3

} SAM INFORMATION SECTION

FIG. 26

| | | |
|---|---|---|
| | SAM ID | ID OF SAM212 |
| | EQUIPMENT NUMBER | EQUIPMENT NUMBER (100) OF RECEIVERS 201 |
| | SETTLEMENT ID | SETTLEMENT ID OF USER F |
| | CHARGE LIMIT | FORMAL REGISTRATION |
| ACCOUNT-SETTLING USER INFORMATION | NAME | NAME OF USER F |
| | ADDRESS | ADDRESS OF USER F |
| | PHONE NUMBER | PHONE NUMBER OF USER F |
| | SETTLEMENT INSTITUTION INFORMATION | SETTLEMENT INSTITUTION INFORMATION OF USER F |
| | DATE OF BIRTH | DATA OF BIRTH OF USER F |
| | AGE | AGE OF USER F |
| | SEX | SEX OF USER F |
| | USER ID | USER ID OF USER F |
| | PASSWORD | PASSWORD OF USER F |
| SUBORDINATE USER INFORMATION | NAME | NAME OF USER A |
| | ADDRESS | ADDRESS OF USER A |
| | PHONE NUMBER | PHONE NUMBER OF USER A |
| | DATE OF BIRTH | DATA OF BIRTH OF USER A |
| | SEX | SEX OF USER A |
| | USER ID | USER ID OF USER A |
| | PASSWORD | PASSWORD OF USER A |

| | |
|---|---|
| USE POINT INFORMATION | USE POINT INFORMATION OF RECEIVERS 201 |

REFERENCE INFORMATION 201

FIG. 28

LIST SECTION

| SAM ID | USER ID | PURCH-ASING | ACCOU-NTING | EQUIPMENT | MASTER EQUIPMENT | STATUS FLAG | SIGNATURE TO CONDITIONS | SIGNATURE TO REGISTRATION LIST |
|---|---|---|---|---|---|---|---|---|
| ID OF SAM62 | USER ID OF USER F | YES | YES | ID OF SAM62 | NONE | NO RESTRICTION | x x x x | x x x x |
| ID OF SAM212 | USER ID OF USER F | YES | YES | ID OF SAM212 | ID OF SAM62 | NO RESTRICTION | x x x x | |

REGISTRATION CONDITIONS OF RECEIVER 51
REGISTRATION CONDITIONS OF RECEIVER 201

SAM INFORMATION SECTION

| ID OF SAM212 | |
|---|---|
| SAM ID | x x x x |
| VALIDITY PERIOD | x x x x |
| VERSION NUMBER | |
| NUMBER OF EQUIPMENT CONNECTED | 2 |

FIG. 29

| SAM ID | ID OF SAM311 |
|---|---|
| EQUIPMENT NUMBER | EQUIPMENT NUMBER (25) OF RECEIVERS 301 |
| SETTLEMENT ID | SETTLEMENT ID OF USER F |
| CHARGE LIMIT | FORMAL REGISTRATION |
| ACCOUNT-SETTLING USER INFORMATION — NAME | NAME OF USER F |
| ADDRESS | ADDRESS OF USER F |
| PHONE NUMBER | PHONE NUMBER OF USER F |
| SETTLEMENT INSTITUTION INFORMATION | SETTLEMENT INSTITUTION INFORMATION OF USER F |
| DATE OF BIRTH | DATA OF BIRTH OF USER F |
| AGE | AGE OF USER F |
| SEX | SEX OF USER F |
| USER ID | USER ID OF USER F |
| PASSWORD | PASSWORD OF USER F |
| SUBORDINATE USER INFORMATION — NAME | NAME OF USER A |
| ADDRESS | ADDRESS OF USER A |
| PHONE NUMBER | PHONE NUMBER OF USER A |
| DATE OF BIRTH | DATA OF BIRTH OF USER A |
| SEX | SEX OF USER A |
| USER ID | USER ID OF USER A |
| PASSWORD | PASSWORD OF USER A |

| USE POINT INFORMATION | USE POINT INFORMATION OF RECEIVERS 301 |
|---|---|

REFERENCE INFORMATION 301

FIG. 31

REGISTRATION CONDITIONS OF RECEIVER 301

| SAM ID | USER ID | PURCH- ASING | ACCOU- NTING | EQUIPMENT BILLED | MASTER EQUIPMENT | STATUS FLAG |
|---|---|---|---|---|---|---|
| ID OF SAM311 | USER ID OF USER F | NO | NO | NONE | ID OF SAM62 | NO RESTRICTION |

{ LIST SECTION }

SAM INFORMATION SECTION:
- SAM ID: ID OF SAM311
- VALIDITY PERIOD: x x x x
- VERSION NUMBER: x x x x
- NUMBER OF EQUIPMENT CONNECTED: 2

FIG. 32

| | | |
|---|---|---|
| CONTENT ID | | ID OF CONTENT A |
| CONTENT PROVIDER ID | | ID OF CONTENT PROVIDER 2 |
| UCP ID | | ID OF ucPA |
| UCP VALIDITY PERIOD | | VALIDITY PERIOD OF ucPA |
| SERVICE PROVIDER ID | | ID OF SERVICE PROVIDER 3 |
| PT ID | | ID OF PTA-1 |
| PT VALIDITY PERIOD | | VALIDITY PERIOD OF PTA-1 |
| UCS ID | | ID OF ucsA |
| SAM ID | | ID OF SAM62 |
| USER ID | | ID OF USER F |
| USAGE DETAILS | ID | ID OF USAGE DETAILS 15 |
| | TYPE | TYPE13→TYPE11 |
| | PARAMETER | ××× |
| | CONTROL TRANSFER STATUS | SOURCE: ID OF SAM62<br>DESTINATION: ID OF SAM62 |
| USAGE HISTORY | | ××× | ucsB

FIG. 44

| | | |
|---|---|---|
| CONTENT ID | | ID OF CONTENT A |
| CONTENT PROVIDER ID | | ID OF CONTENT PROVIDER 2 |
| UCP ID | | ID OF ucpA |
| UCP VALIDITY PERIOD | | VALIDITY PERIOD OF ucpA |
| SERVICE PROVIDER ID | | ID OF SERVICE PROVIDER 3 |
| PT ID | | ID OF ptA-1 |
| PT VALIDITY PERIOD | | VALIDITY PERIOD OF ptA-1 |
| UCS ID | | ID OF ucsA |
| SAM ID | | ID OF SAM62 |
| USER ID | | ID OF USER F |
| USAGE DETAILS | ID | ID OF USAGE DETAILS 15 |
| | TYPE | TYPE13→TYPE 11 |
| | PARAMETER | ××× |
| | CONTROL TRANSFER STATUS | SOURCE: ID OF SAM62<br>DESTINATION: ID OF SAM62 |

ACCOUNTING INFORMATION B

FIG. 45

| | | |
|---|---|---|
| CONTENT ID | | ID OF CONTENT A |
| CONTENT PROVIDER ID | | ID OF CONTENT PROVIDER 2 |
| UCP ID | | ID OF ucPA |
| UCP VALIDITY PERIOD | | VALIDITY PERIOD OF ucPA |
| SERVICE PROVIDER ID | | ID OF SERVICE PROVIDER 3 |
| PT ID | | ID OF PTA-1 |
| PT VALIDITY PERIOD | | VALIDITY PERIOD OF PTA-1 |
| UCS ID | | ID OF ucsA |
| SAM ID | | ID OF SAM62 |
| USER ID | | ID OF USER F |
| USAGE DETAILS | ID | ID OF USAGE DETAILS 16 |
| | TYPE | TYPE 11→TYPE 11 |
| | PARAMETER | × × × |
| | CONTROL TRANSFER STATUS | SOURCE: ID OF SAM62<br>DESTINATION: ID OF SAM62 |
| | USAGE HISTORY | × × × | ucsC

FIG. 47

| | | |
|---|---|---|
| CONTENT ID | | ID OF CONTENT A |
| CONTENT PROVIDER ID | | ID OF CONTENT PROVIDER 2 |
| UCP ID | | ID OF UCPA |
| UCP VALIDITY PERIOD | | VALIDITY PERIOD OF UCPA |
| SERVICE PROVIDER ID | | ID OF SERVICE PROVIDER 3 |
| PT ID | | ID OF PTA-1, |
| PT VALIDITY PERIOD | | VALIDITY PERIOD OF PTA-1 |
| UCS ID | | ID OF UCSA |
| SAM ID | | ID OF SAM62 |
| USER ID | | ID OF USER F |
| USAGE DETAILS | ID | ID OF USAGE DETAILS 16 |
| | TYPE | TYPE 11→TYPE 11 |
| | PARAMETER | × × × |
| | CONTROL TRANSFER STATUS | SOURCE: ID OF SAM62<br>DESTINATION: ID OF SAM62 |

ACCOUNTING INFORMATION C

FIG. 48

| CONTENT ID | ID OF CONTENT A |
|---|---|
| CONTENT PROVIDER ID | ID OF CONTENT PROVIDER 2 |
| UCP ID | ID OF ucPA |
| UCP VALIDITY PERIOD | VALIDITY PERIOD OF ucPA |
| SERVICE PROVIDER ID | ID OF SERVICE PROVIDER 3 |
| PT ID | ID OF PTA-1 |
| PT VALIDITY PERIOD | VALIDITY PERIOD OF PTA-1 |
| UCS ID | ID OF ucsA |
| SAM ID | ID OF SAM212 |
| USER ID | ID OF USER F |
| USAGE DETAILS / ID | ID OF USAGE DETAILS 16 |
| USAGE DETAILS / TYPE | TYPE 11→TYPE 11 |
| USAGE DETAILS / PARAMETER | × × × |
| USAGE DETAILS / CONTROL TRANSFER STATUS | SOURCE: ID OF SAM62<br>DESTINATION: ID OF SAM62 |
| USAGE DETAILS / USAGE HISTORY | × × × | ucsD

FIG. 50

| CONTENT ID | ID OF CONTENT A |
|---|---|
| CONTENT PROVIDER ID | ID OF CONTENT PROVIDER 2 |
| UCP ID | ID OF ucPA |
| UCP VALIDITY PERIOD | VALIDITY PERIOD OF ucPA |
| SERVICE PROVIDER ID | ID OF SERVICE PROVIDER 3 |
| PT ID | ID OF ptA-1 |
| PT VALIDITY PERIOD | VALIDITY PERIOD OF ptA-1 |
| UCS ID | ucsA① ID |
| SAM ID | ID OF SAM212 |
| USER ID | ID OF USER F |
| USAGE DETAILS | ID | ID OF USAGE DETAILS 16 |
| | TYPE | TYPE 11→TYPE 11 |
| | PARAMETER | × × × |
| | CONTROL TRANSFER STATUS | SOURCE: ID OF SAM62<br>DESTINATION: ID OF SAM62 |

ACCOUNTING INFORMATION D

FIG. 51

APPARATUS AND SYSTEM FOR PROVIDING FEE-BASED CONTENT

TECHNICAL FIELD

The present invention relates to an information processing apparatus, information processing method, and providing medium. More particularly, it relates to an information processing apparatus, information processing method, and providing medium that utilize encrypted information.

BACKGROUND ART

There are systems that encrypt information (hereafter referred to as content) such as music and send it to the information processing apparatus of the users who have made a required agreement, so that the users can decrypt and use the content on their information processing apparatus.

If a user possesses two or more information processing apparatus, he/she must buy content and pay its usage charge for each information processing apparatus. Even if content has been bought once, it must be bought again for the same charge if it is to be used on (bought for) a different information processing apparatus.

DISCLOSURE OF THE INVENTION

The present invention has been made in view of the above circumstances. It allows the user to buy the same content again at discount prices.

To solve these problems, the present invention provides an information processing apparatus which comprises first preparation means for preparing first usage control status which identifies first usage details describing purchased rights and the pricing details corresponding to the first usage details; storage means for storing the encrypted information, the first usage control status, a usage control policy that contains a second use type that describe the rights that can be purchased again based on the details of the purchased rights, price tags that contain the pricing details corresponding to the second usage details, and the key needed to decrypt the encrypted information; second preparation means for preparing second usage control status which identifies the second usage details and the pricing details corresponding to the second usage details, based on the usage control policy and price tags, when rights are purchased again through another information processing apparatuses; and sending means for sending the second usage control status prepared by the second preparation means as well as the encrypted information and the key stored on the storage means to the other information processing apparatuses.

Also, the present invention provides an information processing method which comprises a first preparation step of preparing the first usage control status which identifies the first usage details describing the purchased rights and the pricing details corresponding to the first usage details; a storage step of storing the encrypted information, the first usage control status, the usage control policy that contains the second use type that describes the rights that can be purchased again based on the details of the purchased rights, the price tags that contain the pricing details corresponding to the second usage details, and the key needed to decrypt the encrypted information; a second preparation step of preparing the second usage control status which identifies the second usage details and the pricing details corresponding to the second usage details, based on the usage control policy and price tags, when rights are purchased again through the other information processing apparatuses; and a sending step of sending the second usage control status prepared by the second preparation step as well as the encrypted information and the key stored on the storage means to the other information processing apparatuses.

Furthermore, the providing medium of the present invention provides a computer-readable program for executing the process which comprises the first preparation step of preparing the first usage control status which identifies the first usage details describing the purchased rights and the pricing details corresponding to the first usage details; the storage step of storing the encrypted information, the first usage control status, the usage control policy that contains the second use type that describes the rights that can be purchased again based on the details of the purchased rights, the price tags that contain the pricing details corresponding to the second usage details, and the key needed to decrypt the encrypted information; the second preparation step of preparing the second usage control status which identifies the second usage details and the pricing details corresponding to the second usage details, based on the usage control policy and price tags, when rights are purchased again through the other information processing apparatuses; and the sending step of sending the second usage control status prepared by the second preparation step as well as the encrypted information and the key stored on the storage means to the other information processing apparatuses.

Furthermore, the information processing apparatus, information processing method, and providing medium of the present invention prepare the first usage control status which identifies the first usage details describing the purchased rights and the pricing details corresponding to the first usage details; store the encrypted information, the first usage control status, the usage control policy that contains the second use type that describes the rights that can be purchased again based on the details of the purchased rights, the price tags that contain the pricing details corresponding to the second usage details, and the key needed to decrypt the encrypted information; prepare the second usage control status which identifies the second usage details and the pricing details corresponding to the second usage details, based on the usage control policy and price tags, when rights are purchased again through the other information processing apparatuses; and send the second usage control status prepared as well as the encrypted information and the key stored on the storage means to the other information processing apparatuses.

Furthermore, the information processing apparatus of the present invention comprises receiving means for receiving, from the other information processing apparatuses, the encrypted information, the key needed to decrypt the encrypted information, and the usage control status which identifies the usage details describing the rights as well as the pricing details corresponding to the usage details; and execution means for executing the processes needed to use the information based on the rights described by the usage details identified by the usage control status.

Furthermore, the information processing method of the present invention comprises a receiving step of receiving, from the other information processing apparatuses, the encrypted information, the key needed to decrypt the encrypted information, and the usage control status which identifies the usage details describing the rights as well as the pricing details corresponding to the usage details; and an execution step of executing the processes needed to use the information based on the rights described by the usage details identified by the usage control status.

Furthermore, the providing medium of the present invention provides a computer-readable program for executing the process which comprises the receiving step of receiving, from the other information processing apparatuses, the encrypted information, the key needed to decrypt the encrypted information, and the usage control status which identifies the usage details describing the rights as well as the pricing details corresponding to the usage details; and the execution step of executing the processes needed to use the information based on the rights described by the usage details identified by the usage control status.

Furthermore, the information processing apparatus, information processing method, and providing medium of the present invention receive, from the other information processing apparatuses, the encrypted information, the key needed to decrypt the encrypted information, and the usage control status which identifies the usage details describing the rights as well as the pricing details corresponding to the usage details; and execute the processes needed to use the information based on the rights described by the usage details identified by the usage control status.

Furthermore, the information processing apparatus of the present invention comprises storage means for storing the encrypted information, the usage control policy that contains the usage details that describe purchasable rights, the price tags that contain the pricing details corresponding to the usage details, and the key needed to decrypt the encrypted information; preparation means for preparing the usage control status which identifies the usage details and the pricing details corresponding to the usage details, based on the usage control policy and price tags stored on the storage means; and sending means for sending the usage control status prepared by the preparation means as well as the encrypted information and the key stored on the storage means to the other information processing apparatuses when the rights are purchased again by the other information processing apparatuses.

Furthermore, the information processing method of the present invention comprises a storage step of storing the encrypted information, the usage control policy that contains the usage details that describe purchasable rights, the price tags that contain the pricing details corresponding to the usage details, and the key needed to decrypt the encrypted information; a preparation step of preparing the usage control status which identifies the usage details and the pricing details corresponding to the usage details, based on the usage control policy and price tags stored by the storage step; and a sending step of sending the usage control status prepared by the preparation step as well as the encrypted information and the key stored by the storage step, to the other information processing apparatuses when the rights are purchased again by the other information processing apparatuses.

Furthermore, the providing medium of the present invention provides a computer-readable program for executing the process which comprises the storage step of storing the encrypted information, the usage control policy that contains the usage details that describe purchasable rights, the price tags that contain the pricing details corresponding to the usage details, and the key needed to decrypt the encrypted information; the preparation step of preparing the usage control status which identifies the usage details and the pricing details corresponding to the usage details, based on the usage control policy and price tags stored by the storage step; and the sending step of sending the usage control status prepared by the preparation step as well as the encrypted information and the key stored by the storage step, to the other information processing apparatuses when the rights are purchased again by the other information processing apparatuses.

Furthermore, the information processing apparatus, information processing method, and providing medium of the present invention store the encrypted information, the usage control policy that contains the usage details that describe purchasable rights, the price tags that contain the pricing details corresponding to the usage details, and the key needed to decrypt the encrypted information; prepare the usage control status which identifies the usage details and the pricing details corresponding to the usage details, based on the stored usage control policy and price tags; and send the prepared usage control status as well as the encrypted information and key stored, to the other information processing apparatuses when the rights are purchased again by the other information processing apparatuses.

Furthermore, the information processing apparatus of the present invention comprises receiving means for receiving, from the other information processing apparatuses, the encrypted information, the key needed to decrypt the encrypted information, and the usage control status which identifies the first use type describing predetermined rights and the pricing details corresponding to the first use type; storage means for storing a usage control policy that contains the second usage details that describe the rights that can be purchased again based on the rights described by the first usage details identified by the usage control status received by the receiving means, and price tags that contain the pricing details corresponding to the second usage details; and first preparation means for preparing second usage control status which identifies the second usage details and the pricing details corresponding to the second usage details, based on the usage control policy and price tags stored by the storage means.

Furthermore, the information processing method of the present invention comprises a receiving step of receiving, from the other information processing apparatuses, the encrypted information, the key needed to decrypt the encrypted information, and the usage control status which identifies the first use type describing predetermined rights and the pricing details corresponding to the first use type; a storage step of storing the usage control policy that contains the second usage details that describe the rights that can be purchased again based on the rights described by the first usage details identified by the usage control status received by the receiving step, and price tags that contain the pricing details corresponding to the second usage details; and a preparation step of preparing second usage control status which identifies the second usage details and the pricing details corresponding to the second usage details, based on the usage control policy and price tags stored by the storage step.

Furthermore, the providing medium of the present invention provides a computer-readable program for executing the process which comprises the receiving step of receiving, from the other information processing apparatuses, the encrypted information, the key needed to decrypt the encrypted information, the usage control status which identifies the first use type describing predetermined rights and the pricing details corresponding to the first use type; the storage step of storing the usage control policy that contains the second usage details that describe the rights that can be purchased again based on the rights described by the first usage details identified by the usage control status received by the receiving step, and price tags that contain the pricing details corresponding to the second usage details; and the preparation step of preparing second usage control status which identifies the second usage details and the pricing details corresponding to the second usage details, based on the usage control policy and price tags stored by the storage step.

Furthermore, the information processing apparatus, information processing method, and providing medium of the present invention receive, from the other information processing apparatuses, the encrypted information, the key needed to decrypt the encrypted information, and the usage control status which identifies the first use type describing predetermined rights and the pricing details corresponding to the first use type; store the usage control policy that contains the second usage details that describe the rights that can be purchased again based on the rights described by the first usage details identified by the usage control status received, and price tags that contain the pricing details corresponding to the second usage details; and prepares the second usage control status which identifies the second usage details and the pricing details corresponding to the second usage details, based on the usage control policy and price tags stored.

BRIEF DESCRIPTION OF DRAWINGS

FIG. 8 is a chart illustrating an example of system registration information.

FIG. 10 is a chart showing an example UCP.

FIG. 16 is a chart showing example PTs.

FIG. 21 is a chart showing an example of UCS.

FIG. 23 is a chart showing an example of accounting information.

FIG. 25 is a chart illustrating reference information 51.

FIG. 26 is a chart showing an example registration list of the receiver 51.

FIG. 28 is a chart illustrating reference information 51.

FIG. 29 is a chart showing an example registration list of the receiver 201.

FIG. 31 is a chart illustrating reference information 301.

FIG. 32 is a chart showing an example registration list of the receiver 301.

FIG. 44 is a chart showing another example of UCS.

FIG. 45 is a chart showing another example of accounting information.

FIG. 47 is a chart showing another example of UCS.

FIG. 48 is a chart showing another example of accounting information.

FIG. 50 is a chart showing another example of UCS.

FIG. 51 is a chart showing another example of accounting information.

BEST MODE FOR CARRYING OUT THE INVENTION

An embodiment of the present invention will be described below.

(1) Information Distribution System

Figure 1:
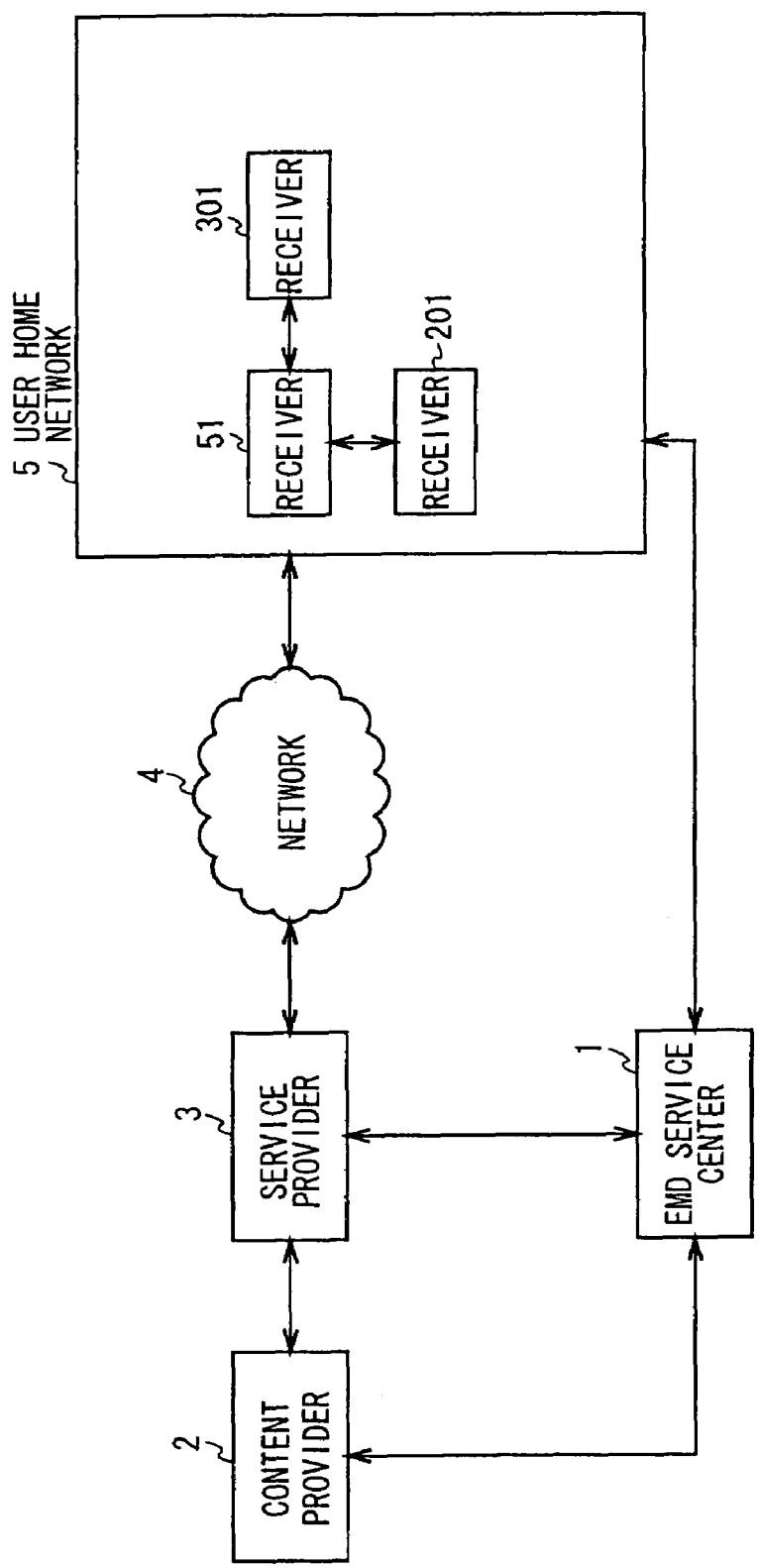
FIG. 1 is a system diagram illustrating a EMD system.

FIG. 1 illustrates an EMD (electronic music distribution) system by the application of the present invention. The EMD system consists of the EMD service center 1 that manages individual pieces of equipment, content provider 2 that provides content, service provider 3 that provides predetermined services corresponding to content, and user network 5 composed of the equipment (receiver 51, receiver 201, and receiver 301 in this example) on which content is used.

The content in an EMD system is digital data whose information itself has a value. In this example, one piece of content corresponds to music data equivalent to one piece of music. Besides music data, however, content can be video data, game programs, computer programs, literary data, etc.

Figure 2:
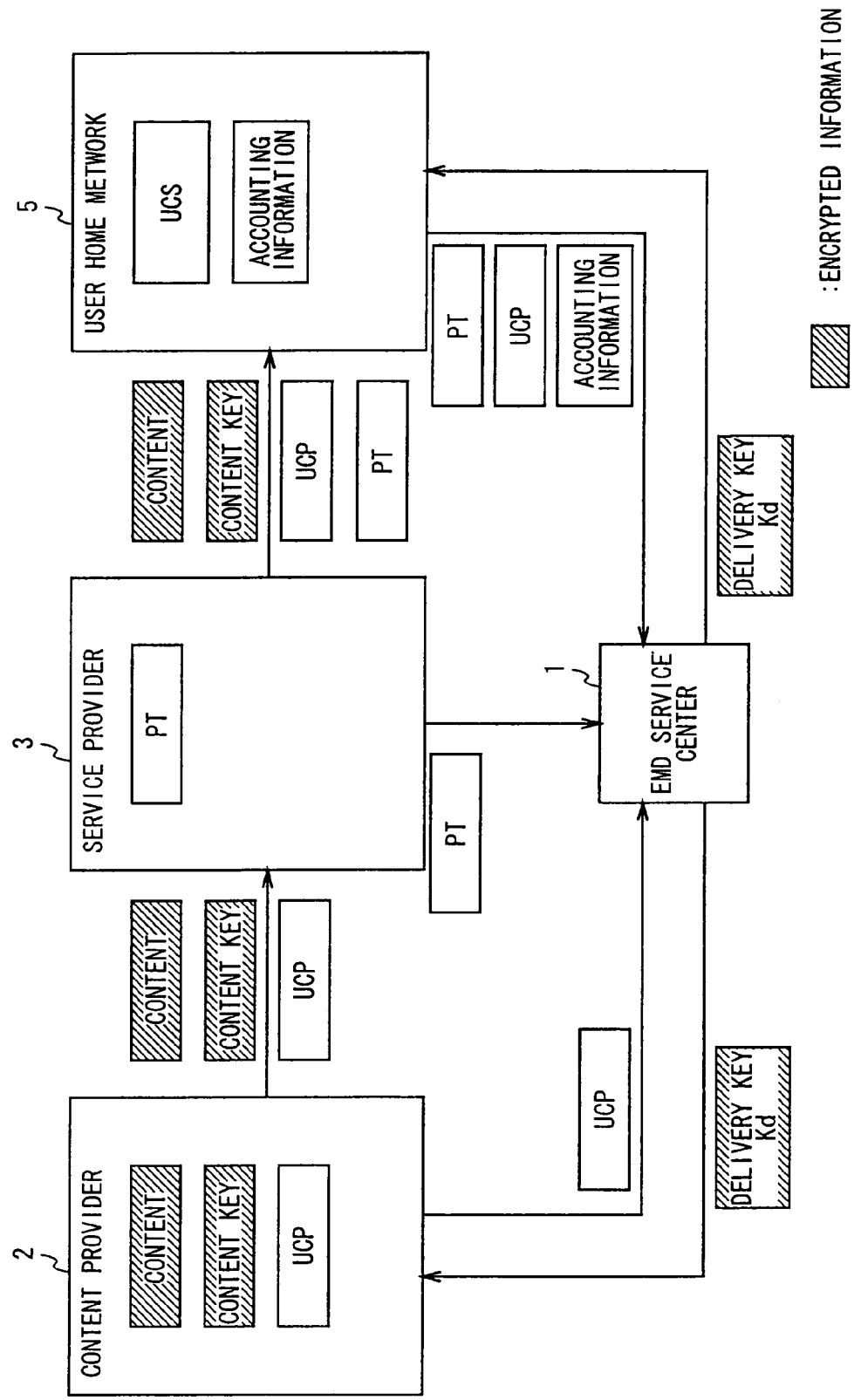
FIG. 2 is a system diagram illustrating the major information flow in the EMD system.

The EMD service center 1 sends the delivery keys Kd needed to use content to the user home network 5 and content provider 2, as shown in FIG. 2, which shows the major information flow in the EMD system. Also, the EMD service center 1 receives accounting information and the like from the user home network 5 and adjust charges.

The content provider 2 possesses the content (encrypted with a content key Kco) to be provided, content key Kco (encrypted with a delivery key Kd) needed to decrypt the content, and usage control policy (abbreviated as UCP hereafter) that describes the usage details of content, and supplies them in the form called a content provider secure container (described later) to the service provider 3.

The service provider 3 prepares one or more price tags (abbreviated as PT hereafter) according to the usage details contained in the UCP supplied by the content provider 2. The service provider 3 sends the prepared PT(s) together with the content (encrypted with a content key Kco), content key Kco (encrypted with a delivery key Kd), and UCP supplied by the content provider 2, in the form called a service provider secure container to the user home network 5 through a network 4 consisting of a private cable network, the Internet, or communications satellites.

The user home network 5 prepares usage control status (abbreviated as UCS hereafter) according to the supplied UCP and PT(s) and performs the process of using the content based on the prepared UCS. Also, the user home network 5 prepares accounting information, timed with the preparation of UCS, and sends it together with corresponding UCP and PT(s) to the EMD service center 1, timed with, for example, the provision of the delivery keys Kd.

(2) EMD Service Center

Figure 3:
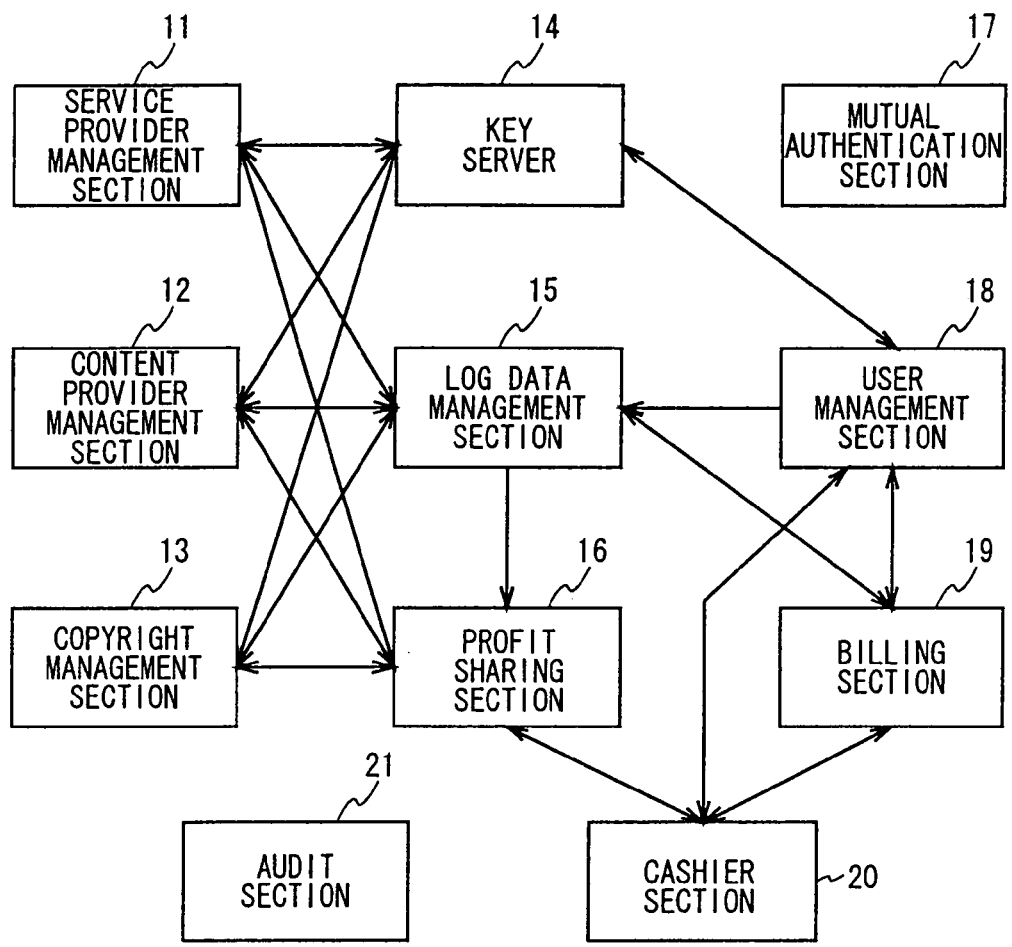
FIG. 3 is a block diagram showing the functional configuration of an EMD service center 1.

FIG. 3 is a block diagram showing the functional configuration of the EMD service center 1. The service provider management section 11 supplies profit-sharing information to the service provider 3. The content provider management section 12 sends delivery keys Kd and supplies profit-sharing information to the content provider 2.

The copyright management section 13 sends information about the usage of content by the user home network 5 to the appropriate copyright management body, for example, JASPAC (Japanese Society for Rights of Authors, Composers and Publishers).

The key server 14 stores delivery keys Kd and supplies it to the content provider 2 through the content provider management section 12 or to the user home network 5 through the user management section 18.

The delivery keys Kd supplied to the user home network 5 equipment and content provider 2 from the EMD service center 1 will be described with reference to FIGS. 4 to 7.

Figure 4:
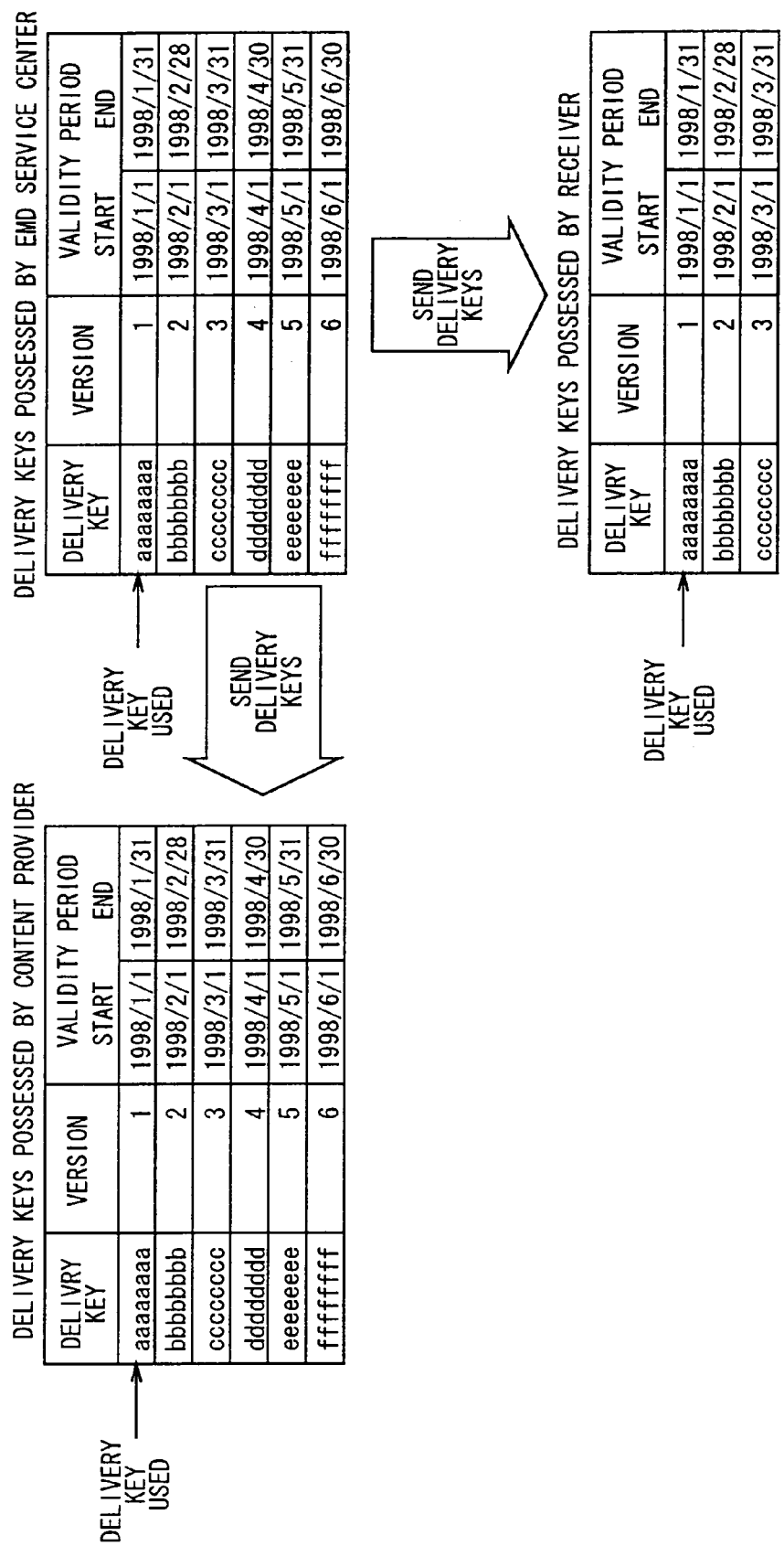
FIG. 4 is a schematic diagram illustrating the transmission of delivery keys Kd at the EMD service center 1.

FIG. 4 shows the delivery keys Kd possessed by the EMD service center 1, the delivery keys Kd possessed by the content provider 2, and the delivery keys Kd possessed by the receiver 51 in January 1998 when the content provider 2 starts to provide content and the receiver 51 composing the user home network 5 starts to use the content.

In the example of FIG. 4, a delivery key Kd is valid from the first day to the last day of a calendar month (both inclusive). For example, the delivery key Kd version 1 with a value of "aaaaaaaa" consisting of a fixed random number of bits is available from Jan. 1, 1998 to Jan. 31, 1998 both inclusive (i.e., the content key Kco that encrypt the content distributed to the user home network 5 via the service provider 3 from Jan. 1, 1998 to Jan. 31, 1998 is encrypted with the delivery key Kd version 1). The delivery key Kd version 2 with a value of "bbbbbbbb" consisting of a fixed random number of bits is available from Feb. 1, 1998 to Feb. 28, 1998 both inclusive (i.e., the content key Kco that encrypt the content distributed to the user home network 5 via the service provider 3 during the given period is encrypted by the delivery key Kd version 2). Similarly, the delivery key Kd version 3 is available during March 1998, the delivery key Kd version 4 is available during April 1998, the delivery key Kd version 5 is available during May 1998, and the delivery key Kd version 6 is available during June 1998.

Before the content provider 2 starts to provide content, the EMD service center 1 sends six delivery keys Kd—delivery keys Kd versions 1 to 6—available from January 1998 to June 1998 (both inclusive) to the content provider 2, which receives and stores the six delivery keys Kd. The reason why six months' delivery keys Kd are stored is that a certain period of time is required for the content provider 2 to make preparations such as encryption of the content and content keys before starting to provide the content.

Before the receiver 51 starts to use content, the EMD service center 1 sends three delivery keys Kd—delivery keys Kd versions 1 to 3—available from January 1998 to March 1998 (both inclusive) to the receiver 51, which receives and stores the three delivery keys Kd. Three months delivery keys Kd are stored in order to avoid the situation in which content would not be available even during the term of the contract due to trouble in that the receiver 5 cannot be connected to the EMD service center 1 or other trouble and to reduce the load on the user home network 5 by decreasing the number of connections to the EMD service center 1.

During the period from Jan. 1, 1998 to Jan. 31, 1998, the delivery key Kd version 1 is used by the EMD service center 1, the content provider 2, and the receiver 51 that composes the user home network 5.

Figure 5:
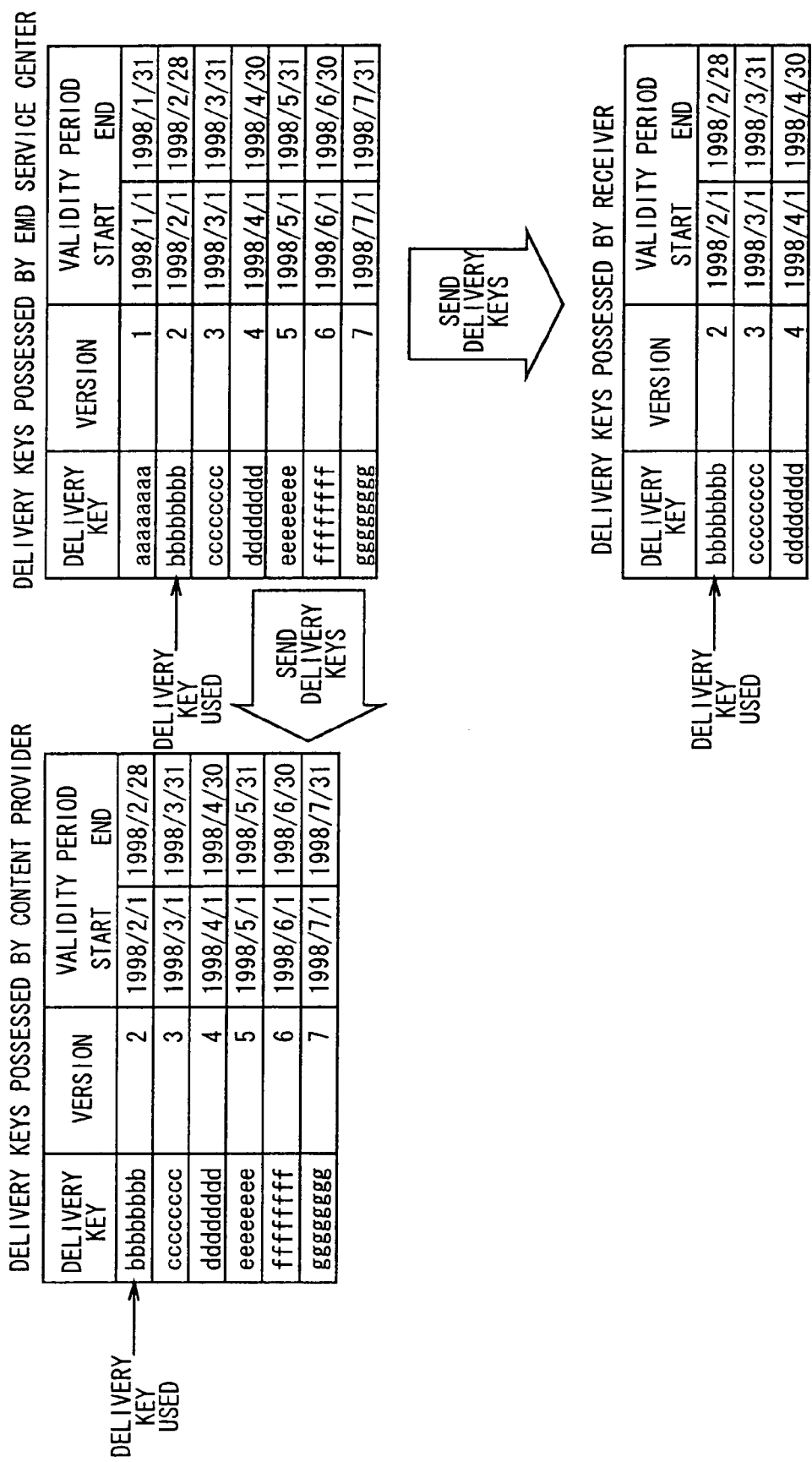
FIG. 5 is another schematic diagram illustrating the transmission of delivery keys Kd at the EMD service center 1.

Now the transmission of delivery keys Kd from the EMD service center 1 to the content provider 2 and receiver 51 on Feb. 1, 1998 will be described with reference to FIG. 5. The EMD service center 1 sends six delivery keys Kd—delivery keys Kd versions 2 to 7—available from February 1998 to July 1998 (both inclusive) to the content provider 2, which receives the six delivery keys Kd and store them overwriting the existing ones. The EMD service center 1 sends three delivery keys Kd—delivery keys Kd versions 2 to 4—available from February 1998 to April 1998 (both inclusive) to the receiver 51, which receives the three delivery keys Kd and store them overwriting the existing ones. The EMD service center 1 stores the delivery key Kd version 1 as it is.

This is done to make past delivery keys Kd available for use in case of unexpected trouble or in case an illegal act is committed or detected.

During the period from Feb. 1, 1998 to Feb. 28, 1998, the delivery key Kd version 2 is used by the EMD service center 1, the content provider 2, and the receiver 51 that composes the user home network 5.

Figure 6:
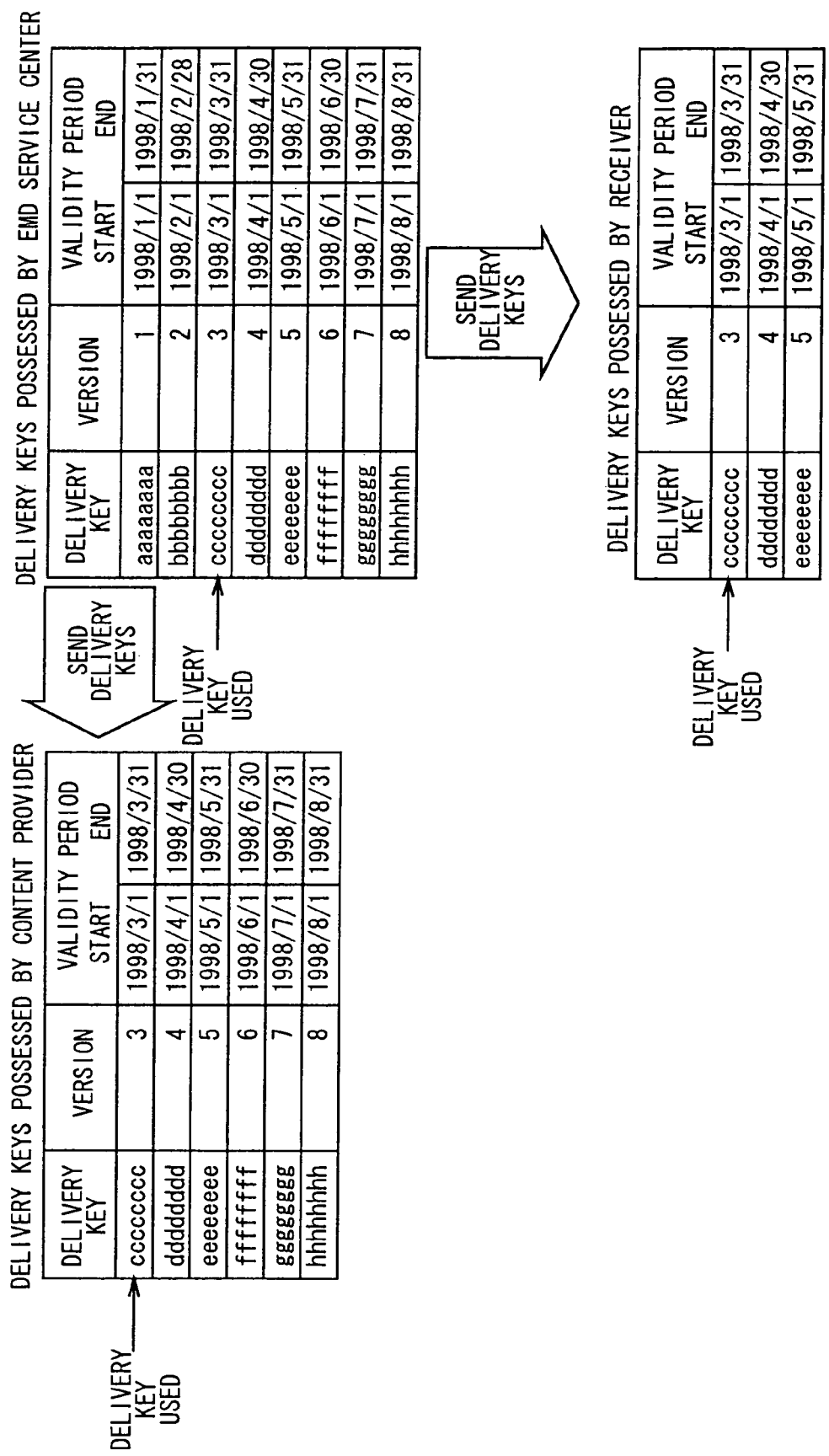
FIG. 6 is another schematic diagram illustrating the transmission of delivery keys Kd at the EMD service center 1.

Now the transmission of delivery keys Kd from the EMD service center 1 to the content provider 2 and receiver 51 on Mar. 1, 1998 will be described with reference to FIG. 6. The EMD service center 1 sends six delivery keys Kd—delivery keys Kd versions 3 to 8—available from March 1998 to August 1998 (both inclusive) to the content provider 2, which receives the six delivery keys Kd and store them overwriting the existing ones. The EMD service center 1 sends three delivery keys Kd—delivery keys Kd version 3 to 5—available from March 1998 to May 1998 (both inclusive) to the receiver 51, which receives the three delivery keys Kd and store them overwriting the existing ones. The EMD service center 1 stores the delivery keys Kd versions 1 and 2 as they are.

During the period from Mar. 1, 1998 to Mar. 31, 1998, the delivery key Kd version 3 is used by the EMD service center 1, the content provider 2, and the receiver 51 that composes the user home network 5.

Figure 7:
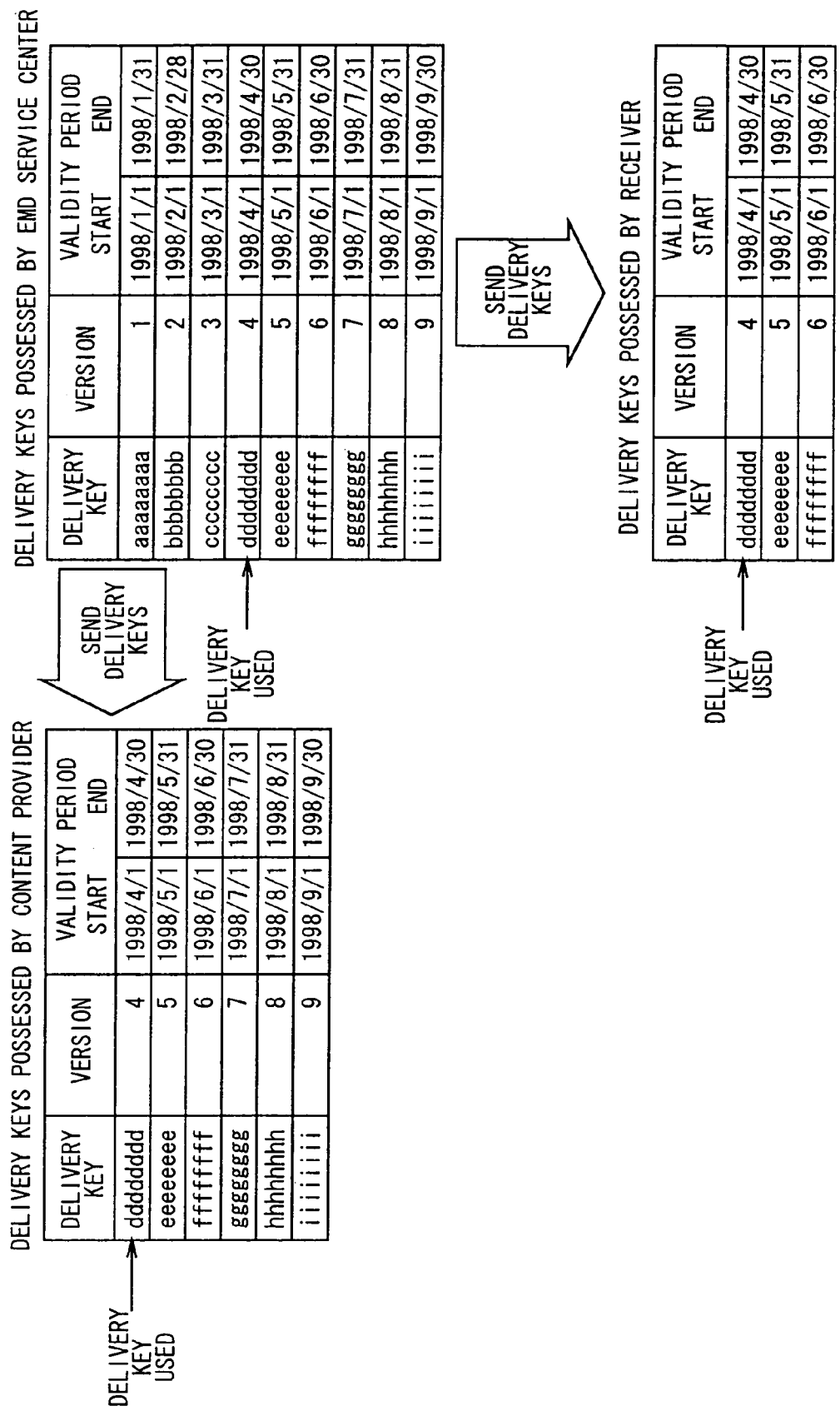
FIG. 7 is another schematic diagram illustrating the transmission of delivery keys Kd at the EMD service center 1.

Now the transmission of delivery keys Kd from the EMD service center 1 to the content provider 2 and receiver 51 on Apr. 1, 1998 will be described with reference to FIG. 7. The EMD service center 1 sends six delivery keys Kd—delivery keys Kd versions 4 to 9—available from April 1998 to September 1998 (both inclusive) to the content provider 2, which receives the six delivery keys Kd and store them overwriting the existing ones. The EMD service center 1 sends three delivery keys Kd—delivery keys Kd version 3 to 5—available from April 1998 to June 1998 (both inclusive) to the receiver 51, which receives the three delivery keys Kd and store them overwriting the existing ones. The EMD service center 1 stores the delivery keys Kd versions 1, 2, and 3 as they are.

During the period from Apr. 1, 1998 to Apr. 30, 1998, the delivery key Kd version 4 is used by the EMD service center 1, the content provider 2, and the receiver 51 that composes the user home network 5.

In this way, if delivery keys Kd are distributed several months in advance, users can purchase content even if they do not access the EMD service center 1 at all for a month or two, and later they can access the EMD service center 1 and receive keys at a convenient time.

Returning to FIG. 3, the log data management section 15 stores, the accounting information output by the user management section 18, PTs corresponding to the content, and UCP corresponding to the content.

The profit-sharing section 16 calculates, the respective profits of the EMD service center 1, content provider 2, and service provider 3 according to the information provided by the log data management section 15 and outputs the results to the service provider management section 11, content provider management section 12, cashier section 20, and copyright management section 13.

The mutual authentication section 17 performs mutual authentication with the content provider 2, service provider 3, and user home network 5 equipment.

The user management section 18 manages the information (hereafter referred to as system registration information) about the equipment in the user home network 5 that can be registered in the EMD system. The system registration information contains information corresponding to the items "SAM (secure application module) ID," "Equipment Number," "Settlement ID," "Account-Settling User Information," multiple "Subordinate User Information," and "Use Point Information," as shown in FIG. 8.

"SAM ID" contains the SAM (described later) ID of the manufactured equipment composing the user home network 5. The "SAM ID" row of the system registration information in FIG. 8 contains the SAM 62 ID of the receiver 51, SAM 212 ID of the receiver 201, and SAM 311 ID of the receiver 301.

"Equipment Number" is the number assigned to the user home network 5 equipment that possesses SAM. If a piece of equipment in the user home network 5 has the capability (communications block) to communicate directly with the service provider 3 and EMD service center 1 through a network 4 and has, for example, the capability to output (present) the contents of UCP and PT to the user or the capability (a display unit and operator panel) to allow the user to select the usage details in UCP, an equipment number of 100 or higher is given to that piece of equipment (hereafter, the pieces of equipment that have such capabilities are referred to as master equipment). The pieces of equipment without such capabilities (hereafter, the pieces of such equipment are referred to as slave equipment) are assigned an equipment number of 99 or lower. In this example, the receivers 51 and 201, which have the above-mentioned capabilities are considered master equipment and assigned an equipment number of 100 (details will be described later). On the other hand, the receiver 301, which does not have the above-mentioned capabilities, are regarded as slave equipment and assigned an equipment number of 25.

"Settlement ID" is the settlement ID assigned to the user (hereafter referred to as account-settling user) who settles accounts. In this example, "Settlement ID" for the receivers 51, 201, and 301, for which user F has been registered as the account-settling user, contains the settlement ID of user F.

"Account-Settling User Information" contains, the name, address, phone number, settlement institution information (e.g., the credit card number), date of birth, age, sex, ID, password, etc. of the account-settling user. The name, address, phone number, settlement institution information, date of birth, age, and sex of the account-settling user are provided by the user when an application for registration is filed by the user (hereafter the items contained in "Account-Settling User Information" is referred to as user's general information if there is no need to handle them individually). Of these items, the name, address, phone number, and settlement institution information must be accurate (e.g., the information registered in the settlement institution) in this example because they are used for the user-crediting process. On the other hand, the date of birth, age, and sex in the user's general information are not used for the user-crediting process and need not be accurate in this example. Besides, the user is not necessarily required to provide them. The account-settling user's ID and password contained in "Account-Settling User Information" is assigned and set when the user is registered in the EMD system.

"Account-Settling User Information" for the SAM 62 ID of the receiver 51, SAM 212 ID of the receiver 201, and SAM 311 ID of the receiver 301 in the system registration information of FIG. 8 contains the user's general information provided by user F as well as the ID and password of user F.

"Subordinate User Information" contains the name, address, phone number, date of birth, age, sex, ID, password, etc. of the user who does not settle his/her account for himself/herself (hereafter such users are referred to as subordinate users). In other words, it contains the information contained in "Account-Settling User Information" except the settlement institution information.

The subordinate user's name, address, phone number, date of birth, age, and sex contained in "Subordinate User Information" need not be accurate because subordinate users are not subject to a crediting process. For example a nickname may be used for the name. Although the name is used to identify the user, the other information is not necessarily required. The subordinate user's ID and password contained in "Subordinate User Information" is assigned and set when the subordinate user is registered in the EMD system.

In this example, since user A is registered as the subordinate user for both receivers 201 and 301, "Subordinate User Information" for the SAM 212 ID of the receiver 201 and SAM 311 ID of the receiver 301 in the system registration information in FIG. 8 contains the user's general information (except the settlement institution information) supplied by user A as well as the ID and password of user A. Since no subordinate user is specified for the receiver 51 "Subordinate User Information" for the SAM 62 ID of the receiver 51 does not contain any information.

"Use Point Information" is the use point information output by the profit-sharing section 16. "Use Point Information" for the SAM 62 ID of the receiver 51, SAM 212 ID of the receiver 201, and SAM 311 ID of the receiver 301 in the system registration information in FIG. 8 contains the use point information of the respective receivers.

In addition to managing this system registration information, the user management section 18 prepares registration lists for predetermined processes and sends them together with the delivery keys Kd to the user home network 5.

The billing section 19 calculates the amount charged to the user based on, for example, the accounting information, UCP, and PTs supplied by the log data management section 15, and supplies the results to the cashier section 20, which then settles accounts in communication with external banks or the like (not shown), based on the amounts of usage fees to be paid or charged to the user, content provider 2, and service provider 3. Also, the cashier section 20 informs the user management section 18 about the results of the settlement. The audit section 21 checks the validity of the accounting information supplied from the equipment in the user home network 5 as well as the validity of PTs and UCP (i.e., checks for any illegal act).

(3) Content Provider

Figure 9:
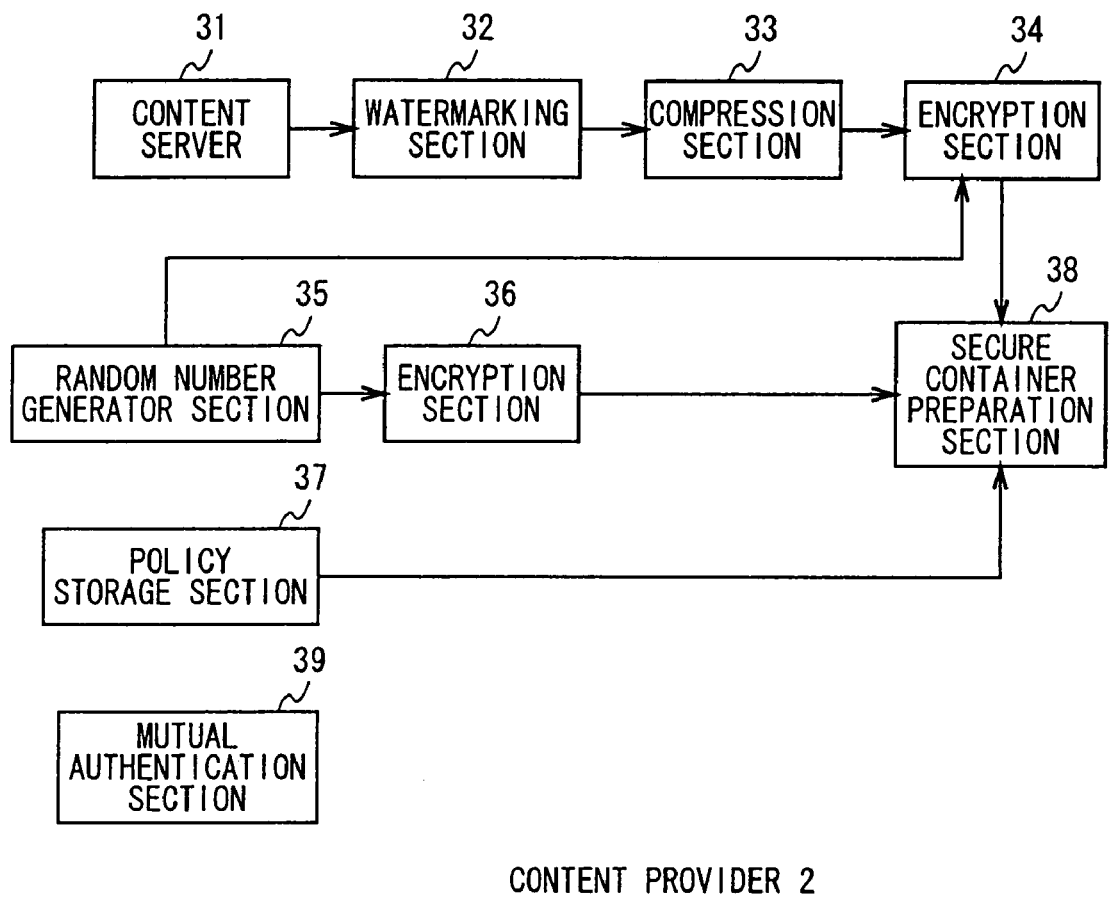
FIG. 9 is a block diagram showing an example functional configuration of a content provider 2.

FIG. 9 is a block diagram showing a functional configuration of the content provider 2. The content server 31 stores the content to be supplied to the user and supplies it the watermarking section 32, which then watermarks the content supplied by the content server 31 and supplies it to the compression section 33.

The compression section 33 compresses the content supplied by the watermarking section 32, by ATRAC2 (Adaptive Transform Acoustic Coding 2) (a trademark) or another method, and supplies it to the encryption section 34. The encryption section 34 encrypts the content compressed by the compression section 33, by common-key cryptography such as DES (Data Encryption Standard) by using the random number supplied by the random number generator section 35 as a key (hereafter this random number is referred to as a content key Kco), and outputs the results to the secure container preparation section 38.

The random number generator section 35 supplies the random number consisting of a fixed number of bits for use as the content key Kco to the encryption sections 34 and 36.

The encryption section 36 encrypts the content key Kco by common-key cryptography such as DES by using the delivery key Kd supplied by the EMD service center 1, and outputs the results to the secure container preparation section 38.

DES is an encryption method that encrypts 64-bit blocks of plain text by using a 56-bit common key. The DES process consists of the part (data mixing section) that converts plain text to cipher text by mixing it with the key and the part (key processing section) that generates the key (expansion key) for use by the data mixing section from the common key. All the DES algorithms are open to the public. Therefore, only the basic processing in the data mixing section will be described here briefly.

First, 64 bits of plain text is divided into high-order 32 bits $H_0$ and low-order 32 bits $L_0$. Using, as input, the 48-bit expansion key $K_1$ supplied from the key processing section and the low-order 32 bits $L_0$, the output from an F function is calculated by mixing the low-order 32 bits $L_0$. The F function consists of two basic conversions: "substitution" for substituting numeric values in a prescribed manner and "transposition" for transposing bit positions in a prescribed manner. Then the high-order 32 bits $H_0$ is XORed with the output from the F function and denoted as $L_1$. $L_0$ is denoted as $H_1$.

After 16 iterations of the above process based on the high-order 32 bits $H_0$ and low-order 32 bits $L_0$, the resulting high-order 32 bits $H_{16}$ and low-order 32 bits $L_{16}$ are output as cipher text. For decryption, the above procedures are reversed using the common key used for the encryption.

The policy storage section 37 stores the UCP set for content and outputs it to the secure container preparation section 38. FIG. 10 shows UCP A which has been set for content A kept in the content server 31 and which is stored in the policy storage section 37. A UCP contains predefined information regarding "Content ID," "Content Provider ID," "UCP ID," "UCP Validity Period," "Usage Conditions," and "Usage Details." "Content ID" contains the ID of the content to which the given UCP is applied. "Content ID" of UCP A contains the ID of content A.

"Content Provider ID" contains the ID of the content provider that provides the content. "Content Provider ID" of UCP A contains the ID of the content provider 2. "UCP ID" contains the ID assigned to the given UCP: "UCP ID" of UCP A contains the ID of UCP A. "UCP Validity Period" contains information about the validity period of the UCP: "UCP Validity Period" of UCP A contains the validity period of UCP A.

"Usage Conditions" contains predefined information regarding "User Conditions" and "Equipment Conditions." "User Conditions" contains the conditions for the user who can select the given UCP. "Equipment Conditions" contains the conditions for the equipment that can select the given UCP.

In the case of UCP A, "Usage Conditions 10" is specified. "User Conditions 10" of "Usage Conditions 10" contains information ('200 Points or Higher') indicating that the use points given according to the frequency of use of the EMD system are 200 points or higher. "Equipment Conditions" of "Usage Conditions 10" contains information ('No Condition') indicating that there is no condition. Thus, UCP A can be selected only by the users who have 200 or higher use points.

"Usage Details" contains predefined information regarding "ID," "Type," "Parameter," and "Control Transfer Permission Information." "ID" contains the ID assigned to the information contained in "Usage Details." "Type" contains information that indicates the use type of the content such as reproduction or duplication. "Parameter" contains the predefined information corresponding to the use type contained in "Type."

Figure 11:
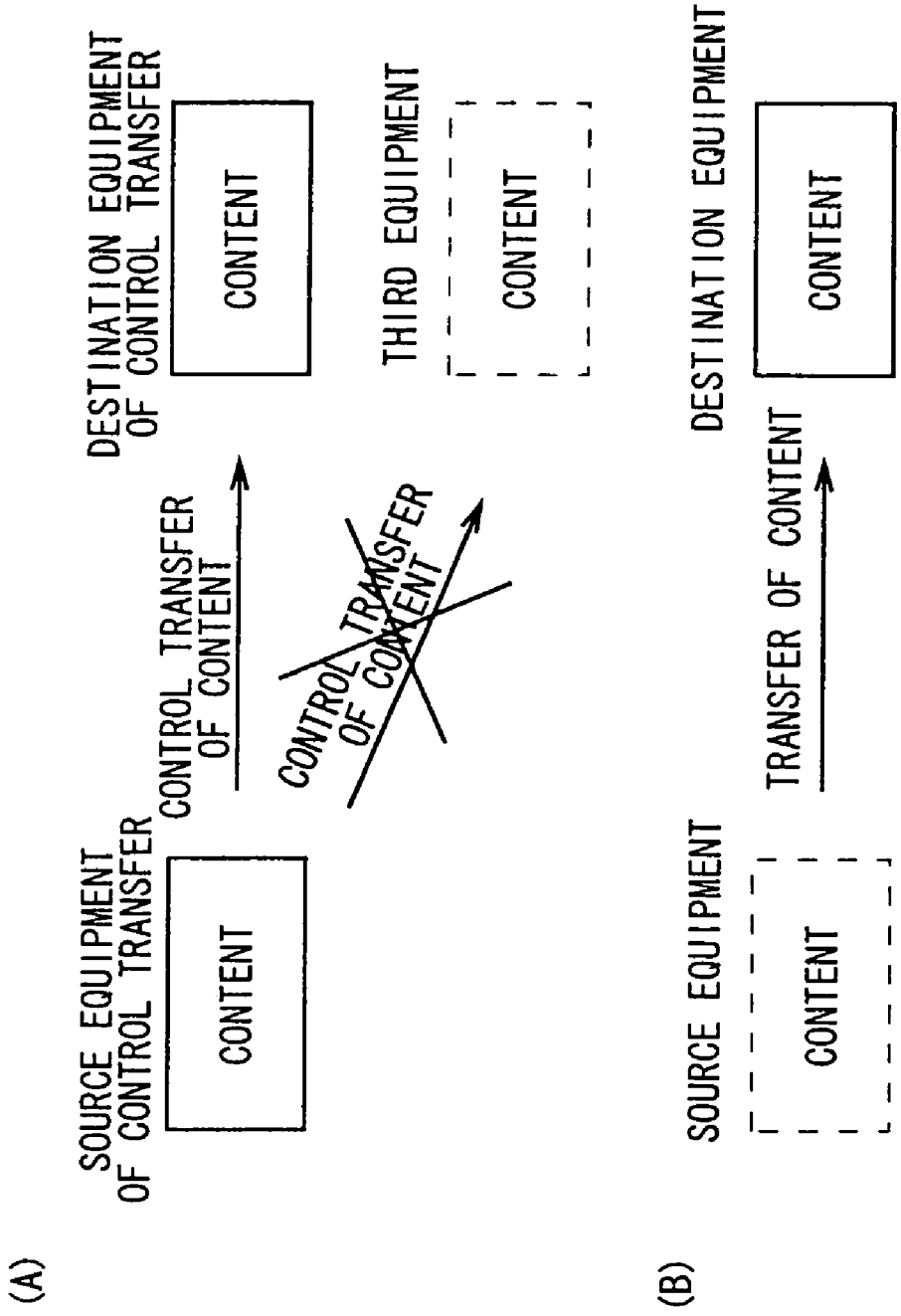
FIG. 11 is a schematic diagram illustrating control transfer of content.

"Control Transfer Permission Information" contains information which indicates whether control transfer of the content is possible (permitted or not). In the case of a content control transfer, the content is copied to the destination equipment while being kept on the source equipment, as shown in FIG. 11 (A). In other words, the content is used both on the source and destination equipment. In this respect, control transfer differs from normal content transfer in which content is removed from the source equipment and moved to the destination equipment, only where the content is stored and used, as shown in FIG. 11(B).

Figure 12:
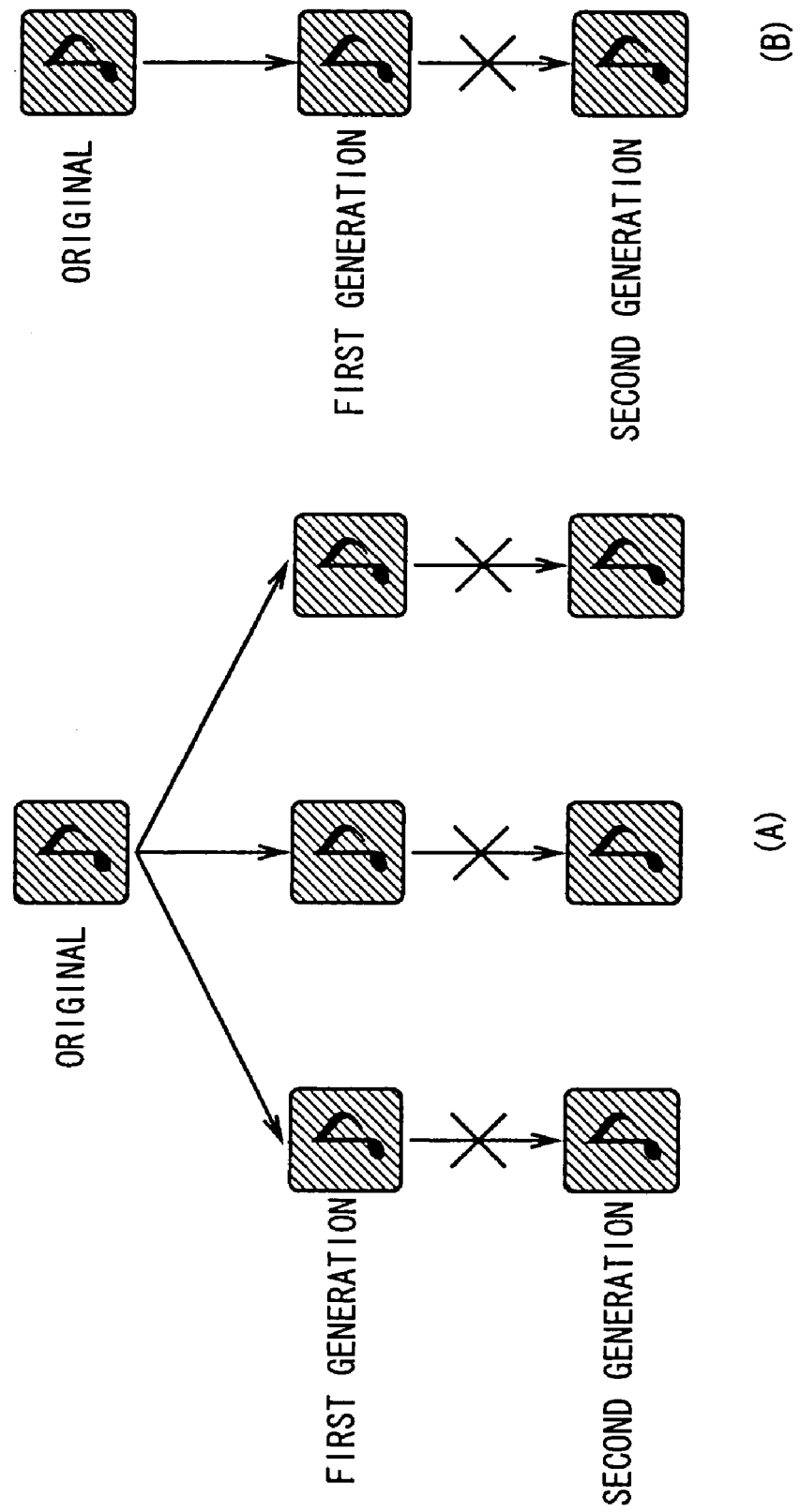
FIG. 12 is a schematic diagram illustrating first-generation duplication.

During a control transfer of content, the source equipment cannot transfer the control of the content to any third equipment (not permitted), as shown in FIG. 11 (A). Thus, the content is kept only on the two pieces of equipment: the source equipment and destination equipment. In this respect, content control transfer differs from the first-generation duplication which can produce multiple duplicates (first-generation) from the original content, as shown in FIG. 12 (A). Also, content control transfer differs from the one-time duplication shown in FIG. 12(B) in that content control can be transferred to third equipment if the content is returned from the source equipment.

Returning to FIG. 10, UCP A has six "Usage Details" fields: "Usage Details 11" to "Usage Details 16." "ID 11" of "Usage Details 11" contains the ID assigned to "Usage Details 11." "Type 11" contains the information indicating the use type of 'Purchase and Reproduce' meaning that the content will be purchased and reproduced. By purchasing the rights for the use type 'Purchase and Reproduce,' the user can reproduce content A without limit. "Parameter 11" contains the predefined information corresponding to 'Purchase and Reproduce.' "Control Transfer Permission Information 11" contains the information indicating that the control transfer of the content is permitted ('Permitted').

"ID 12" of "Usage Details 12" contains the ID assigned to "Usage Details 12." "Type 12" contains the information indicating the use type of 'First-Generation Duplicate' meaning that first-generation duplicates will be produced. By purchasing the rights for the use type 'First-Generation Duplicate,'the user can produce multiple first-generation duplicates from the original content A as shown in FIG. 12(A). However, it is not possible to produce second-generation duplicates from first-generation duplicates (not permitted). "Parameter 12" contains the predefined information corresponding to 'First-Generation Duplicate.' "Control Transfer Permission Information 12" contains the information indicating that the control transfer of the content is not permitted ('Not Permitted').

"ID 13" of "Usage Details 13" contains the ID assigned to "Usage Details 13." "Type 13" contains the use type of 'Limited-Time Reproduction.' By purchasing the rights for the use type 'Limited-Time Reproduction,' the user can reproduce content A for a specified period (time). "Parameter 13" contains the start time and end time corresponding to 'Limited-Time Reproduction.' "Control Transfer Permission Information 13" is set to 'Permitted.'

"ID 14" of "Usage Details 14" contains the ID assigned to "Usage Details 14." "Type 14" contains the use type of 'Pay Per Copy N.' By purchasing the rights for the use type 'Pay Per Copy N,' the user can produce N number of duplicates from the original content A (permitted). However, it is not possible to produce duplicates from duplicates (not permitted), as shown in FIG. 12 (B) in the case of "Pay Per Copy N." "Parameter 14" contains the predefined information corresponding to 'Pay Per Copy N.' "Control Transfer Permission Information 14" is set to 'Not Permitted.'

"ID 15" of "Usage Details 15" contains the ID assigned to "Usage Details 15." "Type 15" contains the use type of 'Type 13→Type 11.' The user can purchase the rights for this use type if he/she has already purchased the rights for the use type 'Limited-Time Reproduction.' This allows the user to use content A according to the use type 11 'Purchase and Reproduce.' "Parameter 15" contains the predefined information corresponding to 'Type 13→Type 11.' "Control Transfer Permission Information 15" is set to 'Permitted.'

"ID 16" of "Usage Details 16" contains the ID assigned to "Usage Details 16." "Type 16" contains the use type of 'Type 11→Type 11.' The user can purchase the rights for this use type if he/she has already purchased the rights for the use type 11 'Purchase and Reproduce.' This allows the user to use content A according to the use type 11 'Purchase and Reproduce' again. The rights for this use type are purchased, for example, if the user has already been using content A on the receiver 51, having purchased the rights for the use type 'Purchase and Reproduce' for the receiver 51, and wants to 'Purchase and Reproduce' content A on the receiver 301 or 201. "Parameter 16" contains the predefined information corresponding to 'Type 11→Type 11.' "Control Transfer Permission Information 16" is set to 'Permitted.'

Figure 13:
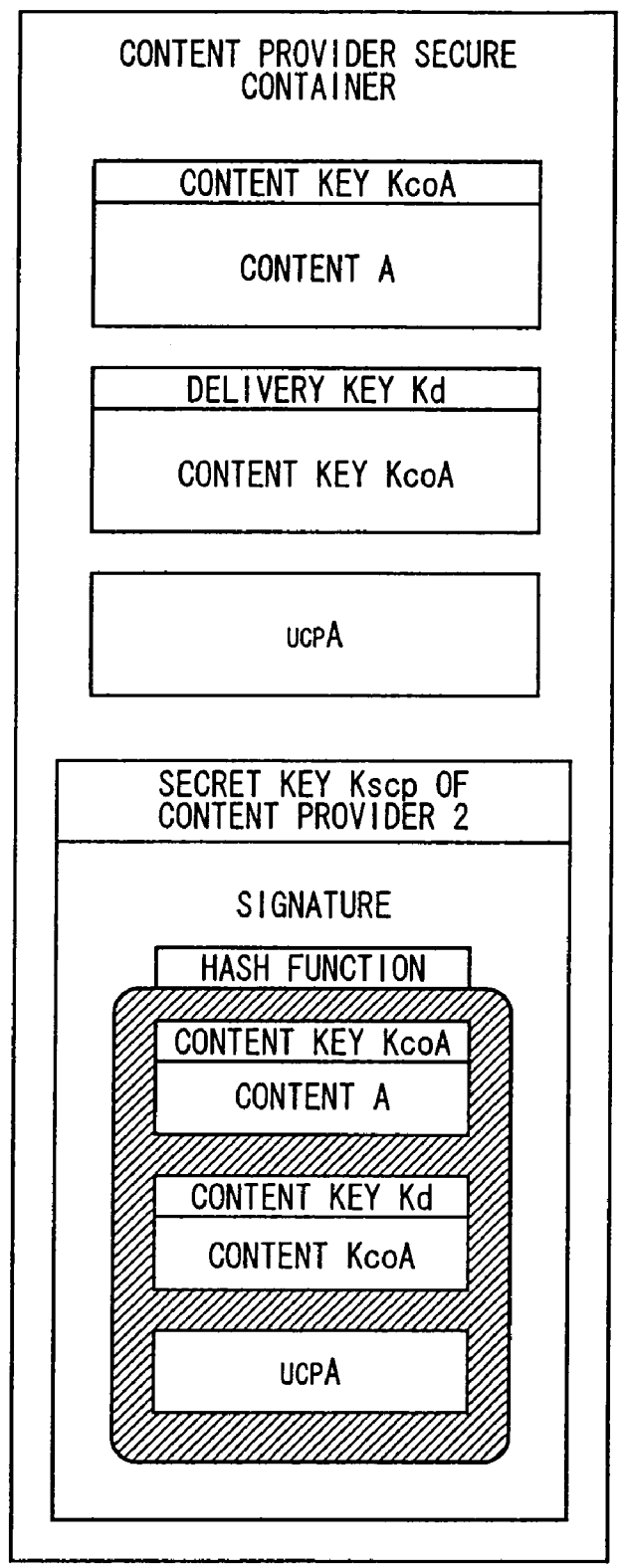
FIG. 13 is a schematic diagram showing a content provider secure container.

Returning to FIG. 9, the secure container preparation section 38 prepares a content provider secure container consisting, for example, of a content A (encrypted with a content key KcoA), a content key KcoA (encrypted with a delivery key Kd), UCP A, and the content provider's signature, as shown in FIG. 13. The signature is obtained by encrypting a hash value with a secret key (the secret key Kscp of the content provider 2 in this case) in the public-key cryptosystem of the content provider. The hash value, in turn, has been obtained by applying a hash function to the data that needs to be sent (content A in this case (encrypted with the content key KcoA)), content key KcoA (encrypted with the delivery key Kd), and UCP A.

Figure 14:
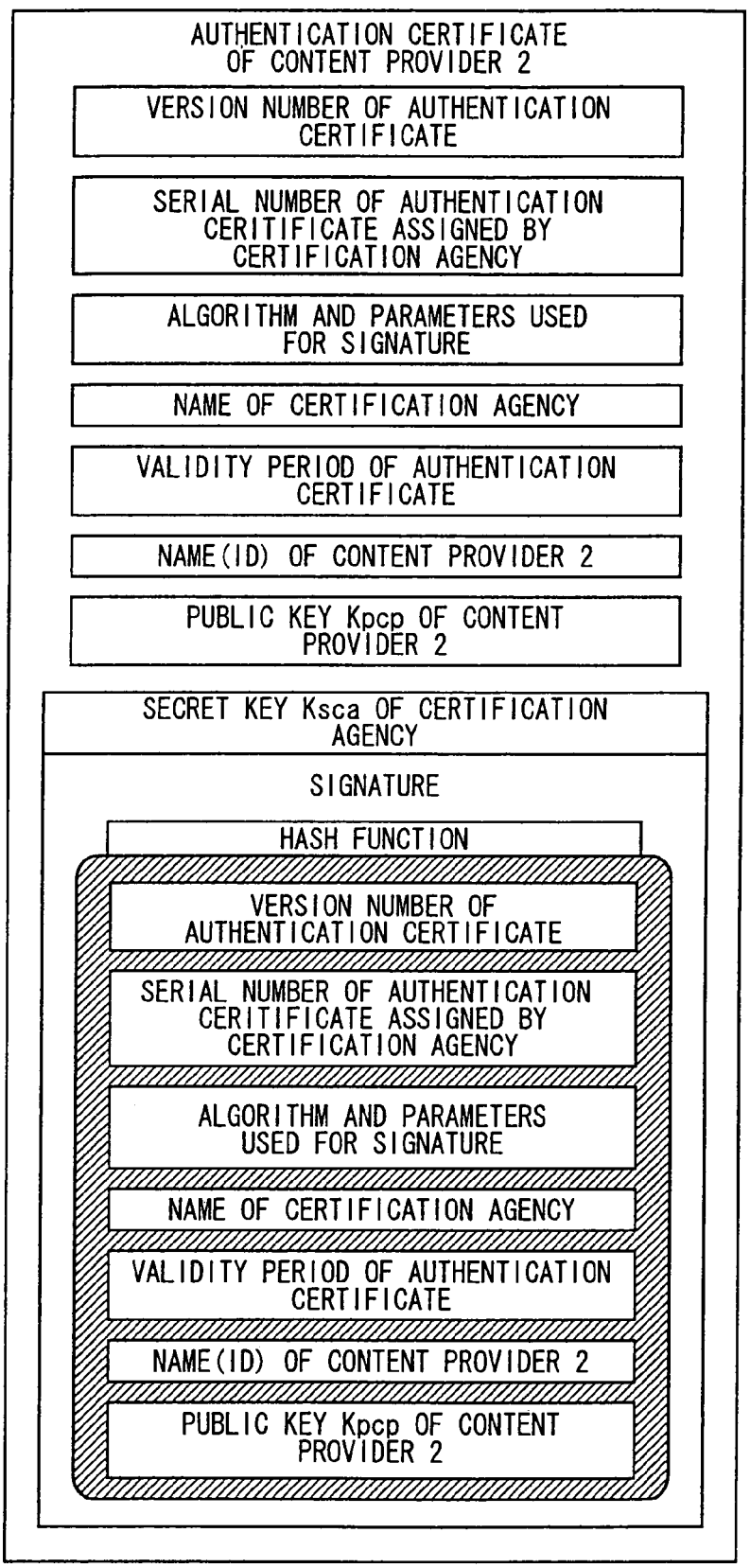
FIG. 14 is a schematic diagram showing an example authentication certificate of the content provider 2.

The secure container preparation section 38 sends the content provider secure container to the service provider 3 by attaching the authentication certificate of the content provider 2 shown in FIG. 14. The authentication certificate consists of its version number, its serial number assigned to the content provider 2 by the certification agency, the algorithm and parameters used for the signature, the name of the certification agency, the validity period of the authentication certificate, and the name, public key Kpcp, and signature (encrypted with the secret key Ksca of the certification agency) of the content provider 2.

The signature is used to check for falsification. It is produced by computing, by means of a hash function, a hash value from the data to be sent and encrypting the hash value with the secret key of public-key cryptography.

Hash functions and signature authentication will be described below. A hash function accepts as input the data to be sent, compresses it to data of a specific bit length, and outputs it as a hash value. Hash functions are characterized in that it is difficult to predict the input from the hash value (output), that if one bit of input data changes, many bits of the hash value change, and that it is difficult to find out input data that have the same hash value.

The receiver that has received the signature and data decrypts the signature by the cryptographic public key to obtain a resulting hash value. Then the hash value of the received data is calculated and compared with the hash value obtained by decrypting the signature, to check whether the two hash values are identical. If they are determined to be identical, the received data has not been falsified and it has been sent by the sender that has the secret key corresponding to the public key. Examples of the hash functions used for signatures include, MD (Message Digest) 4, MD5, SHA (Secure Hash Algorithm), etc.

Now public-key cryptography will be described. In contrast to the common-key cryptography which uses the same key (common key) for encryption and decryption, public-key cryptography uses different keys for encryption and decryption. In public-key cryptography, one of the keys is made public, but the other key can be kept secret. The key that can be made public is called a public key while the key that is kept secret is called a secret key.

Now a typical public-key cryptosystem, RSA (Rivest-Shamir-Adleman), will be described briefly. First, two significantly large primes p and q are determined, and then their product n is determined. The least common multiple L of (p−1) and (q−1) are computed, and the value e that is equal to or larger than 3 and less than L and that is relatively prime to L is determined (i.e., the value that will go into both e and L, which is only 1).

In modulo L arithmetic, the multiplicative inverse d of the element e is determined. In other words, the relationship ed=1 mod L exists among, d, e, and L, where d can be calculated by Euclid an algorithm. Here, n and e are public keys and p, q, and d are secret keys.

Cipher text C can be calculated from plain text M by equation (1)

$$C = M^e \bmod n \qquad (1)$$

The cipher text C is decrypted into the plain text M by equation (2).

$$M = C^d \bmod n \qquad (2)$$

Demonstration is omitted. The reason why plain text can be converted into cipher text by RSA and cipher text can be decrypted is that RSA is based on Fermat's first theorem and that equation (3) holds.

$$M = C^d = (M^e)^d = M^{ed} = M \bmod n \qquad (3)$$

If one knows the secret keys p and q, he/she can compute the secret key d from the public key e. However, if the number of digits of the public key n is increased to the extent that the unique factorization of the public key n is difficult in terms of the amount of computation, the secret key d cannot be computed from the public key e and the cipher text cannot be decrypted based simply on knowledge of the public key n. As described above, the RSA cryptosystem can use different keys for encryption and decryption.

Now another public-key cryptosystem, Elliptic Curve Cryptography, will be described briefly. Let B denote a point on the elliptic curve $y^2 = x^3 + ax + b$. To define additions of points on the elliptic curve, let nB denote the result of n additions of B. Similarly, subtractions will be defined. It has been proven that it is difficult to compute n from B and Bn. Suppose, B and nB are public keys and n is a secret key. Using a random number r and the public keys, cipher text C1 and C2 are computed from plain text M by equations (4) and (5).

$$C1 = M + rnB \qquad (4)$$

$$C2 = rB \qquad (5)$$

Cipher text C1 and C2 are decrypted into plain text M by equation (6)

$$M = C1 - nC2 \qquad (6)$$

Decryption is possible only when the secret key n is available. As can be seen from the above discussion, Elliptic Curve Cryptography allows the use of different keys for encryption and decryption, as is the case with the RSA cryptosystem.

Returning to FIG. 9, the mutual authentication section 39 of the content provider 2 performs mutual authentication with the EMD service center 1 before receiving delivery keys Kd from the EMD service center 1. It can also perform mutual authentication with the service provider 3 before sending the content provider secure container to the service provider 3. In this example, however, since the content provider secure container does not contain secret information, this mutual authentication is not necessarily required.

(4) Service Provider

Figure 15:
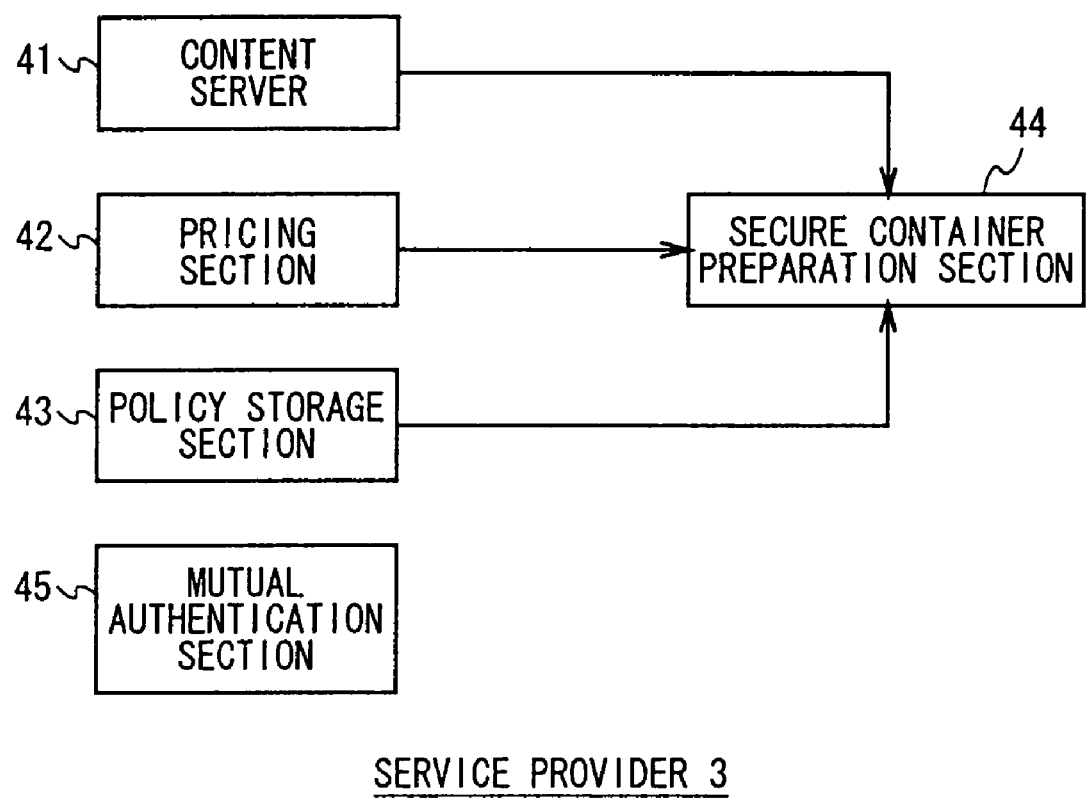
FIG. 15 is a block diagram showing the functional configuration of a service provider 3.

Now, the functional configuration of the service provider 3 will be described with reference to the block diagram in FIG. 15. The content server 41 stores the content (encrypted with the content key Kco), content key Kco (encrypted with the delivery key Kd), UCP, and a signature of the content provider 2 contained in the content provider secure container supplied by the content provider 2 and supplies them to the secure container preparation section 44.

The pricing section 42 checks the authenticity of the content provider secure container based on the signature contained in the content provider secure container supplied by the content provider 2. If the authenticity is confirmed, it prepares PTs according to the UCP contained in the content provider secure container and supplies them to the secure container preparation section 44. FIG. 16 shows two price tags, PT A-1 (FIG. 16(A)) and PT A-2 (FIG. 16(B)), prepared according to UCP A of the FIG. 10. A PT contains the information to be specified in "Content ID," "Content Provider ID," "UCP ID," "Service Provider ID," "PT ID," "PT Validity Period," "Pricing Conditions," and "Price."

"Content ID," "Content Provider ID," and "UCP ID" of PTs contain the information specified in the corresponding items of the UCP. That is, "Content ID" of PT A-1 and PT A-2 contains the ID of content A, their "Content Provider ID" contains the ID of the content provider 2, and their "UCP ID" contains the ID of UCP A.

"Service Provider ID" contains the ID of the service provider 3 that has provided the given PT. "Service Provider ID" of PT A-1 and PT A-2 contains the ID of the service provider 3. "PT ID" contains the ID assigned to the given PT: "PT ID" of PT A-1 contains the ID of PT A-1 and "PT ID" of PT A-2 contains the ID of PT A-2. "PT Validity Period" contains information about the validity period of the given PT: "PT Validity Period" of PT A-1 contains the validity period of PT A-1 and "PT Validity Period" of PT A-2 contains the validity period of PT A-2.

"Pricing Conditions" consists of "User Conditions" and "Equipment Conditions," as is the case with "Usage Conditions" in UCP. "User Conditions" contains information about the conditions for the user who can select the given PT. "Equipment Conditions" contains information about the conditions for the equipment that can select the given UCP.

In the case of PT A-1, "Pricing Conditions 10" is specified. "User Conditions 10" of "Pricing Conditions 10" contains information ('Male') indicating that the user is male. "Equipment Conditions" of "Pricing Conditions 10" is set to 'No Condition.' Thus, PT A-1 can be selected only by male users.

In the case of PT A-2, "Pricing Conditions 20" is specified. "User Conditions 20" of "Pricing Conditions 20" contains information ('Female') indicating that the user is female. "Equipment Conditions" of "Pricing Conditions 20" is set to 'No Condition.' Thus, PT A-2 can be selected only by female users.

"Price" of PTs contains the usage charge for the use type (i.e., the price of the rights to use the content according to the specified use type) specified in "Type" of "Usage Details" of the corresponding UCP. '2000 Yen' in "Price 11" of PT A-1 and '1000 Yen' in "Price 21" of PT A-2 are the charges for using content A according to the use type 'Purchase and Reproduce' (price of the rights for the use type 'Purchase and Reproduce').

'600 Yen' in "Price 12" of PT A-1 and '300 Yen' in "Price 22" of PT A-2 are the prices of the rights to use the content A according to the use type "First-generation Duplicate" as indicated by "Type 12" of "Usage Details 12" of UCP A. '100 Yen' in "Price 13" of PT A-1 and '50 Yen' in "Price 23" of PT A-2 are the prices of the rights to use the content A according to the use type 'Limited-Time Reproduction' as indicated by "Type 13" of "Usage Details 13" of UCP A. '300 Yen' in "Price 14" of PT A-1 and '150 Yen' in "Price 24" of PT A-2 are the prices of the rights to use the content A according to the use type 'Pay Per Copy N' as indicated by "Type 14" of "Usage Details 14" of UCP A.

'1950 Yen' in "Price 15" of PT A-1 and '1980 Yen' in "Price 25" of PT A-2 are the prices of the rights to use the content according to the use type 'Purchase and Reproduce' when the user has the rights for "Limited-Time Reproduction" as indicated by "Type 15" of "Usage Details 15" of UCP A. '1000 Yen' in "Price 16" of PT A-1 and '500 Yen' in "Price 26" of PT A-2 are the prices of the rights to use the content according to the use type 'Purchase and Reproduce' when the user has the rights for 'Purchase and Reproduce' as indicated by "Type 16" of "Usage Details 16" of UCP A.

In this example, when the prices on PT A-1 (applicable to male users) and the prices on PT A-2 (applicable to female users) are compared, it can be seen that the prices on PT A-1 are twice as high as the prices on PT A-2. For example, while "Price 11" on PT A-1 for "Usage Details 11" of UCP A is '2000 Yen,' "Price 21" on PT A-2 for "Usage Details 11" of UCP A is '1000 Yen.' Similarly, the prices specified in "Price 12" to "Price 14" on PT A-1 are twice as high as the prices specified in "Price 22" to "Price 24" on PT A-2. In short, female users can use content A at lower prices.

Returning to FIG. 15, the policy storage section 43 stores the content's UCP supplied by the content provider 2 and supplies it to the secure container preparation section 44.

Figure 17:
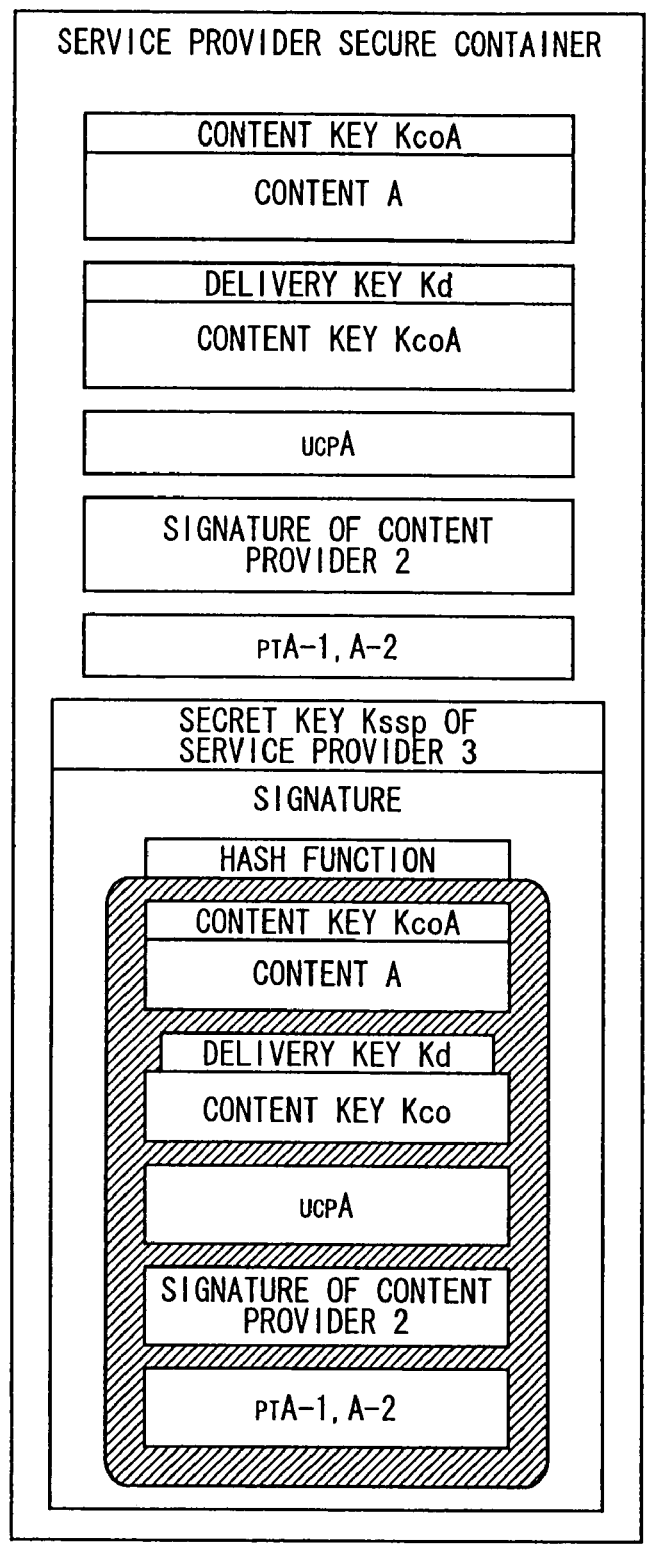
FIG. 17 is a schematic diagram showing a service provider secure container.

The secure container preparation section 44 prepares a service provider secure container consisting, for example, of the content A (encrypted with a content key KcoA), content key KcoA (encrypted with a delivery key Kd), UCP A, signature of the content provider 2, PT A-1, PT A-2, and signature of the service provider, as shown in FIG. 17.

Figure 18:
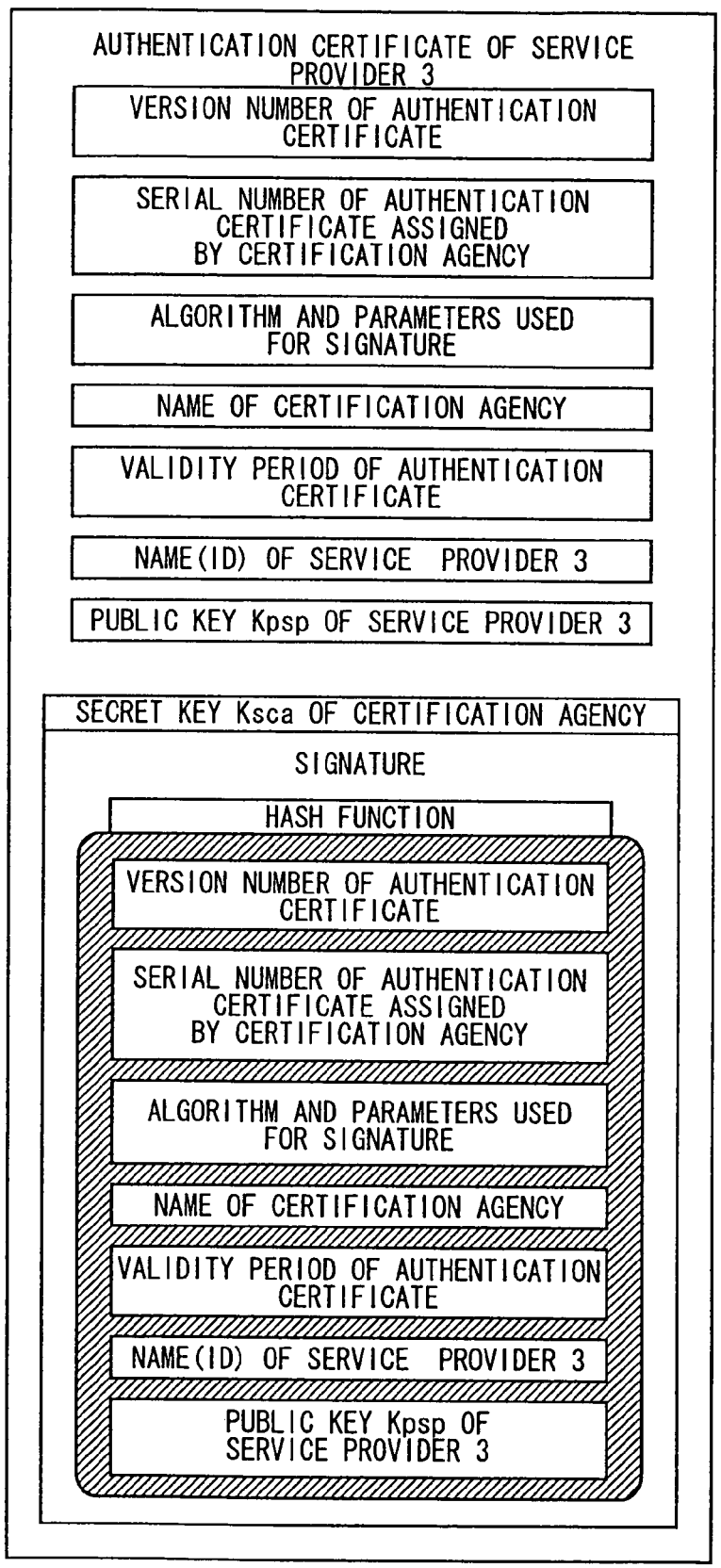
FIG. 18 is a schematic diagram showing an example authentication certificate of the service provider 3.

Also, the secure container preparation section 44 supplies the prepared service provider secure container to the user home network 5 by attaching an authentication certificate, such as the one shown in FIG. 18, consisting of its version number, its serial number assigned to the service provider 3 by the certification agency, the algorithm and parameters used for the signature, the name of the certification agency, the validity period of the authentication certificate, the name and public key Kpsp of the service provider 3, and the signature of the certification agency.

Returning to FIG. 15 again, the mutual authentication section 45 performs mutual authentication with the content provider 2 before receiving the content provider secure container from the content provider 2. It also performs mutual authentication with the user home network 5 before sending the service provider secure container to the user home network 5. However, this mutual authentication is not performed if, for example, the network 4 is a communication satellite network. In this example, since the content provider secure container and service provider secure container do not contain secret information, the service provider 3 need not necessarily perform mutual authentication with the content provider 2 and user home network 5.

(5) User Home Network (5-1) Receiver 51

Figure 19:
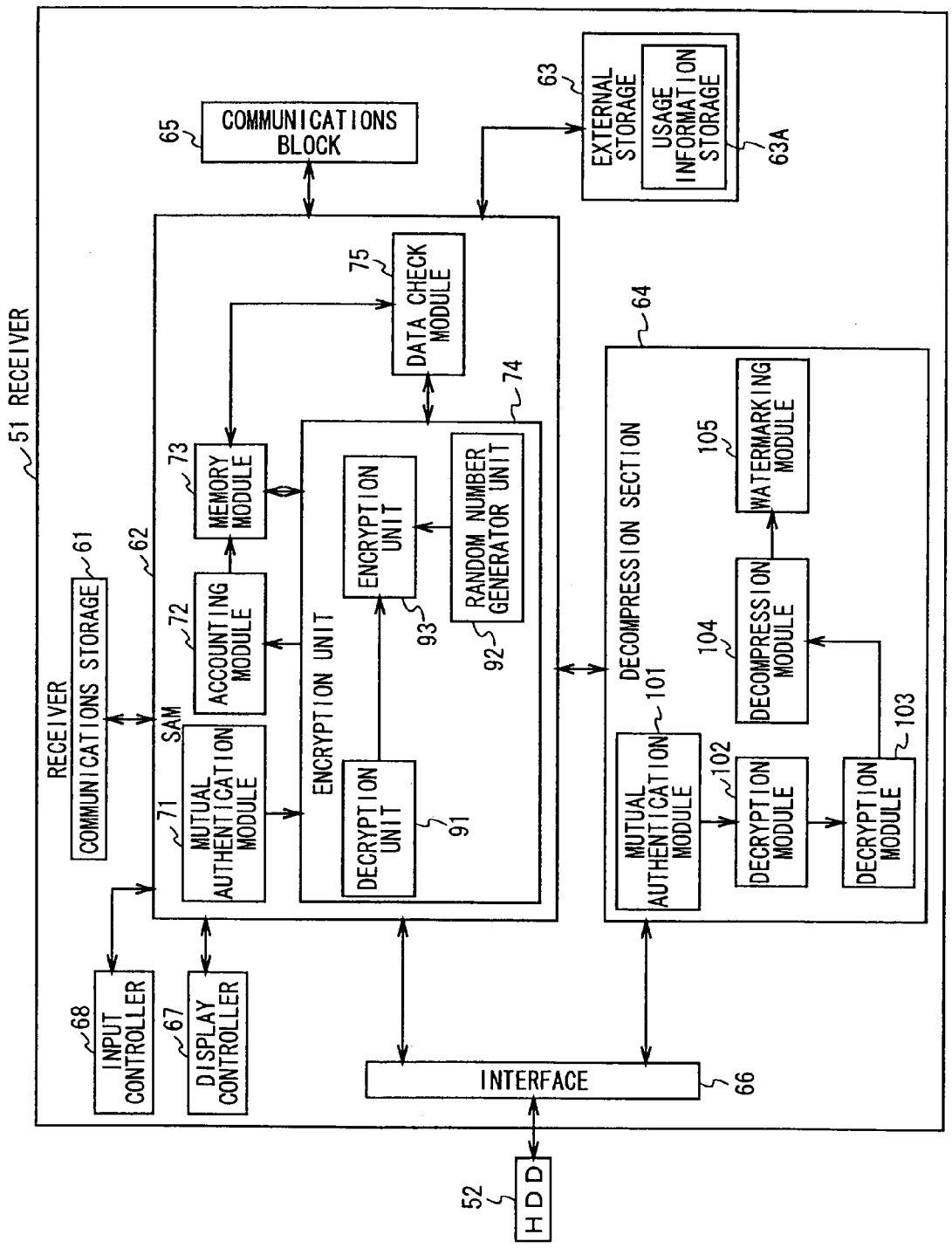
FIG. 19 is a block diagram showing an example functional configuration of a receiver 51 in a user home network 5.

FIG. 19 shows an example configuration of the receiver 51 in the user home network 5. The receiver 51 is stationary equipment consisting of a communications block 61, SAM 62, external storage 63, decompression section 64, communications block 65, interface 66, display controller 67, and input controller 68.

The communications block 61 of the receiver 51 communicates with the service provider 3 or the EMD service center 1 through the network 4, sending and receiving necessary information.

SAM 62 consists of a mutual authentication module 71, accounting module 72, memory module 73, encryption/decryption module 74, and data check module 75. It is made up of single-chip ICs designed exclusively for cryptographic use. It has a multi-layer construction in which the memory cells inside are sandwiched by dummy layers of aluminum and the like. Since it operates at a small range of voltage or frequency, it is difficult to read data illegally from outside (tamper-proof).

Figure 20:
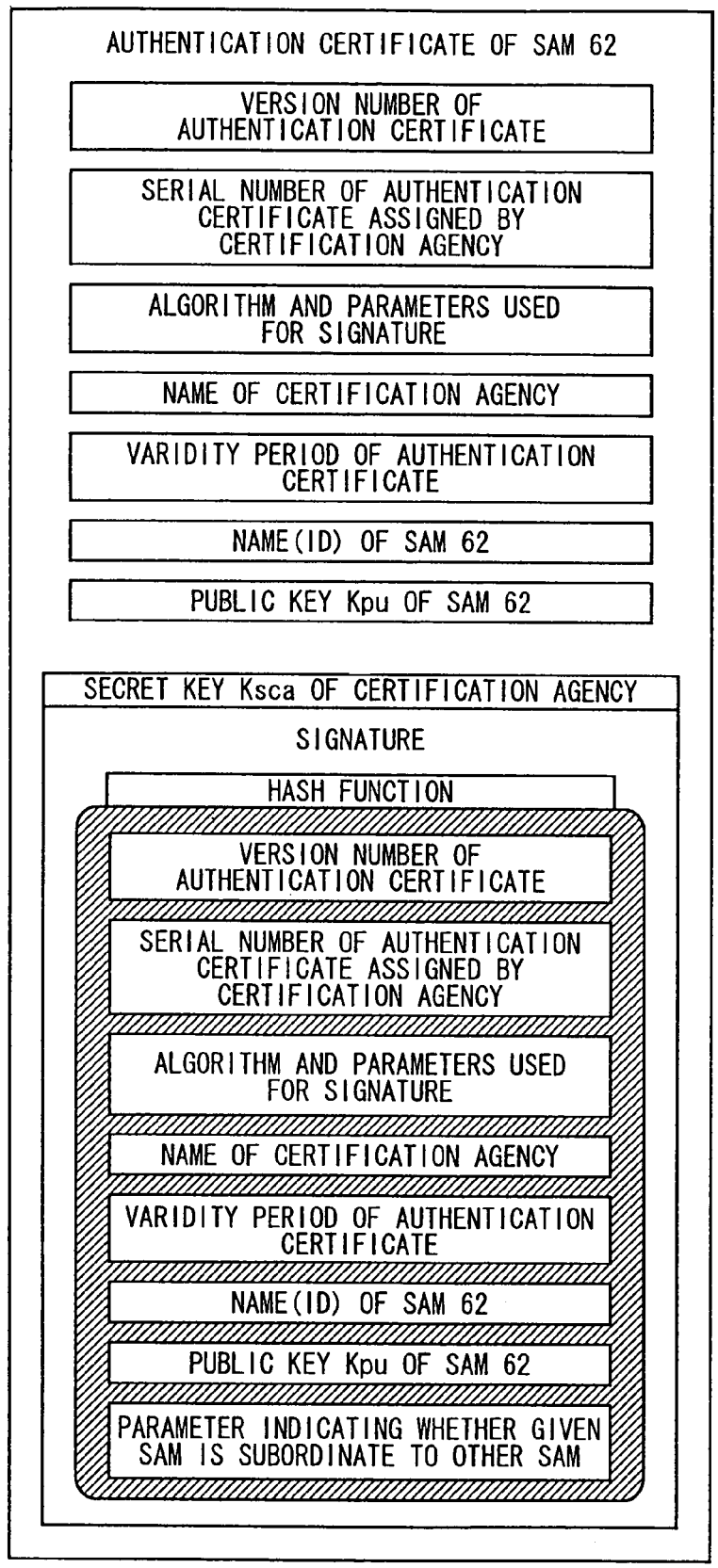
FIG. 20 is a schematic diagram showing an example authentication certificate of SAM 62 of the receiver 51.

The mutual authentication module 71 of SAM 62 sends SAM 62 authentication certificate (shown in FIG. 20) stored in the memory module 73 to the partner of mutual authentication, performs mutual authentication, and supplies the temporary key Ktemp (session key) consequently shared by the partner of mutual authentication to the encryption/decryption module 74. The authentication certificate of SAM contains information that corresponds to the information contained in the authentication certificate (FIG. 14) of the content provider 2 and authentication certificate (FIG. 18) of the service provider 3. Therefore, its description is omitted.

The accounting module 72 prepares usage control status (UCS) and accounting information based on the usage details of the selected UCP. FIG. 21 shows an example of UCS when the rights for content have been purchased according to the use type 'Limited-Time Reproduction.' It shows UCS A generated based on the usage details 13 in UCP A shown in FIG. 10 and "Price 13" on PT A-1 shown in FIG. 16(A). As shown in FIG. 21, UCS contains the information specified in "Content ID," "Content Provider ID," "UCP ID," "UCP Validity Period," "Service Provider ID," "PT ID," "PT Validity Period," "UCS ID," "SAM ID," "User ID," "Usage Details," and "Usage History."

"Content ID," "Content Provider ID," "UCP ID," "UCP Validity Period," "Service Provider ID," "PT ID," "PT Validity Period" of UCS contain the information specified in the corresponding items of the PT. Thus, in the case of UCS A in FIG. 21, "Content ID" contains the ID of content A, "Content Provider ID" contains the ID of the content provider 2, "UCP ID" contains the ID of UCP A, "UCP Validity Period" contains the validity period of UCP A, "Service Provider ID" contains the ID of the service provider 3, "PT ID" contains the ID of PT A-1, and "PT Validity Period" contains the validity period of PT A-1.

"UCS ID" contains the ID assigned to the given UCS, and thus "UCS ID" of UCS A contains the ID of UCS A. "SAM ID" contains the ID of the equipment and "SAM ID" of UCS A contains the SAM 62 ID of the receiver 51. "User ID" contains the ID of the user who uses the content and "User ID" of UCS A contains the ID of user F.

"Usage Details" consists of items "ID," "Type," "Parameter," and "Control Transfer Status." Of these items, "ID," "Type," and "Parameter" contain the information specified in the corresponding items of "Usage Details" of the selected UCP. Thus, "ID" of UCSA contains the information (ID of Usage Details 13) specified in "ID 13" of "Usage Details 13" of UCP A, "Type" is set to 'Limited-Time Reproduction' specified in "Type 13" of "Usage Details 13," and "Parameter" contains the information (Start Time and End Time) specified in "Parameter 13" of "Usage Details 13."

"Control Transfer Status" of "Usage Details" contains the respective IDs of the source equipment (equipment that has purchased the content) and destination equipment if "Control Transfer Permission Information" of the selected UCP is set to 'Permitted' (i.e., control transfer is possible). If no control transfer is performed, the ID of the source equipment is used as the ID of the destination equipment. If "Control Transfer Permission Information" of the UCP is set to 'Not Permitted,' "Control Transfer Status" should be set to 'Not Permitted.' In that case, control transfer of the content is not performed (not permitted). In "Control Transfer Status" of UCS A, the IDs of both source and destination equipment are set to the ID of SAM 62 because "Control Transfer Permission Information 13" of "Usage Details 13" of UCP A is set to 'Permitted' and because the control of content A is not transferred.

"Usage History" contains the history of use types for the same content. Only information that represents 'Limited-Time Reproduction' is stored now in "Usage History" of UCS A. For example, if the receiver 51 has used content A before, information that represents the then use type is also stored.

In the case of the UCS described above, "UCP Validity Period" and "PT Validity Period" have been specified. However, these items may not be specified for the UCS. Also, although "Content Provider ID" has been specified for the above UCS, it may not be specified if the UCP ID is unique enough to identify the content provider. Similarly, "Service Provider ID" may not be specified if the PT ID is unique enough to identify the service provider.

Figure 22:
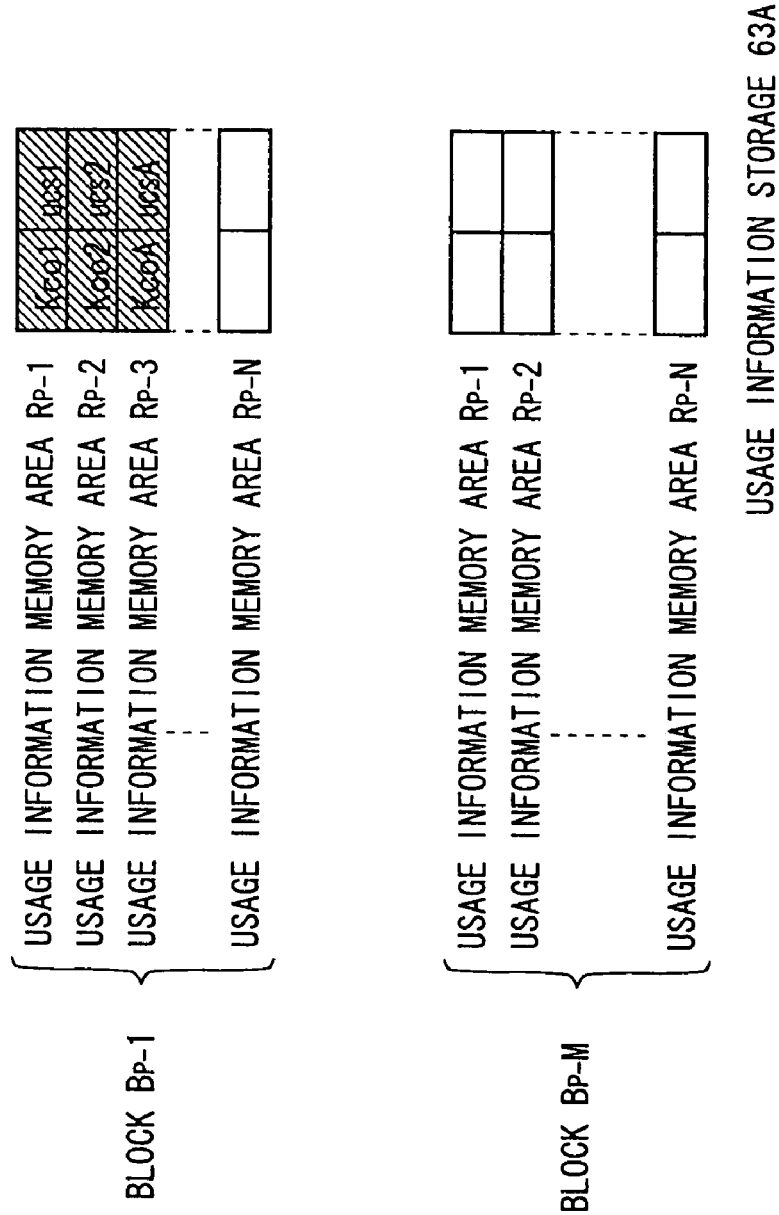
FIG. 22 is a schematic diagram illustrating the internal structure of the usage information storage 63A in the external storage 63 of the receiver 51.

The UCS prepared is sent to the external storage 63 and stored in its usage information storage 63A, together with the content keys Kco (encrypted with a save key Ksave) supplied by the decryption unit 91 of the encryption/decryption module 74 of the receiver 51. As shown in FIG. 22, the usage information storage 63A of the external storage 63 are divided into M number of blocks (1 MB each, for example): BP-1 to BP-M. Each block BP, in turn, is divided into N number of usage information memory areas: RP-1 to RP-N. The content keys Kco (encrypted with a save key Ksave) and UCS supplied by SAM 62 are stored, in matched pairs, in the appropriate usage information memory areas RP of the usage information storage 63A.

In the example of FIG. 22, the UCS A shown in FIG. 21 and the content key KcoA (encrypted with a save key Ksave) are stored, in matched pairs, in the usage information memory area RP-3 of the block BP-1. Other content keys Kco1 and Kco2 (encrypted with a save key Ksave) and usage control status UCS 1 and 2 are stored in the usage information memory areas RP-1 and RP-2 of the block BP-1. The usage information memory areas RP-4 (not shown) to RP-N of the block BP-1 as well as blocks BP-2 (not shown) to BP-M currently do not store any content key Kco or usage control status UCS and contain the initial information which indicates that they are empty. Hereafter, the content keys Kco (encrypted with a save key Ksave) and UCS stored in the usage information memory areas RP will be collectively referred to as usage information if there is no need to treat them separately.

FIG. 23 shows the accounting information A prepared together with UCS A shown in FIG. 21. As shown in FIG. 23, accounting information contains "Content ID," "Content Provider ID," "UCP ID," "UCP Validity Period," "Service Provider ID," "PT ID," "PT Validity Period," "UCS ID," "SAM ID," "User ID," and "Usage Details."

"Content ID," "Content Provider ID," "UCP ID," "UCP Validity Period," "Service Provider ID," "PT ID," "PT Validity Period," "UCS ID," "SAM ID," "User ID," and "Usage Details" of the accounting information contain the information specified in the corresponding items of the UCS. Thus, in the case of the accounting information A in FIG. 23, "Content ID" contains the ID of the content A, "Content Provider ID" contains the ID of the content provider 2, "UCP ID" contains the ID of UCP A, "UCP Validity Period" contains the validity period of UCP A, "Service Provider ID" contains the ID of the service provider 3, "PT ID" contains the ID of PT A-1, "PT Validity Period" contains the validity period of PT A-1, "UCS ID" contains the ID of UCS A, "SAM ID" contains the ID of SAM 62, "User ID" contains the ID of user F of the receiver 51, and "Usage Details" contains the information specified in "Usage Details 13" of UCS A.

In the accounting information descried above, although "UCP Validity Period" and "PT Validity Period" have been specified, they may not be specified for the UCS. Also, although "Content Provider ID" has been specified in the accounting information described above, it may not be specified if the UCP ID is unique enough to identify the content provider. Similarly, "Service Provider ID" may not be specified if the PT ID is unique enough to identify the service provider.

Figure 24:
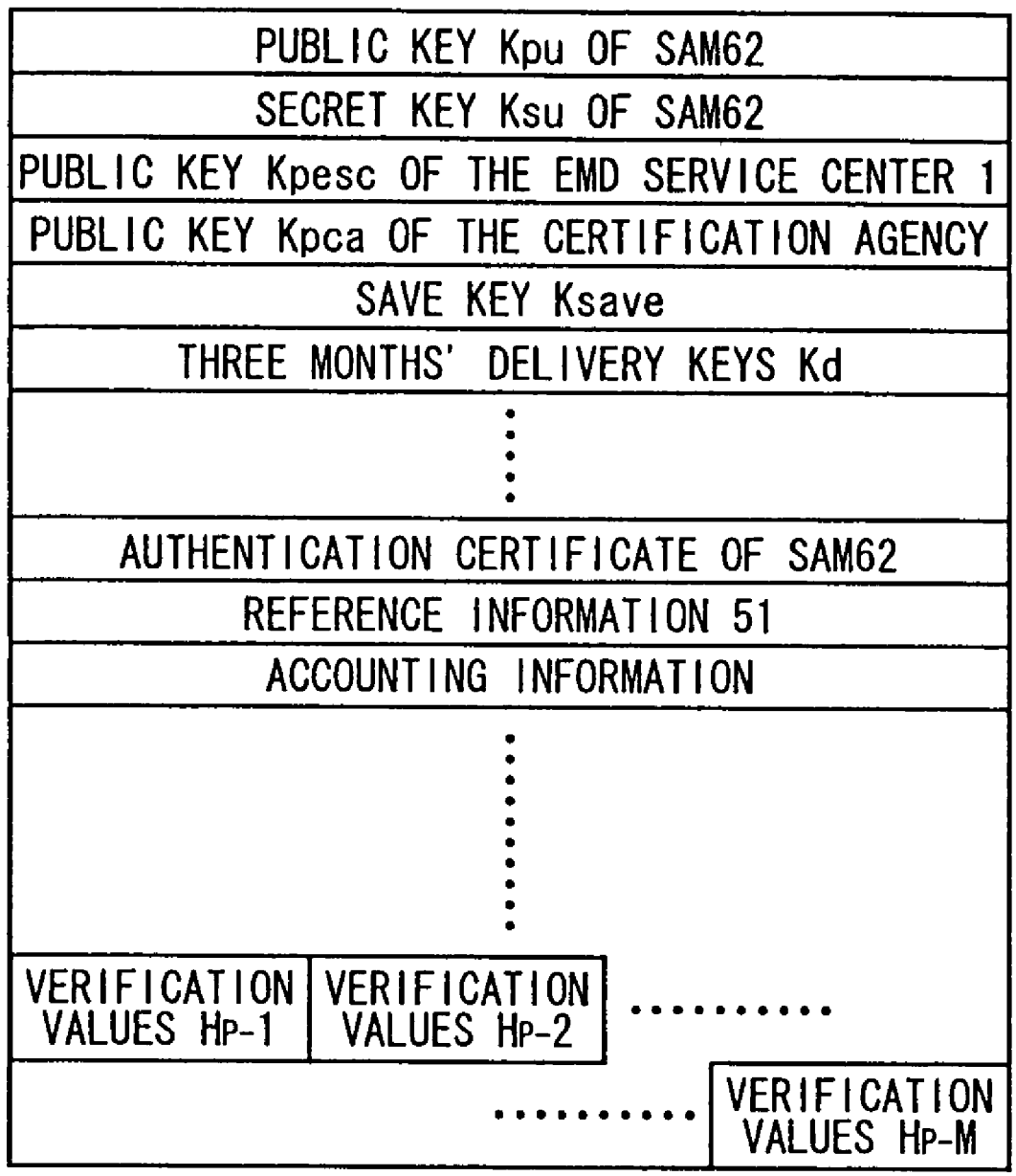
FIG. 24 is a chart showing the information stored in the memory module 73 of the receiver 51.

Returning to FIG. 19, the memory module 73 stores keys such as the public key Kpu of SAM 62, the secret key Ksu of SAM 62, the public key Kpesc of the EMD service center 1, the public key Kpca of the certification agency, the save key Ksave, and three months' delivery keys Kd, the authentication certificate of SAM 62, accounting information (for example, the accounting information A in FIG. 23), reference information 51, and M number of verification values HP-1 to HP-M, as shown in FIG. 24.

The verification value HP-1 stored in the memory module 73 is the hash value obtained by the application of a hash function to all the data stored in block BP-1 of the usage information storage 63A (FIG. 22) of the external storage 63. The verification values HP-2 to HP-M are hash values obtained by the application of the hash function to the data stored in the corresponding blocks BP-2 to BP-M of the external storage 63, as is the case with the verification value HP-1.

FIG. 25 shows the reference information 51 stored in the memory module 73. The reference information contains predetermined information specified for each of the items of "SAM ID," "Equipment Number," "Settlement ID," "Charge Limit," "Account-Settling User Information," "Subordinate User Information," and "Use Point Information."

"SAM ID," "Equipment Number," "Settlement ID," "Account-Settling User Information," "Subordinate User Information," and "Use Point Information" of the reference information contains the information specified for the items corresponding to the ID of SAM 62 in the system registration information managed by the user management section 18 of the EMD service-center 1. Thus, the reference information 51 contains the ID of SAM 62, equipment number (100) of SAM 62, settlement ID of user F, account-settling user information of user F (general information (the name, address, phone number, settlement institution information, date of birth, age, and sex), ID, and password of user F), and use point information of the receiver 51.

"Charge Limit" contains the upper limit on amounts charged, which varies depending on whether the given equipment is registered formally or temporality.

"Charge Limit" of the reference information 51 contains the upper limit on amounts charged for formally registered equipment ('Formal Registration') because the receiver 51 has been formally registered.

Returning to FIG. 19, the encryption/decryption module 74 of SAM 62 consists of an decryption unit 91, random number generator unit 92, and encryption unit 93. The decryption unit 91 decrypts the encrypted content key Kco with the delivery key Kd and outputs the results to the encryption unit 93. The random number generator unit 92 generates a random number with predetermined digits during mutual authentication, generates a temporary key Ktemp as required, and outputs them to the encryption unit 93.

The encryption unit 93 encrypts the decrypted content key Kco again with the save key Ksave stored in the memory module 73. The encrypted content key Kco is supplied to the external storage 63. When sending the content key Kco to the decompression section 64, the encryption unit 93 encrypts it with the temporary key Ktemp generated by the random number generator unit 92.

The data check module 75 checks the data in a block BP of the usage information storage 63A of the external storage 63 for falsification by comparing the hash value of the data stored in the block BP with the corresponding verification value HP stored in the memory module 73.

The decompression section 64 consists of a mutual authentication module 101, decryption module 102, decryption module 103, decompression module 104, and watermarking module 105. The mutual authentication module 101 performs mutual authentication with SAM 62 and outputs the temporary key Ktemp to the decryption module 102. The decryption module 102 uses the temporary key Ktemp to decrypt the content key Kco encrypted by the temporary key Ktemp, and outputs the results to the decryption module 103. The decryption module 103 decrypts the content recorded on the HDD 52, with the content key Kco, and outputs the results to the decompression module 104. The decompression module 104 further decompresses the decrypted content by a method such as ATRAC2 and outputs the results to the watermarking module 105. The watermarking module 105 watermarks the content for identification of the receiver 51 and outputs the results to speakers (not shown) to reproduce music.

The communications block 65 communicates with the receivers 201 and 301 of the user home network 5. The interface 66 converts the signals from SAM 62 and the decompression section 64 into a specified form and outputs the results to the HDD 52. It also converts the signals from the HDD 52 into a specified form and outputs the results to SAM 62 and the decompression section 64.

The display controller 67 controls the output to a display unit (not shown). The input controller 68 controls the input from an operator panel (not shown) consisting of various buttons.

The HDD 52 stores registration lists like the one shown in FIG. 26 in addition to the content and the like supplied by the service provider 3. The registration list consists of the list section that stores tabulates information and the SAM information section that stores specified information about the equipment that possesses the given registration list.

The SAM information section stores (in the "SAM ID" field) the SAM ID of the equipment that possesses the given registration list, in this example, the SAM 62 ID of the receiver 51. It also stores the validity period of the registration list (in the "Validity Period" field), version number of the registration list (in the "Version Number" field), and number of equipment connected (including this equipment) (in the "Number of Equipment Connected" field), which is three in total, in this example, including the receiver 51 itself and the two receivers 201 and 301 connected to it.

The list section consists of nine items "SAM ID," "User ID," "Purchasing," "Accounting," "Equipment Billed," "Master Equipment," "Status Flag," "Signature to Conditions," and "Signature to Registration List" and, in this example, stores the registration conditions of the receivers 51, 201 and 301.

"SAM ID" stores the SAM ID of the equipment. In this example, the SAM 62 ID of the receiver 51, SAM 212 ID of the receiver 201, and the SAM 311 ID of the receiver 301 are stored. "User ID" stores the ID of the account-settling user. In this example, the ID of user F is stored in "User ID" for receivers 51, 201, and 301.

"Purchasing" stores information ('Yes' or 'No') which indicates whether the equipment can purchase content. In this example, since the receivers 51 and 201 can purchase content, 'Yes' is stored in the appropriate rows of the "Purchasing" column. However, the receiver 301 cannot purchase content, so 'No' is stored in the appropriate row of the "Purchasing" column.

"Accounting" stores information ('Yes' or 'No') which indicates whether the equipment can perform accounting in communication with the EMD service center 1. In this example, the receivers 51 and 201 can perform accounting and thus the appropriate rows of the "Accounting" column store 'Yes.' On the other hand, the receiver 301 cannot perform accounting, so the appropriate row of the "Accounting" column stores 'No.'

"Equipment Billed" stores the SAM ID of the equipment with which accounts are settled. In this example, since the receivers 51 and 201 can perform accounting for themselves, their own SAM IDs are stored in the appropriate rows of the "Equipment Billed" column. Since the receiver 301 neither purchases content nor performs accounting, the appropriate row of the "Equipment Billed" column stores 'None.'

"Master Equipment" stores the SAM ID of the connected equipment that can provide content if the given equipment receives content from other equipment connected rather than from the service provider 3. In this example, the receiver 51 receives content from the service provider 3, so "Master Equipment" stores information ('None') which indicates that there is no equipment providing content. The receivers 201 and 301 receive content from the receiver 51, and thus "Master Equipment" contains the SAM 62 ID of the receiver 51.

"Status Flag" stores any restrictions to the operation of the equipment. If there is no such restriction, appropriate information ('No Restriction') is stored. If there are any restrictions or if there is any condition that will stop the operation, appropriate information ('Restricted' or 'Stop,' respectively) is stored. For example, if settlement of accounts has failed, "Status Flag" of that equipment is set to 'Restricted.' In this example, the equipment with its "Status Flag" set to 'Restricted' can use the content already purchased, but cannot purchase new content. In short, certain restrictions are placed on the equipment. Besides, if illegal acts such as illegal duplication of content are detected, "Status Flag" is set to 'Stop' and the operation of the equipment is stopped. Consequently, the equipment can no longer receive any service from the EMD system.

In this example, no restriction is placed on the receivers 51, 201, or 301 and their "Status Flag" is set to 'No Restriction.' The statuses, such as 'Restricted' and 'Stop,' which restrict the operation of the receiver will be collectively referred to as operational restriction information if there is no need to address them individually.

"Signature to Conditions" stores the signature of the EMD service center 1 to the information stored in "SAM ID," "User ID," "Purchasing," "Accounting," "Equipment Billed," "Master Equipment," and "Status Flag." "Signature to Registration List" stores the signature to the entire data specified in the registration list.

(5-2) Receiver 201

Figure 27:
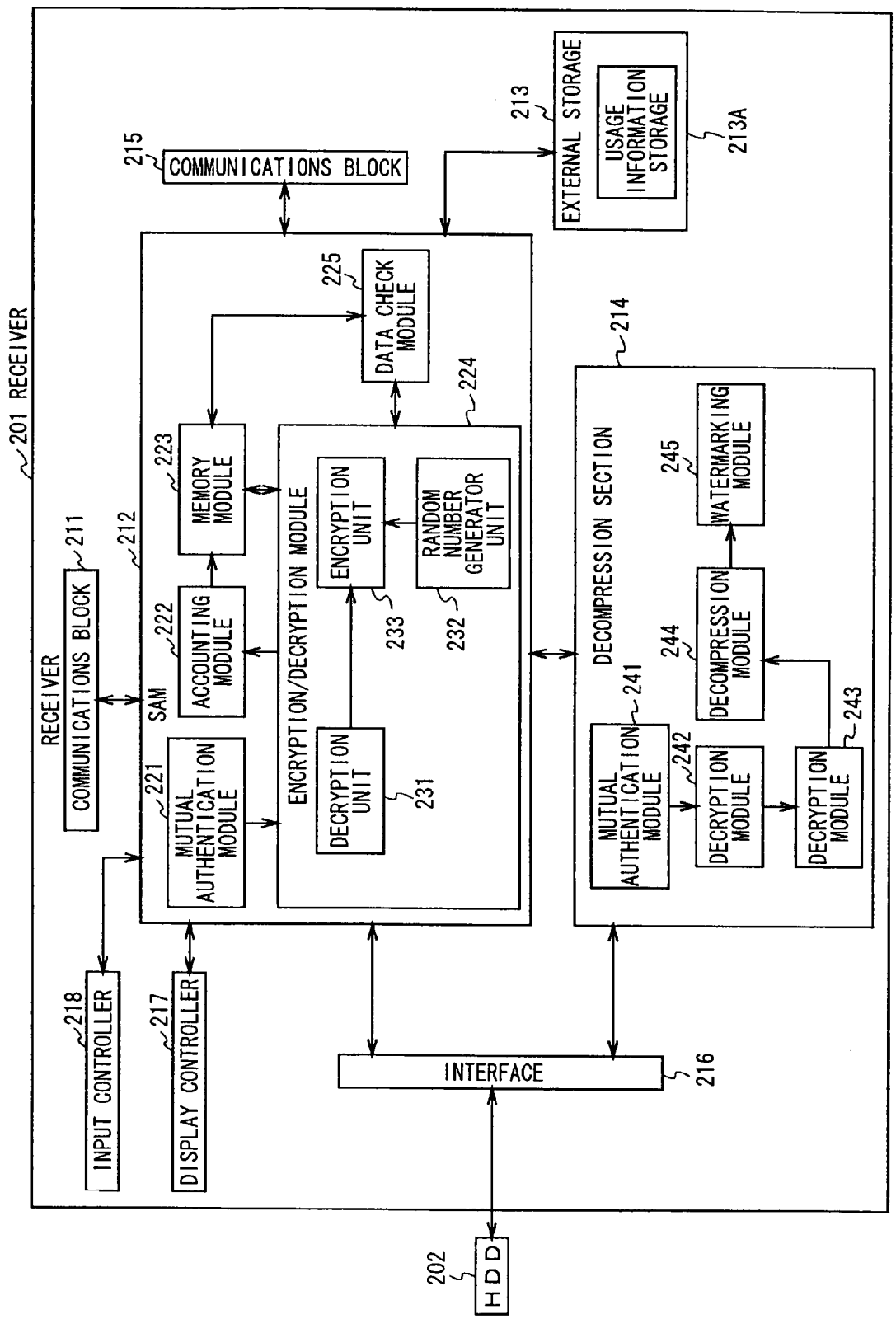
FIG. 27 is a block diagram showing an example functional configuration of a receiver 201 in the user home network 5.

FIG. 27 shows an example configuration of the receiver 201. The components from the communications block 211 to input controller 218 of the receiver 201 have functions similar to those of the communications block 61 to the input controller 68 of the receiver 51. Thus, their detailed description is omitted where possible. However, the memory module 223 of the receiver 201 stores reference information 201 such as the one shown in FIG. 28. The reference information 201 contains the information specified for the items corresponding to the SAM 212 ID in the system registration information managed by the user management section 18 of the EMD service center 1. Thus, the reference information 201 contains the ID of SAM 212, equipment number (100) of receiver 201, settlement ID of user F, account-settling user information of user F (general information (the name, address, phone number, settlement institution information, date of birth, age, and sex), ID, and password of user F), subordinate user information of user A (general information (the name, address, phone number, date of birth, and sex), ID, and password of user A), and use point information of the receiver 201. "Charge Limit" is set to 'Formal Registration.'

HDD 202 stores information similar to that stored in HDD 51, and thus description thereof is omitted. It stores the registration list of the receiver 201 as shown in FIG. 29. The SAM information section of the registration list stores the SAM 212 ID of the receiver 201, the validity period of the registration list, version number of the registration list, and number of equipment connected (which is two in total, including the receiver 201 itself and the receiver 51 connected to it). The list section stores the registration conditions of the receivers 51 and 201 shown in the registration list of the receiver 51 in FIG. 26.

(5-3) Receiver 301

Figure 30:
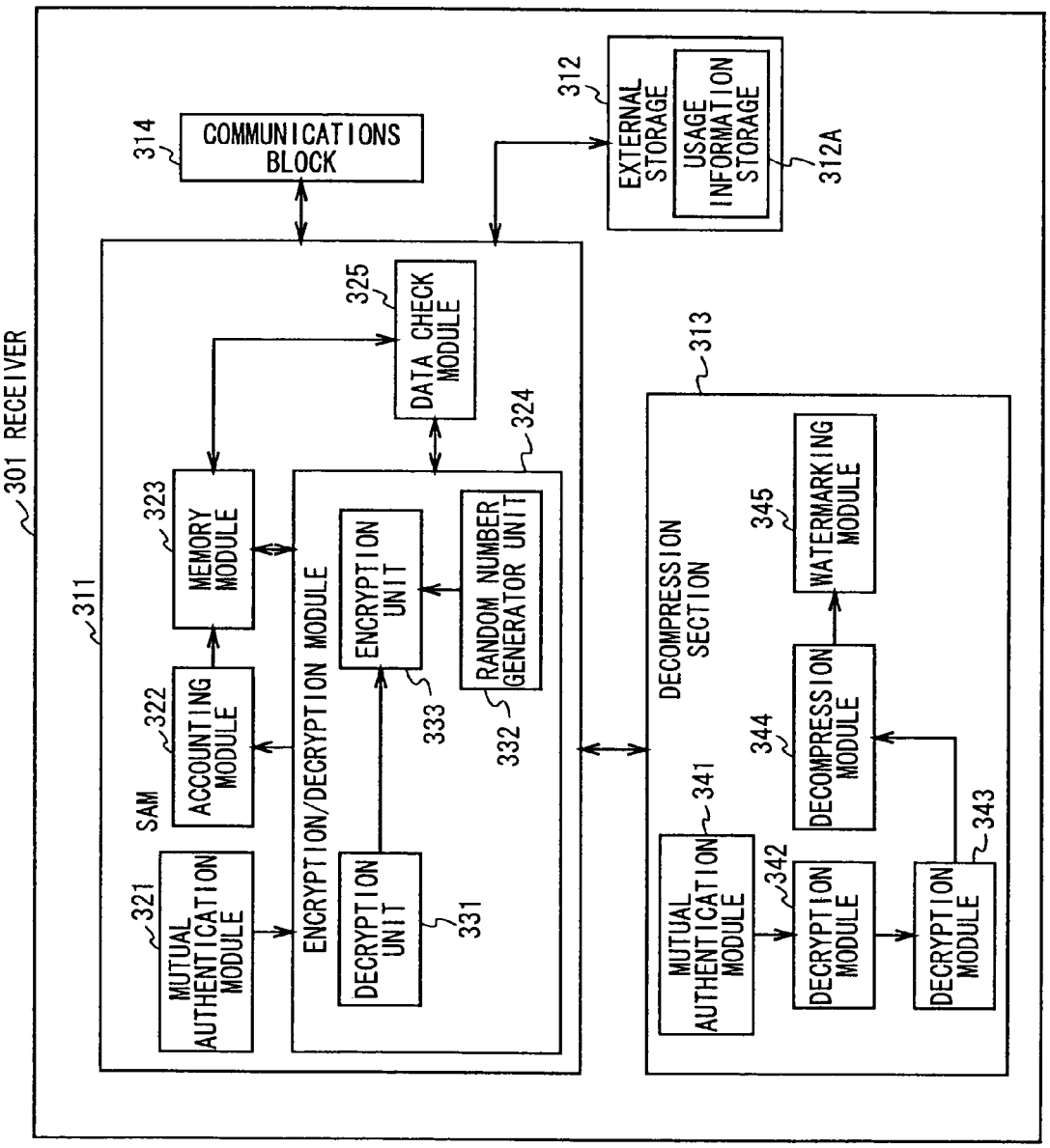
FIG. 30 is a block diagram showing an example functional configuration of a receiver 301 in the user home network 5.

FIG. 30 shows an example configuration of the receiver 301. The components from SAM 311 to the communications block 314 of the receiver 301 have basically the same functions as SAM 212 to the communications block 215 of the receiver 201. However, the receiver 301 does not have any function that corresponds to the communications block 211, interface 216, display controller 217, and input controller 218 of the receiver 201 because it is portable equipment.

FIG. 31 shows the reference information 301 stored in the memory module 323 of the receiver 301. The reference information 301 contains the information specified for the items corresponding to the SAM 311 ID in the system registration information managed by the user management section 18 of the EMD service center 1. Thus, the reference information 301 contains the ID of SAM 311, equipment number (25) of SAM 311, settlement ID of user F, account-settling user information of user F (general information (the name, address, phone number, settlement institution information, date of birth, age, and sex), ID, and password of user F), subordinate user information of user A (general information (the name, address, phone number, date of birth, and sex), ID, and password of user A), and use point information of the receiver 301. "Charge Limit" contains the upper limit for formally registered equipment ('Formal Registration') because the receiver 301 has been registered formally.

The registration list of the receiver 301 shown in FIG. 32 is stored in the memory module 323. The SAM information section of the registration list stores (in the "SAM ID" field) the SAM 311 ID of the receiver 301 that possesses this registration list, validity period of the registration list (in the "Validity Period" field), version number of the registration list (in the "Version Number" field), and number of equipment connected (including this equipment) (in the "Number of Equipment Connected" field), which is two in total, in this example, including the receiver 301 itself and the receiver 51 connected to it. The list section stores the registration conditions of the receiver 301 shown in the registration list of the receiver 51 in FIG. 26. However, the "Signature to Conditions" and "Signature to Registration List" columns have been deleted. They were deleted after the signature to the registration list was confirmed. This saves storage space in the memory module 323. In this example, one signature requires 40 bytes.

(6) Purchasing and Utilization of Content

Now the processing in the EMD system will be described with reference to the flow chart in FIG. 33. Here it is assumed that user F purchases and uses content A via the receiver 51.

(6-1) Transmission of Delivery Keys From EMD Service Center to Content Provider

Figure 34:
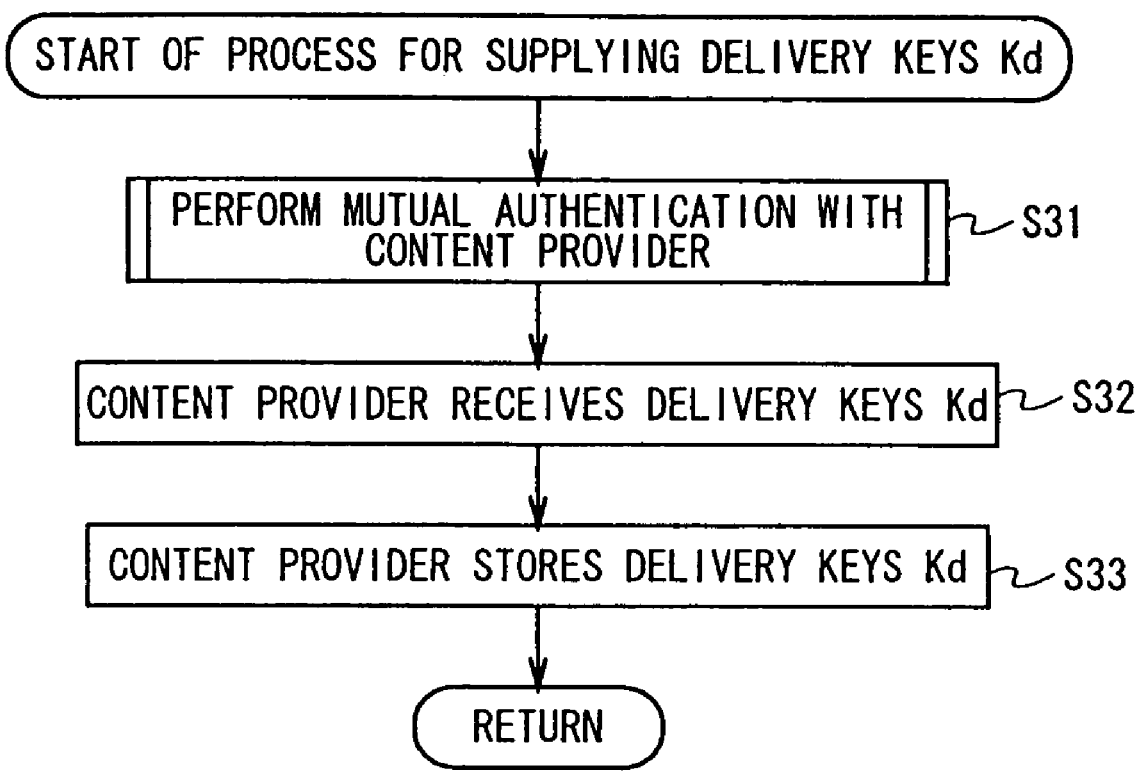
FIG. 34 is a flow chart illustrating the process of sending delivery keys Kd from the EMD service center 1 to the content provider 2.

In Step S11, the delivery keys Kd are supplied to the content provider 2 by the EMD service center 1. Details of this process is shown in the flow chart of FIG. 34. In Step S31, the mutual authentication section 17 of the EMD service center 1 performs mutual authentication with the mutual authentication section 39 of the content provider 2. When the authenticity of the content provider 2 is verified, the content provider management section 12 of the EMD service center 1 sends the delivery keys Kd supplied by the key server 14, to the content provider 2. Details of mutual authentication will be described later with reference to FIGS. 35 to 37.

In Step S32, the encryption section 36 of the content provider 2 receives the delivery keys Kd sent from the EMD service center 1, and stores them in Step S33.

Figure 33:
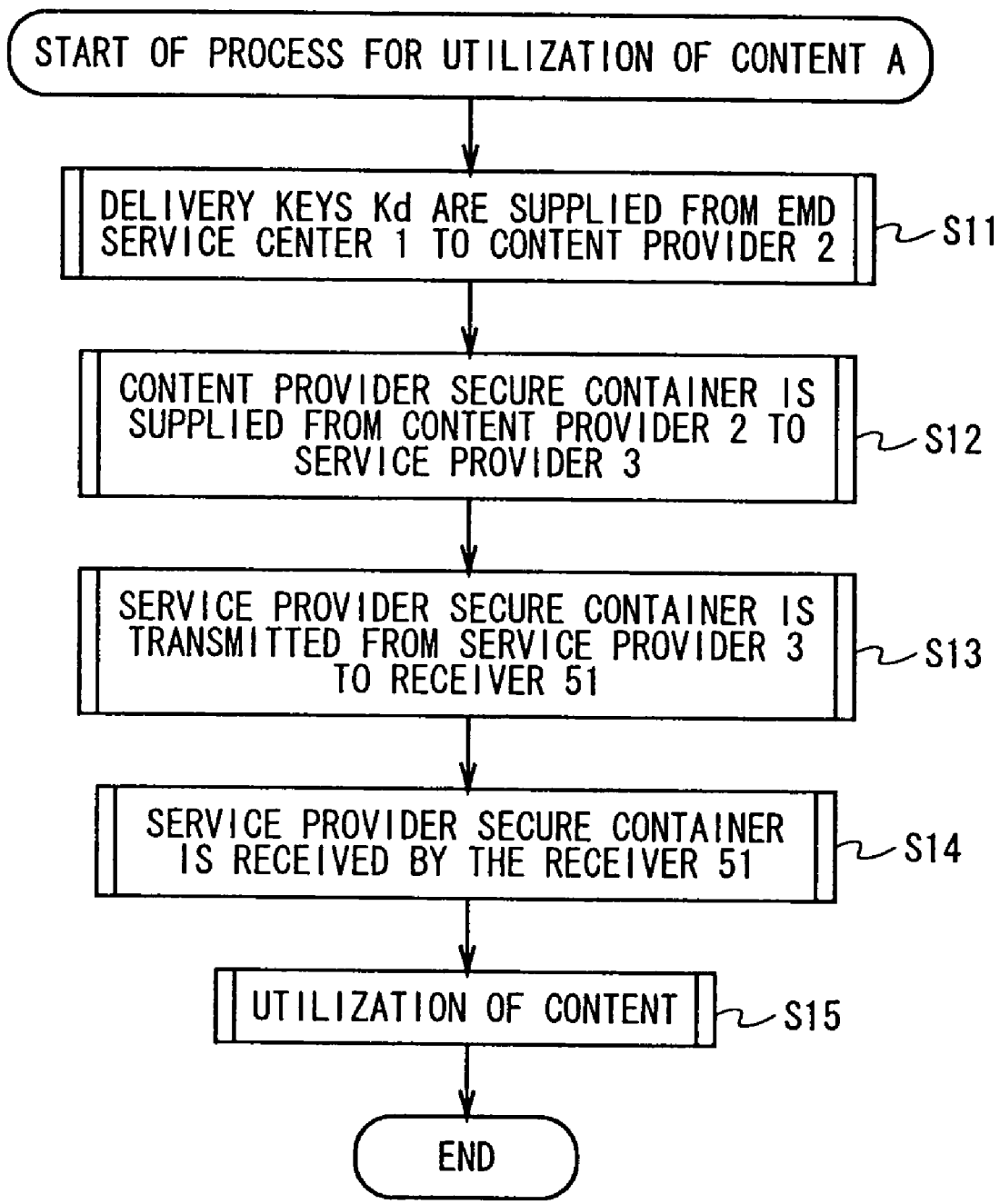
FIG. 33 is a flow chart illustrating process for utilization of content.

When the encryption section 36 of the content provider 2 stores the delivery keys Kd, the process of Step S11 finishes and Step S12 in FIG. 33 begins. Before explaining the process of Step S12, the mutual authentication (process of checking for spoofing) in Step S31 of FIG. 34 will be described, taking the case in which one common key is used (FIG. 35), the case in which two common keys are used (FIG. 36), and the case in which a public key is used (FIG. 37).

Figure 35:
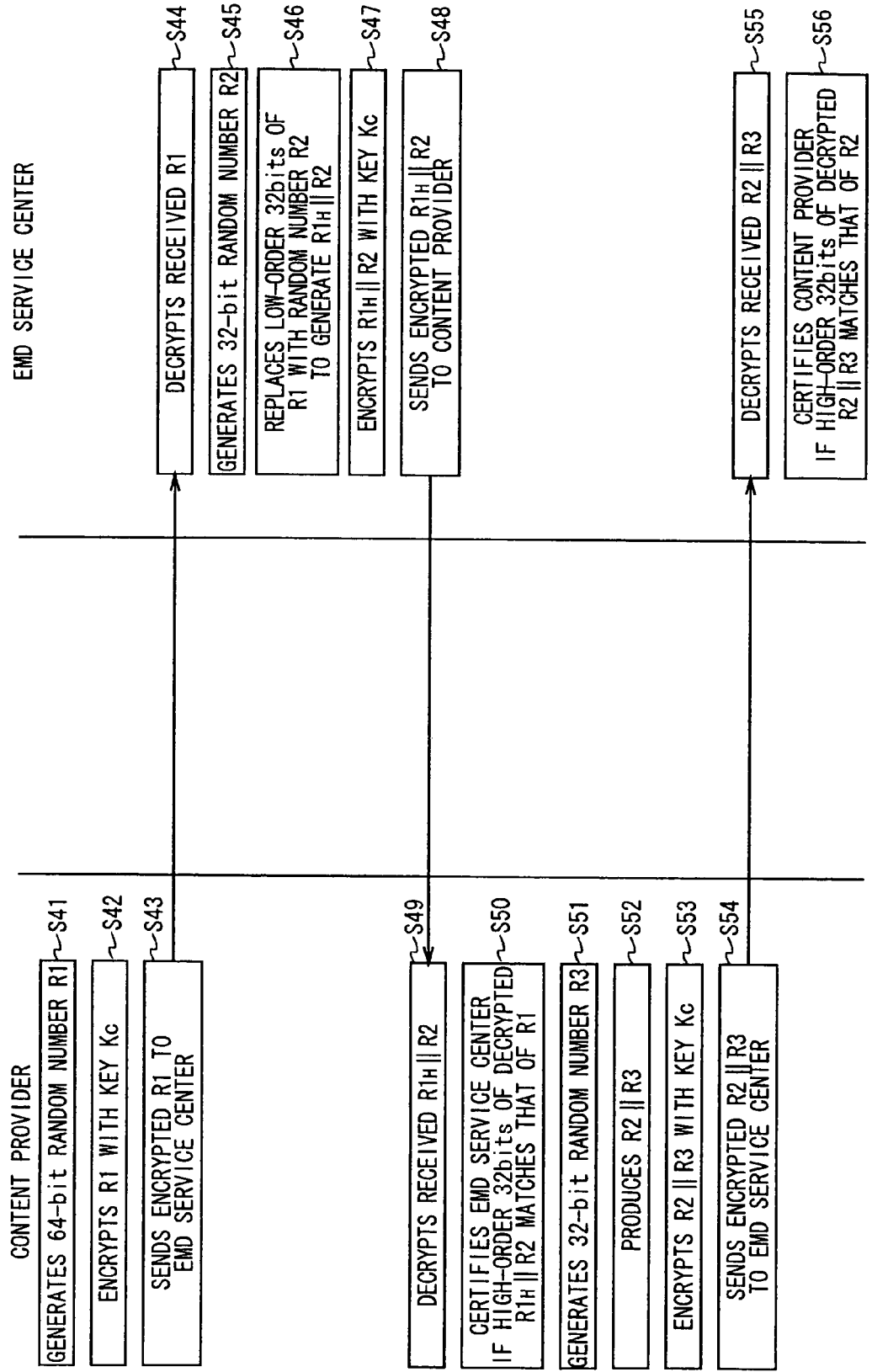
FIG. 35 is a flow chart illustrating a flow of mutual authentication between the content provider 2 and EMD service center 1.

FIG. 35 is a flow chart which describes the use of one common key in common-key DES cryptography for the operation of mutual authentication between the mutual authentication section 39 of the content provider 2 and mutual authentication section 17 of the EMD service center 1. In Step S41, the mutual authentication section 39 of the content provider 2 generates a 64-bit random number R1 (it may also be generated by the random number generator section 35). In Step S42, the mutual authentication section 39 of the content provider 2 DES-encrypts the random number R1 with a prestored common key Kc (it is also possible to make the encryption section 36 perform the encryption). In Step S43, the mutual authentication section 39 of the content provider 2 sends the encrypted random number R1 to the mutual authentication section 17 of the EMD service center 1.

In Step S44, the mutual authentication section 17 of the EMD service center 1 decrypts the received random number R1 with a prestored common key Kc. In Step S45, the mutual authentication section 17 of the EMD service center 1 generates a 32-bit random number R2. In Step S46, the mutual authentication section 17 of the EMD service center 1 replaces the low-order 32 bits of the decrypted 64-bit random number R1 with the random number R2 to generate a concatenation R1$_H$∥R2, where Ri$_H$ is the high order n bits of Ri and A∥B is a concatenation of A and B (the low-order n bits of A and m-bit B are concatenated to produce n+m bits). In Step S47, the mutual authentication section 17 of the EMD service center 1 DES-encrypts R1$_H$∥R2 with the common key Kc. In Step S48, the mutual authentication section 17 of the EMD service center 1 sends the encrypted R1$_H$∥R2 to the content provider 2.

In Step S49, the mutual authentication section 39 of the content provider 2 decrypts the received R1$_H$∥R2 with the common key Kc. In Step S50, the mutual authentication section 39 of the content provider 2 checks the high-order 32 bits of the decrypted R1$_H$∥R2 against the high-order 32 bits R1$_H$ of the random number R1 generated in Step S41, and if they match, it certifies that the EMD service center 1 is legitimate. If the generated R1$_H$ and received R1$_H$ do not match, the process is terminated. If they match, the mutual authentication section 39 of the content provider 2 generates a 32-bit random number R3 in Step S51. In Step S52, the mutual authentication section 39 of the content provider 2 produces a concatenation R2∥R3 by placing the random number R2, which is the low-order 32 bits taken out of the received and decrypted R1$_H$∥R2, in the high-order position and placing the generated random number R3 in the low-order position. In Step S53, the mutual authentication section 39 of the content provider 2 DES-encrypts R2∥R3 with the common key Kc. In Step S54, the mutual authentication section 39 of the content provider 2 sends the encrypted concatenation R2∥R3 to the mutual authentication section 17 of the EMD service center 1.

In Step S55, the mutual authentication section 17 of the EMD service center 1 decrypts the received concatenation R2∥R3 with the common key Kc. In Step S56, the mutual authentication section 17 of the EMD service center 1 checks the high-order 32 bits of the decrypted concatenation R2∥R3 against the random number R2. If they match, it certifies that the content provider 2 is legitimate. If they do not, it terminates the process, determining that the content provider 2 is illegitimate.

Figure 36:
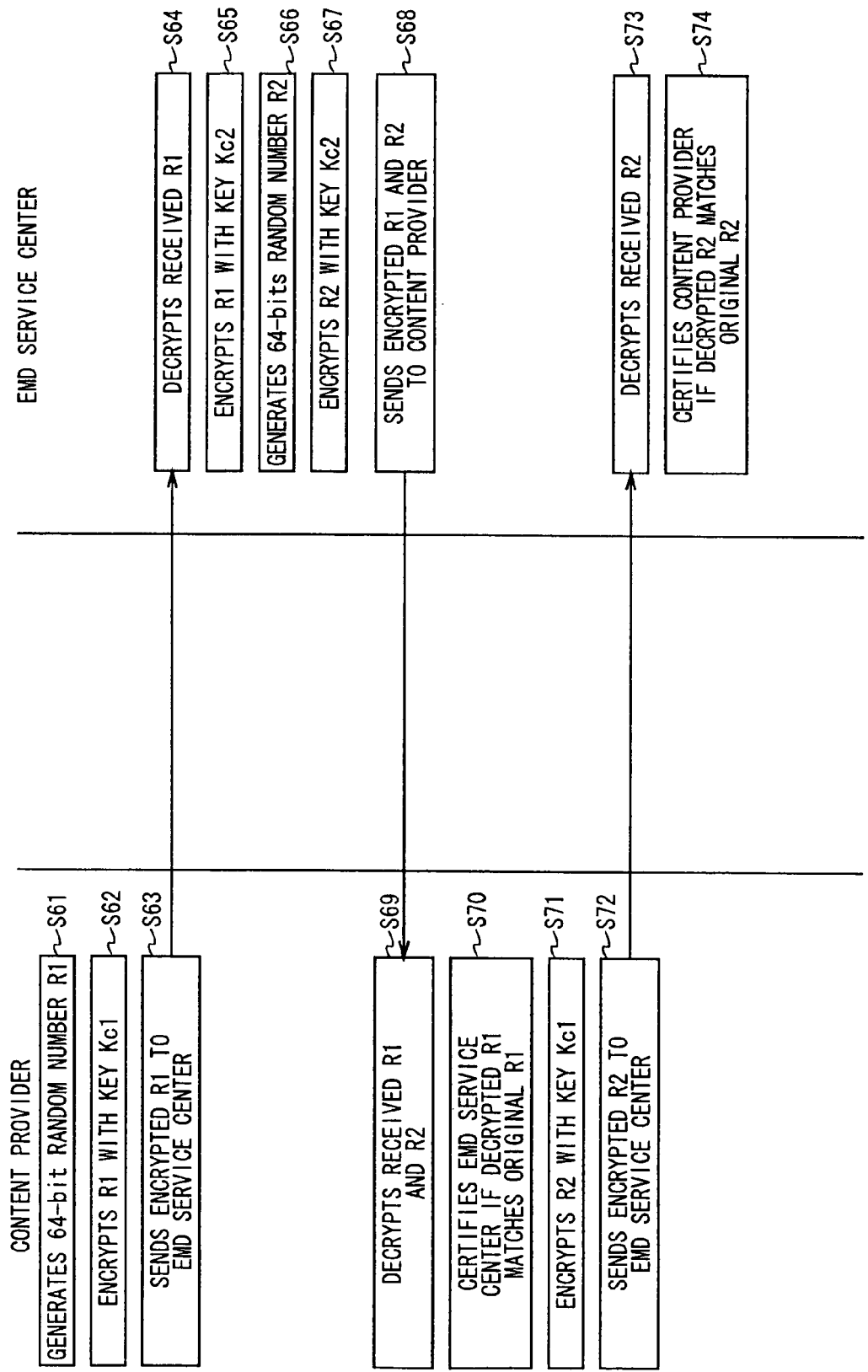
FIG. 36 is a flow chart illustrating another flow of mutual authentication between the content provider 2 and EMD service center 1.
Figure 37:
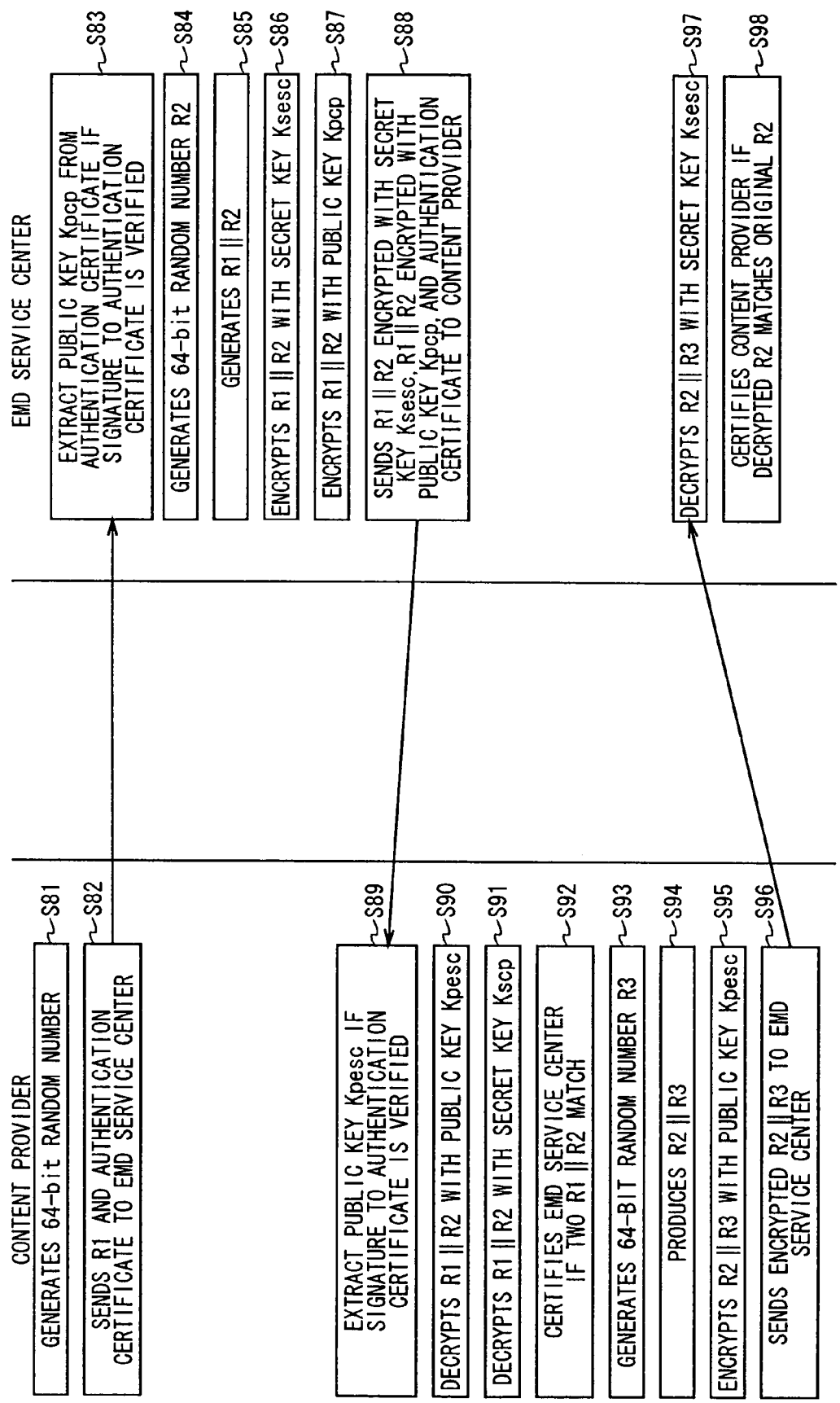
FIG. 37 is a flow chart illustrating another flow of mutual authentication between the content provider 2 and EMD service center 1.

FIG. 36 is a flow chart which describes the use of two common keys Kc1 and Kc2 in common-key DES cryptography for the operation of mutual authentication between the mutual authentication section 39 of the content provider 2 and mutual authentication section 17 of the EMD service center 1. In Step S61, the mutual authentication section 39 of the content provider 2 generates a 64-bit random number R1. In Step S62, the mutual authentication section 39 of the content provider 2 DES-encrypts the random number R1 with a prestored common key Kc1. In Step S63, the mutual authentication section 39 of the content provider 2 sends the encrypted random number R1 to the EMD service center 1.

In Step S64, the mutual authentication section 17 of the EMD service center 1 decrypts the received random number R1 with a prestored common key Kc1. In Step S65, the mutual authentication section 17 of the EMD service center 1 encrypts the random number R1 with a prestored common key Kc2. In Step S66, the mutual authentication section 17 of the EMD service center 1 generates a 64-bit random number R2. In Step S67, the mutual authentication section 17 of the EMD service center 1 encrypts the random number R2 with the common key Kc2. In Step S68, the mutual authentication section 17 of the EMD service center 1 sends the encrypted random numbers R1 and R2 to the mutual authentication section 39 of the content provider 2.

In Step S69, the mutual authentication section 39 of the content provider 2 decrypts the received random numbers R1 and R2 with a prestored common key Kc2. In Step S70, the mutual authentication section 39 of the content provider 2 checks the decrypted random number R1 against the random number R1 generated in Step S61 (the random number R1 before encryption). If they match, it certifies that the EMD service center 1 is legitimate. If they do not match, it terminates the process, determining that the EMD service center 1 is illegitimate. In Step S71, the mutual authentication section 39 of the content provider 2 encrypts the decrypted random number R2 with the common key Kc1. In Step S72, the mutual authentication section 39 of the content provider 2 sends the encrypted random number R2 to the EMD service center 1.

In Step S73, the mutual authentication section 17 of the EMD service center 1 decrypts the received random number R2 with the common key Kc1. In Step S74, the mutual authentication section 17 of the EMD service center 1 checks the decrypted random number R2 against the random number R2 generated in Step S66 (the random number R2 before encryption). If they match, it certifies that the content provider 2 is legitimate. If they do not, it terminates the process, determining that the content provider 2 is illegitimate.

FIG. 37 is a flow chart which describes the use of a 160-bits length elliptic curve in public-key cryptography for the operation of mutual authentication between the mutual authentication section 39 of the content provider 2 and mutual authentication section 17 of the EMD service center 1. In Step S81, the mutual authentication section 39 of the content provider 2 generates a 64-bit random number R1. In Step S82, the mutual authentication section 39 of the content provider 2 sends the random number R1 as well as an authentication certificate (acquired in advance from the certification agency) containing its own public key Kpcp to the mutual authentication section 17 of the EMD service center 1.

In Step S83, the mutual authentication section 17 of the EMD service center 1 decrypts the signature of the received authentication certificate (encrypted with a secret key Ksca of the certification agency) with the secret key Ksca of the certification agency acquired in advance and takes out the hash value of a public key Kpcp of the content provider 2 and a name of the content provider 2. It also takes out the public key Kpcp and name of the content provider 2 contained as plain text in the authentication certificate. If the authentication certificate is a legitimate one issued by the certification agency, it can be decrypted and the resulting hash value of the public key Kpcp and the name of the content provider 2 should match the hash value obtained by the application of a hash function to the public key Kpcp of the content provider 2 and the name of the content provider 2 contained as plain text in the authentication certificate. This proves that the public key Kpcp is the legitimate one that has not been falsified. If the signature cannot be decrypted, or even if it can be, if the hash values do not match, the public key or provider is illegitimate. In that case, the process is terminated.

If the authentication is successful, the mutual authentication section 17 of the EMD service center 1 generates a 64-bit random number R2 in Step S84. In Step S85, the mutual authentication section 17 of the EMD service center 1 generates a concatenation R1∥R2 of the random numbers R1 and R2. In Step S86, the mutual authentication section 17 of the EMD service center 1 encrypts the concatenation R11∥R2 with its own secret key Ksesc. In Step S87, the mutual authentication section 17 of the EMD service center 1 encrypts the concatenation R1∥R2 with the public key Kpcp of the content provider 2 obtained in Step S83. In Step S88, the mutual authentication section 17 of the EMD service center 1 sends the concatenation R1∥R2 encrypted with the secret key Ksesc, the concatenation R1∥R2 encrypted by the public key Kpcp, and authentication certificate (acquired in advance from the certification agency) containing its own public key Kpesc to the mutual authentication section 39 of the content provider 2.

In Step S89, the mutual authentication section 39 of the content provider 2 decrypts the signature of the received authentication certificate with the secret key Kpca of the certification agency acquired in advance, and if it is right, takes out the public key Kpesc from the certificate. This process is the same as in Step S83 and thus description thereof will be omitted. In Step S90, the mutual authentication section 39 of the content provider 2 decrypts the concatenation R1∥R2 encrypted with the secret key Ksesc, by using the public key Kpesc obtained in Step S89. In Step S91, the mutual authentication section 39 of the content provider 2 decrypts the concatenation R1∥R2 encrypted with its own public key Kpcp, by using its own secret key Kscp. In Step S92, the mutual authentication section 39 of the content provider 2 compares the concatenation R1∥R2 decrypted in Step S90 and the concatenation R1∥R2 decrypted in Step S91. If they match, it certifies that the EMD service center 1 is legitimate. If they do not match, it terminates the process, determining that the EMD service center 1 is illegitimate.

If the authentication is successful, the mutual authentication section 39 of the content provider 2 generates a 64-bit random number R3 in Step S93. In Step S94, the mutual authentication section 39 of the content provider 2 generates a concatenation R2∥R3 of the random numbers R2 obtained in Step S90 and the random number R3 generated in Step S93. In Step S95, the mutual authentication section 39 of the content provider 2 encrypts the concatenation R2∥R3 with the public key Kpesc obtained in Step S89. In Step S96, the mutual authentication section 39 of the content provider 2 sends the encrypted concatenation R2∥R3 to the mutual authentication section 17 of the EMD service center 1.

In Step S97, the mutual authentication section 17 of the EMD service center 1 decrypts the encrypted concatenation R2∥R3 with its own secret key Ksesc. In Step S98, the mutual authentication section 17 of the EMD service center 1 checks the decrypted random number R2 against the random number R2 generated in Step S84 (the random number R2 before encryption). If they match, it certifies that the content provider 2 is legitimate. If they do not, it terminates the process, determining that the content provider 2 is illegitimate.

As described above, the mutual authentication section 17 of the EMD service center 1 and the mutual authentication section 39 of the content provider 2 perform mutual authentication. The random numbers used for the mutual authentication are temporary keys Ktemp valid only for the processes subsequent to the given mutual authentication.

(6-2) Transmission of content from content provider to service provider

Figure 38:
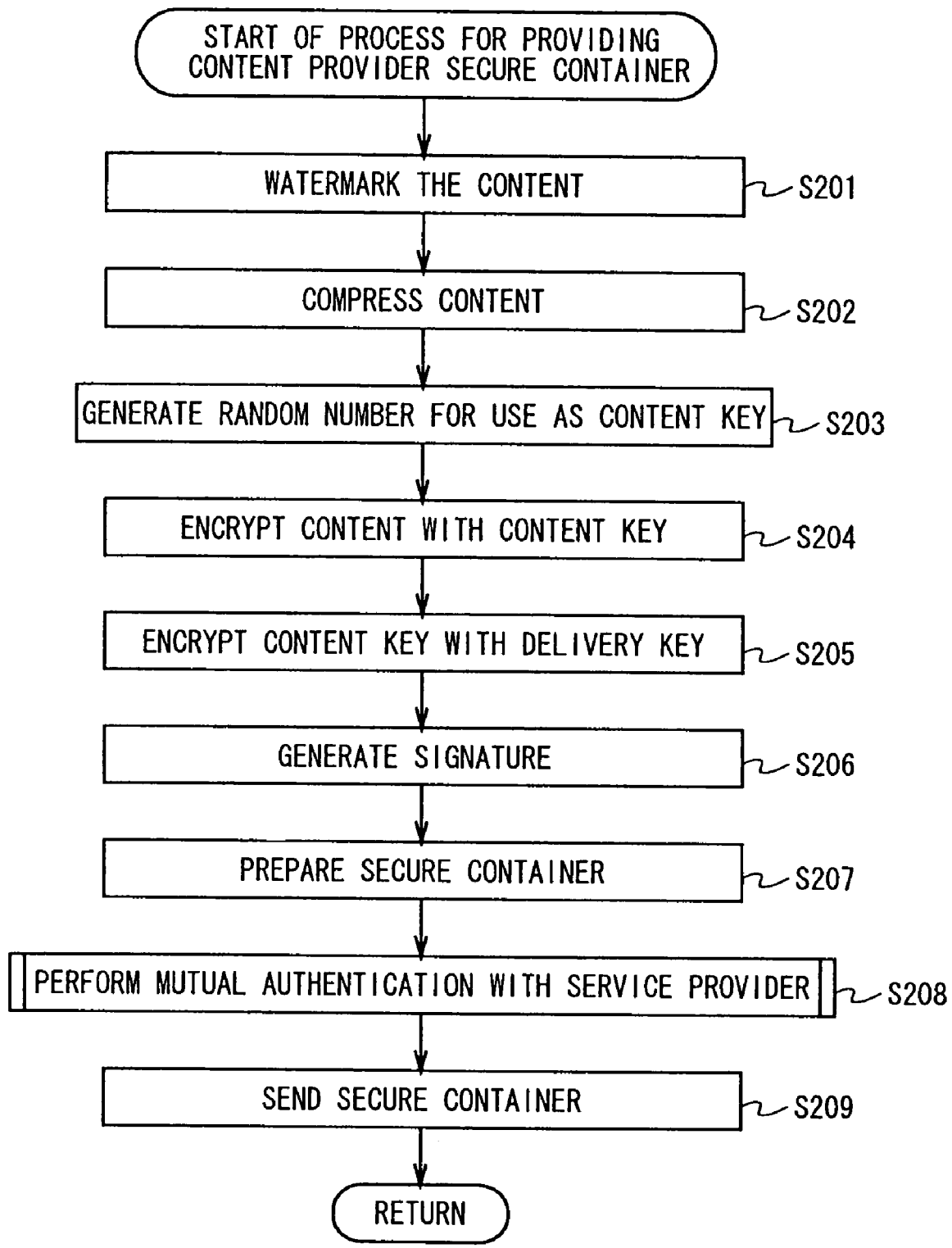
FIG. 38 is a flow chart illustrating the process of sending a content provider secure container from the content provider 2 to the service provider 3.

Now the process of Step S12 in FIG. 33 will be described. In Step S12, the content provider secure container is supplied from the content provider 2 to the service provider 3. Details of the process is shown in the flow chart of FIG. 38. In Step S201, the watermarking section 32 (FIG. 9) of the content provider 2 reads content A from the content server 31, inserts a predetermined watermark that represents the content provider 2, and supplies content A to the compression section 33.

In Step S202, the compression section 33 of the content provider 2 compresses the watermarked content A by a predetermined method such as ATRAC2 and supplies it to the encryption section 34. In Step S203, the random number generator section 35 generates a random number for use as a content key KcoA and supplies it to the encryption section 34.

In Step S204, the encryption section 34 of the content provider 2 encrypts the watermarked and compressed content A by a predetermined method such as DES by using the random number (content key KcoA) generated by the random number generator section 35. Then in Step S205, the encryption section 36 encrypts the content key KcoA by a predetermined method such as DES by using the delivery key Kd supplied by the EMD service center 1.

In Step S206, the secure container preparation section 38 of the content provider 2 computes a hash value by the application of a hash function to the content A (encrypted with the content key KcoA), content key KcoA (encrypted with the delivery key Kd), and UCP A for content A, and encrypts the hash value with its own secret key Ksesc, to generates the signature shown in FIG. 13.

In Step S207, the secure container preparation section 38 of the content provider 2 prepares the content provider secure container, shown in FIG. 13, which contains content A (encrypted with the content key KcoA), the content key KcoA (encrypted with the delivery key Kd), UCP A, and the signature generated in Step S206.

In Step S208, the mutual authentication section 39 of the content provider 2 performs mutual authentication with the mutual authentication section 45 of the service provider 3. The process of this mutual authentication is similar to that described with reference to FIGS. 35 to 37 and thus description thereof is omitted. In Step S209, the secure container preparation section 38 of the content provider 2 sends the content provider secure container prepared in Step S207 to the service provider 3 by attaching the authentication certificate issued in advance by the certification agency.

When the content provider secure container is supplied to the service provider 3 as described above, the process of Step S12 finishes and Step S13 in FIG. 33 begins.

(6-3) Transmission of Content From Service Provider to Receiver

Figure 39:
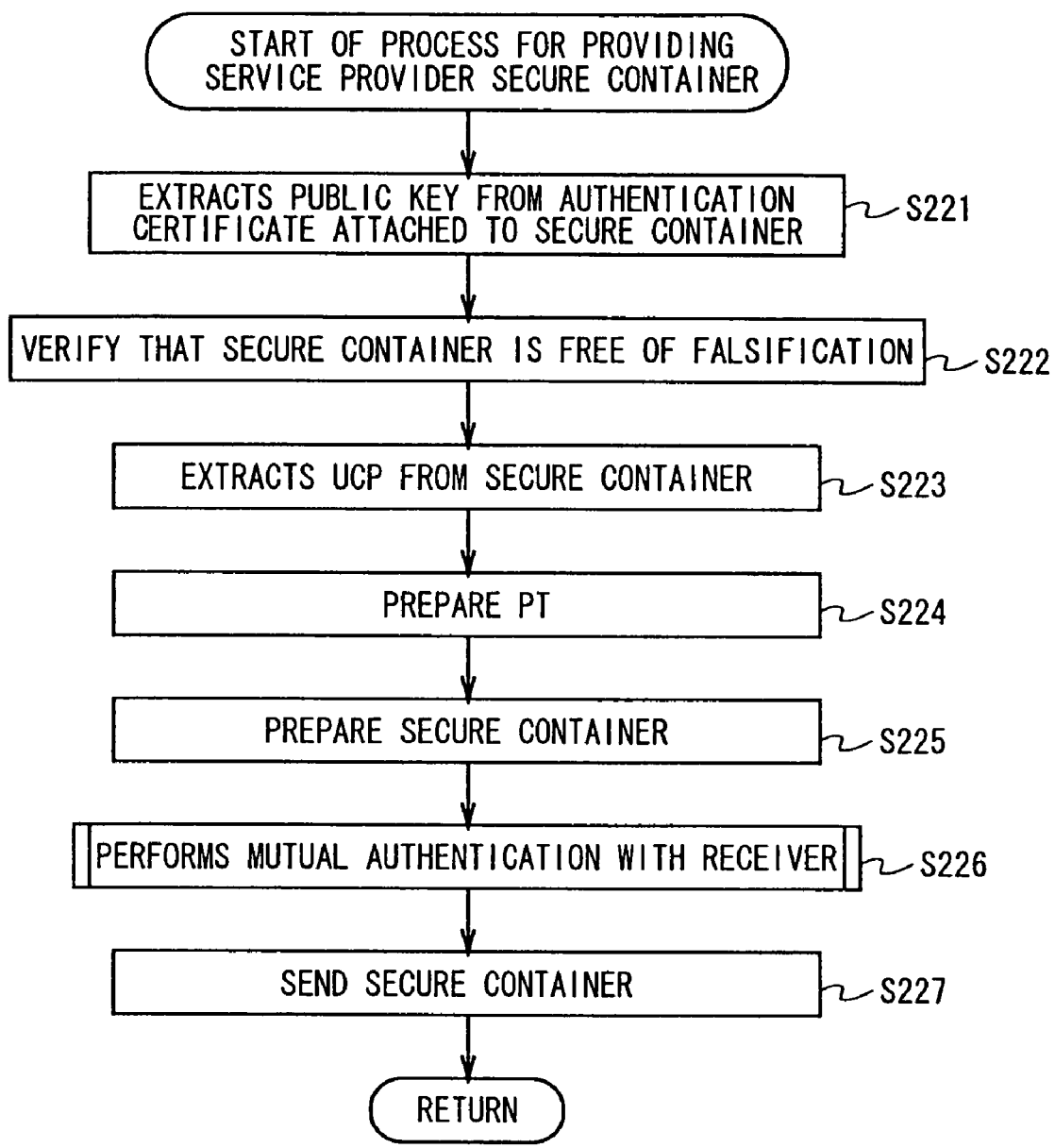
FIG. 39 is a flow chart illustrating the process of sending a service provider secure container from the service provider 3 to the receiver 51.

In Step S13, the service provider secure container is supplied from the service provider 3 to the user home network 5 (receiver 51). Details of the process is shown in the flow chart of FIG. 39. In Step S221, the pricing section 42 of the service provider 3 checks the signature contained in the authentication certificate attached to the content provider secure container sent by the content provider 2. If the authentication certificate has not been falsified, the pricing section 42 takes the public key Kpcp of the content provider 2 out of the authentication certificate. The verification of the authentication certificate is similar to the process of Step S83 in FIG. 37 and thus description thereof is omitted.

In Step S222, the pricing section 42 of the service provider 3 decrypts the signature in the content provider secure container sent by the content provider 2, by using the public key Kpcp of the content provider 2. It checks the content provider secure container for falsification by determining whether the resulting hash value matches the hash value obtained by the application of a hash function to the content A (encrypted with the content key KcoA), content key KcoA (encrypted with the delivery key Kd), and UCPA. If the two hash values do not match (falsification is detected) the process is terminated. In this example, however, it is assumed that there is no falsification of the content provider secure container and Step S223 is performed next.

In Step S223, the pricing section 42 of the service provider 3 takes content A (encrypted with the content key KcoA), the content key KcoA (encrypted with the delivery key Kd), and the signature of the content provider 2 out of the content provider secure container and supplies them to the content server 41, which then stores them. Also, the pricing section 42 takes UCP A out of the content provider secure container and supplies it to the secure container preparation section 44.

In Step S224, the pricing section 42 of the service provider 3 prepares PT A-1 and PT A-2 based on the extracted UCP A and supplies them to the secure container preparation section 44.

In Step S225, the secure container preparation section 44 of the service provider 3 prepares the service provider secure container shown in FIG. 17 from content A (encrypted with the content key KcoA), the content key KcoA (encrypted with the delivery key Kd), the signature of the content provider 2, UCP A, PT A-1, PT A-2, and the signature of the service provider 3.

In Step S226, the mutual authentication section 45 of the service provider 3 performs mutual authentication with the mutual authentication module 71 of the receiver 51. The process of this mutual authentication is similar to that described with reference to FIGS. 35 to 37 and thus description thereof is omitted.

In Step S227, the secure container preparation section 44 of the service provider 3 sends the service provider secure container prepared in Step S225 to the receiver 51 of the user home network by attaching the authentication certificate of the service provider 3.

When the service provider secure container is supplied to the receiver 51 by the service provider 3 as described above, the process of Step S13 finishes and Step S14 in FIG. 33 begins.

(6-4) Recording of Content by Receiver

In Step S14, the service provider secure container sent by the service provider 3 is received by the receiver 51 of the user home network 5. Details of the process is shown in the flow chart of FIG. 40. In Step S241, the mutual authentication module 71 of the receiver 51 performs mutual authentication with the mutual authentication section 45 of the service provider 3 via the communications block 61. If the mutual authentication is successful, the communications block 61 receives the service provider secure container from the service provider 3 that participated in the mutual authentication. If the authentication fails, the process is terminated. In this example, however, it is assumed that the mutual authentication has been successful and Step S242 is performed next.

In Step S242, the communications block 61 of the receiver 51 receives an authentication certificate of the secret key from the service provider 3 that participated in the mutual authentication.

In Step S243, the encryption/decryption module 74 of the receiver 51 checks the signature contained in the service provider secure container for falsification received in Step S241. If falsification is detected, the process is terminated. In this example, however, it is assumed that there is no falsification and Step S224 is performed next.

In Step S244, the UCPs that satisfy the usage conditions and the PTs that satisfy the pricing conditions are selected, based on the reference information 51 stored in the memory module 73 of the receiver 51, and displayed on the display unit (not shown) through the display controller 67. The user selects the usage details of one of the UCPs by manipulating the operator panel (not shown) with reference to the details of the UCPs and PTs displayed. Then, the input controller 68 outputs, to SAM 62, the signals that correspond to the user operation input from the operator panel.

In this example, since "Use Point Information" of the reference information 51 has been set to a use point of 200 points or more, UCP A can be selected. Besides, since "Account-Settling User Information" of the reference information 51 has been set to 'Male' users, "Pricing Conditions 10" of PT A-1 are satisfied. Therefore, in this example, out of PT A-1 and PT A-2 prepared in accordance with UCP A, PT A-1 is selected and details of UCP A and PT A-1 are displayed on the display unit. Also, in this example, it is assumed that the user has selected usage details 13 of UCP A (price 13 of PT A-1).

In Step S245, the accounting module 72 of SAM 62 of the receiver 51 prepares UCS A and accounting information A, based on the entry of "Usage Details 13" of UCP A (entries of "Usage Details 13" of UCP A-1) selected in Step S244.

In Step S246, content A (encrypted with the content key KcoA), UCP A, PT A-1, PT A-2, and the signature of the content provider 2 are taken out of the service provider secure container, output to the HDD 52, and stored there. In Step S247, the decryption unit 91 of the encryption/decryption unit 74 decrypts the content key KcoA (encrypted with the delivery key Kd) contained in the service provider secure container, with the delivery key Kd stored in the memory module 73.

In Step S248, the encryption unit 93 of the encryption/decryption unit 74 encrypts the content key KcoA decrypted in Step S247, by means of the save key Ksave stored in the memory module 73.

In Step S249, the data check module 75 of SAM 62 searches the usage information storage 63A of the external storage 63 for the block BP which has free space and in which the content key KcoA encrypted with the save key Ksave in Step S248 and UCS A prepared in Step S245 are stored in matching pairs. In this example, block BP-1 of the usage information storage 63A is detected. Incidentally, in the usage information storage 63A of FIG. 22, the usage information memory area RP-3 of the block BP-1 is shown to already store the content key KcoA and UCS A. In this example, however, they are not stored at this point and the usage information memory area RP-3 of the block BP-1 is free, containing predetermined initial information.

In Step S250, the data check module 75 of the receiver 51 obtains a hash value by applying a hash function to the block BP-1 data (all the data stored in the usage information memory areas RP-1 to RP-N) detected in Step S249. Then in Step S251, the data check module 75 compares the hash value obtained in Step S250 with the verification value HP-1 that is stored in the memory module 73 and that corresponds to block BP-1. If they match, the block BP-1 data is free of falsification and Step S252 is performed next.

In Step S252, SAM 62 of the receiver 51 stores the usage information (the content key KcoA encrypted with the save key Ksave in Step S248 and UCS A prepared in Step S245) in the usage information memory area RP-3 of the block BP-1 in the usage information storage 63A (of the external storage 63).

In Step S253, the data check module 75 of the receiver 51 computes a hash value by applying a hash function to the block BP-1 data in the usage information storage 63A, including the usage information stored in the usage information memory area RP-3 in Step S252. In Step S254, the data check module 75 overwrites the verification value HP-1 stored in the memory module 73 with the hash value. In Step S255, the accounting module 72 stores, in the memory module 73, the accounting information A prepared in Step S245, and the process finishes.

In Step S251, if the data check module 75 determines that the computed hash value and the verification value HP-1 do not match, the block BP-1 data has been falsified. Consequently, the data check module 75 goes to Step S256, where it determines whether all the blocks BP in the usage information storage 63A of the external storage 63 have been checked. If it determines that not all the blocks BP in the external storage 63 have been checked, it goes to Step S257 and searches for unchecked blocks (other blocks with free space), returns to Step S250, where the rest of the process is executed.

In Step S256, if the data check module 75 determines that all the blocks BP in the usage information storage 63A of the external storage 63 have been checked, there is no block BP (usage information memory area RP) that can store usage information. Consequently, the process finishes.

When the service provider secure container is thus received by the receiver 51, the process of Step S14 finishes and Step S15 in FIG. 33 begins.

(6-4) Reproduction of Content

In Step S15, the contents A supplied is used by the receiver 51. In this example, according to the usage details 13 of UCP A selected in Step S224 of FIG. 40, the usage type of content A is reproduction. Thus, reproduction of content A will be described next. Details of the reproduction is shown in the flow chart of FIG. 41.

Figure 40:
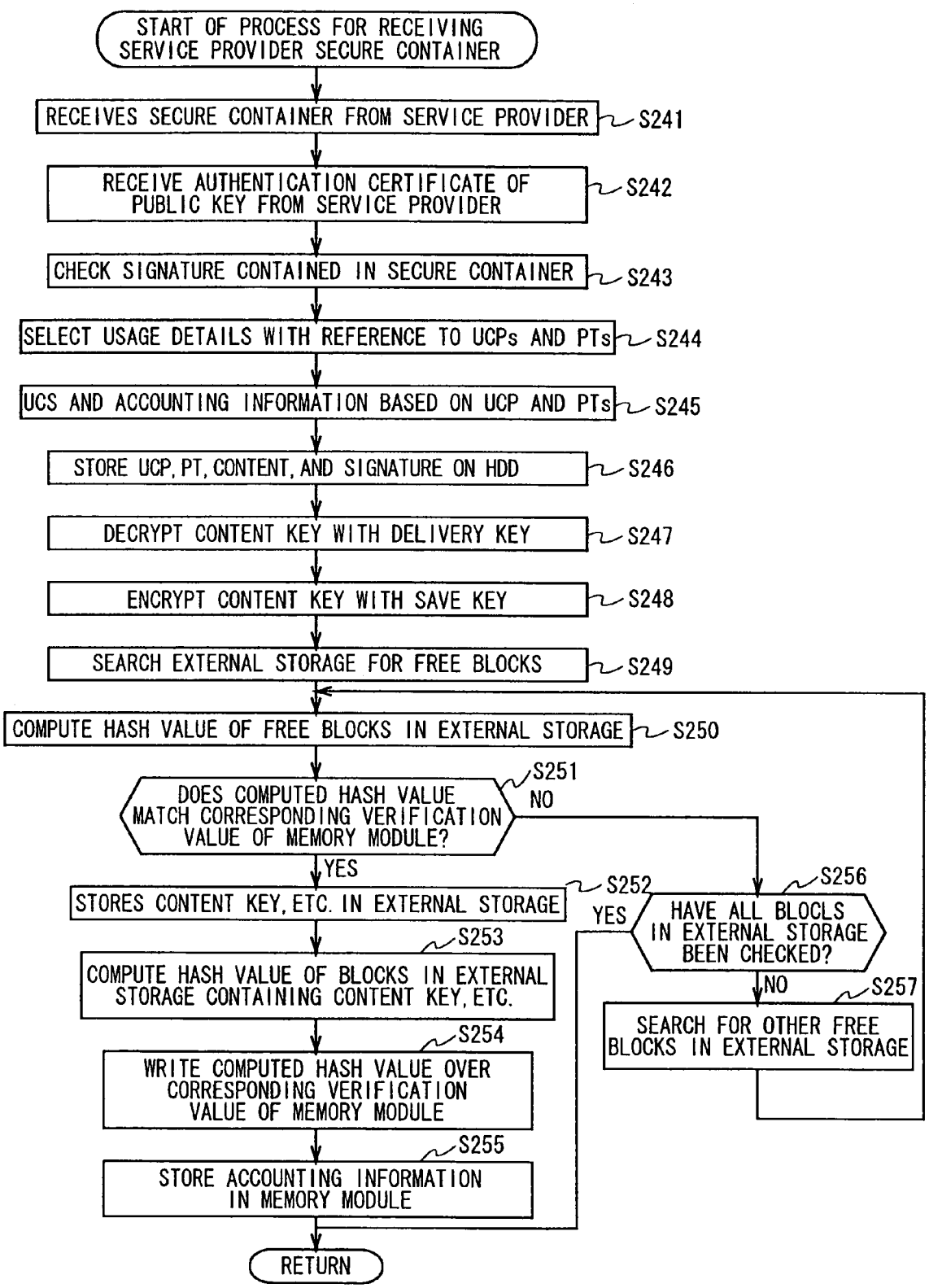
FIG. 40 is a flow chart illustrating the process in which the receiver 51 receives the service provider secure container.
Figure 41:
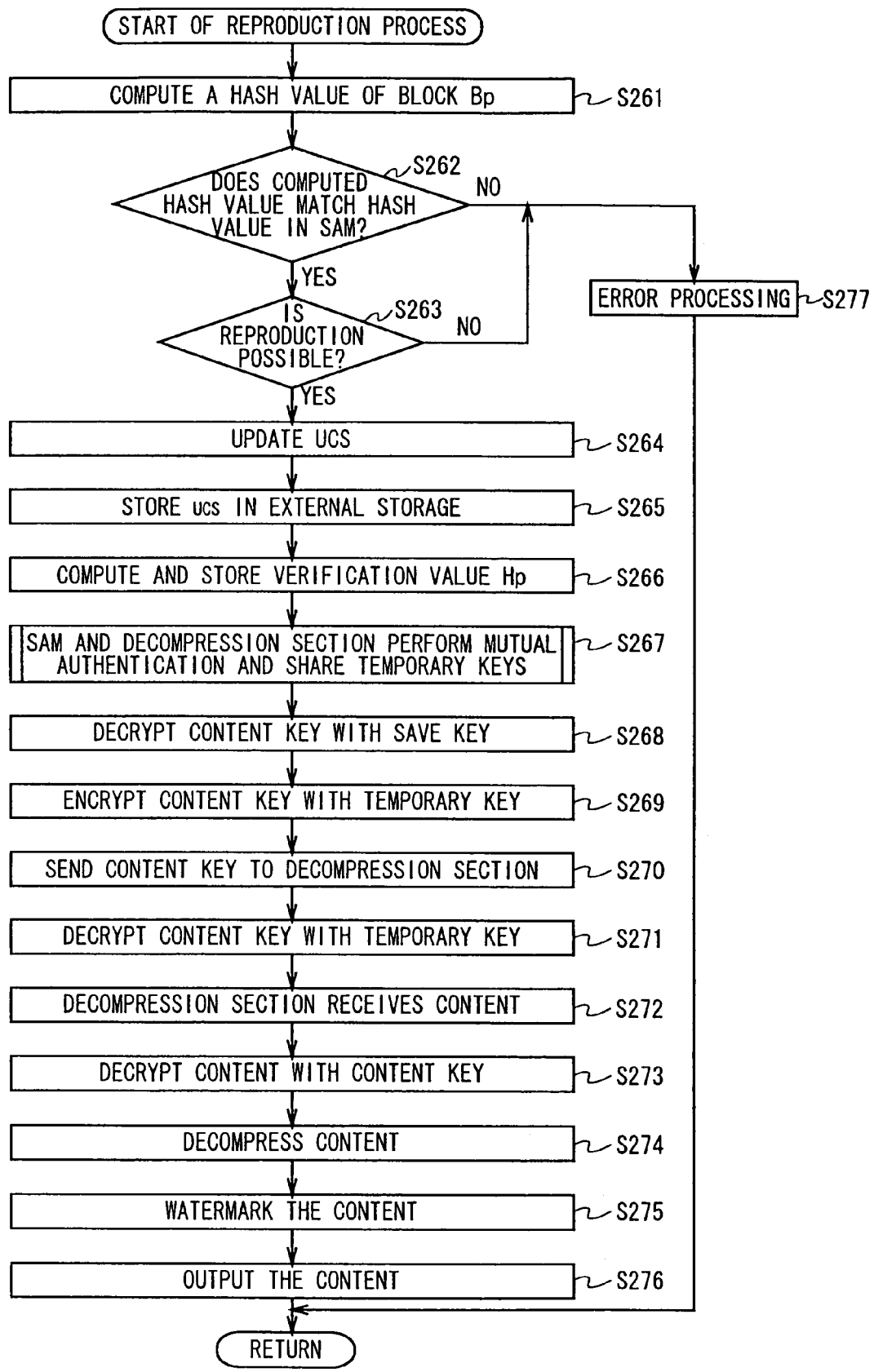
FIG. 41 is a flow chart illustrating the process in which the receiver 51 reproduces content.

In Step S261, the data check module 75 of the receiver 51 computes a hash value by applying a hash function to the block BP-1 data in the usage information storage 63A of the external storage 63, including the content key KcoA (encrypted with the save key Ksave) and UCS A stored in the usage information memory area RP-3 in Step S252 of FIG. 40.

In Step S262, the data check module 75 of the receiver 51 compares the hash value computed in Step S261 with the hash value (verification value HP-1) computed in Step S253 of FIG. 40 and stored in the memory module 73 in Step S254. If they match, the block BP-1 data is free of falsification and Step S263 is performed next.

In Step S263, it is determined whether contents A is available, based on the information contained in "Parameter" of "Usage Details" for UCS A (FIG. 21). For example, as "Type" of "Usage Details" for UCS is set to 'Limited-Time Reproduction,' "Parameter" of the UCS stores the start time and end time of usage. And it is determined whether the present time is within the limits. That is, if the present time is within the limits, the content is judged to be available and if it is not within the limits, the content is judged to be unavailable. On the other hand, if "Type" of "Usage Details" for UCS is set to a use type that allows reproduction (duplication) up to a certain number of times, "Parameter" stores the information about the remaining number of times the content can be used. If the available number of times stored in "Parameter" is not zero (0), the corresponding content is judged to be available. On the other hand, if the available number of times is zero (0), the corresponding content is judged to be unavailable.

"Type" of "Usage Details" for UCS A is set to 'Limited-Time Reproduction.' In this example, the present time is assumed to be within the limits and thus in Step S263, contents A is judged to be available. Consequently, Step S264 is performed next.

In Step S264, the accounting module 72 of the receiver 51 updates UCS A. Although UCS A does not contain any information that should be updated, the available number of times stored in "Parameter" is decremented by 1 if "Type" of "Usage Details" is set to a use type that allows reproduction up to a certain number of times.

Next, in Step S265, the SAM 62 of the receiver 51 stores the UCS A updated in Step S264 (not actually updated in this example) in the usage information memory area RP-3 of the block BP-1 in the usage information storage 63A of the external storage 63. In Step S266, the data check module 75 computes a hash value by applying a hash function to the block BP-1 data in the usage information storage 63A of the external storage 63, including the UCS A stored in Step S265 and overwrites the verification value HP-1 stored in the memory module 73 with the hash value.

In Step S267, the mutual authentication module 71 of SAM 62 and mutual authentication module 101 of the decompression section 64 perform mutual authentication and share temporary keys Ktemp. The process of this mutual authentication is similar to that described with reference to FIGS. 35 to 37 and thus description thereof is omitted. The random numbers R1, R2, and R3, or their combinations used for the mutual authentication are stored as temporary keys Ktemp.

In Step S268, the decryption unit 91 of the encryption/decryption module 74 decrypts the content key KcoA (encrypted with the save key Ksave) stored in block BP-1 (the usage information memory area RP-3) in the usage information storage 63A of the external storage 63 in Step S252 of FIG. 40, by using the save key Ksave stored in the memory module 73.

Next, in Step S269, the encryption unit 93 of the encryption/decryption module 74 encrypts the decrypted content key KcoA, by using the temporary key Ktemp. In Step S270, SAM 62 sends the encrypted content key KcoA encrypted with the temporary key Ktemp to the decompression section 64.

In Step S271, the decryption module 102 of the decompression section 64 decrypts the content key KcoA by using the temporary key Ktemp. In Step S272, the decompression section 64 receives the content A (encrypted with the content key Kco) recorded on the HDD 52 through the interface 66. In Step S273, the decryption module 103 of the decompression section 64 decrypts content A (encrypted with the content key Kco) with the content key KcoA.

In Step S274, the decompression module 104 of the decompression section 64 decompresses the decrypted content A by a predetermined method such as ATRAC2. In Step S275, the watermarking module 105 of the decompression section 64 watermarks the decompressed content A for identification of the receiver 51. In Step S276, content A is output to speakers or the like (not shown) and the process finishes.

In Step S277, if it is determined in Step S262 that the hash value computed in Step S261 and the hash value stored in the memory module 73 of the receiver 51 do not match, or if the content is judged to be unavailable in Step S263, SAM 62 runs predetermined error processing to display an error message on the display unit (not shown) through the display controller 67 and the process finishes.

In this way, when content A is reproduced (used) on the receiver 51, the process finishes, and so does the entire process in FIG. 33.

(6-5) Account Settlement

Figure 42:
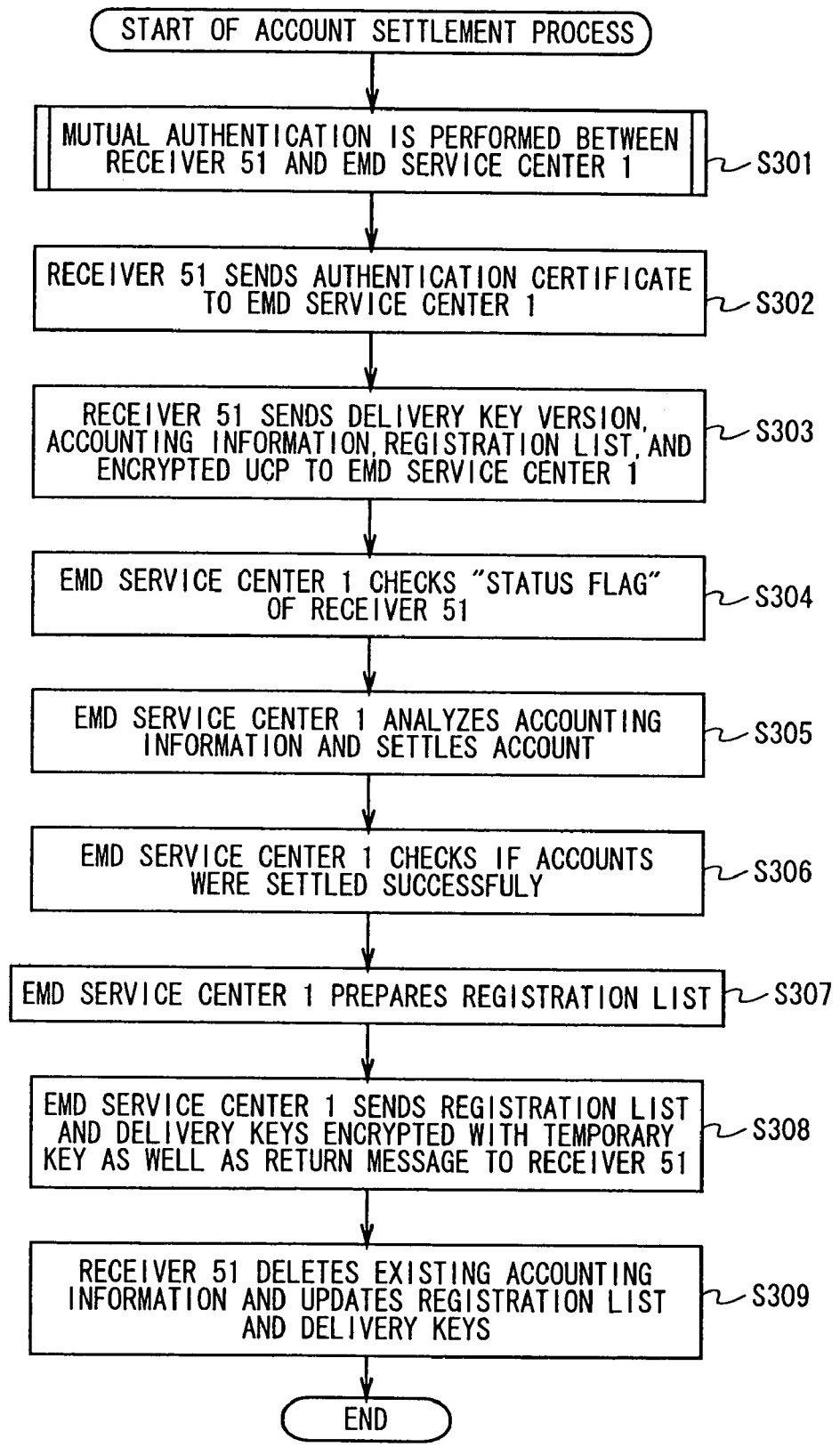
FIG. 42 is a flow chart illustrating an account settlement process.

Now the processing procedures for settling accounts with the receiver 51 will be described with reference to the flow chart in FIG. 42. This process is started when the amount posted exceeds a preset ceiling (the limit charge for formal or temporary registration), or if the version of delivery keys Kd becomes obsolete, making it impossible, for example, to decrypt the content key Kco (encrypted with the delivery key Kd) in Step S247 of FIG. 40 (and thus impossible to receive the service provider secure container).

In Step S301, mutual authentication is performed between the receiver 51 and EMD service center 1. This mutual authentication is similar to that described with reference to FIGS. 35 to 37 and thus description thereof is omitted.

Next, in Step S302, SAM 62 of the receiver 51 sends an authentication certificate to the user management section 18 (FIG. 3) of the EMD service center 1. In Step S303, SAM 62 of the receiver 51 encrypts the UCP that corresponds to the account (accounting information) to be settled, by means of the temporary key Ktemp shared with the EMD service center 1 in Step S301, and sends it to the EMD service center 1 together with the version of delivery keys Kd, accounting information (e.g., accounting information A in FIG. 23), and registration list stored in the memory module 73.

In Step S304, after the information sent by the receiver 51 in Step S303 is received and decrypted, the user management section 18 of the EMD service center 1 checks the receiver 51 for any illegal act that would make "Status Flag" in the registration list to be set to 'Stop.'

In Step S305, the billing section 19 of the EMD service center 1 analyzes the accounting information received in Step S303 to calculate the amounts to be charged to the user. Then, in Step S306, the user management section 18 checks to see if the accounts were settled successfully in Step S305.

Next, in Step S307, the user management section 18 of the EMD service center 1 sets the registration conditions of the receiver 51 based on the results of checks run in Steps S304 and S306, and attaches a signature to it to prepare a registration list of the receiver 51.

For example, if an illegal act is detected in Step S304, "Status Flag" is set to 'Stop,' which stops all the subsequent processes. In short, the receiver 51 can no longer receive any service from the EMD system. On the other hand, if it is confirmed that the settlement has failed in Step S306, "Status Flag" is set to 'Restricted,' in which case, the receiver 51 can no longer purchase any new content although it can reproduce already purchased content.

Next, the account settlement process goes to Step S308, where the user management section 18 of the EMD service center 1 encrypts the latest version of delivery keys Kd (the latest three months' delivery keys Kd) and the registration list prepared in Step S307, by using the temporary key Ktemp, and sends the results to the receiver 51.

In Step S309, SAM 62 of the receiver 51 receives the delivery keys Kd and registration list sent by the EMD service center 1, through the communications block 61, decrypts them, and stores them in the memory module 73. The existing accounting information is deleted and the registration list and delivery keys Kd are updated in the memory module 73. Besides, the signature to the registration list received is checked to verify that the registration list is free of falsification. This process of signature verification is similar to the process of Step S83 in FIG. 37 and thus description thereof is omitted.

(6-6) Repurchasing of Rights (receiver 51)

Figure 43:
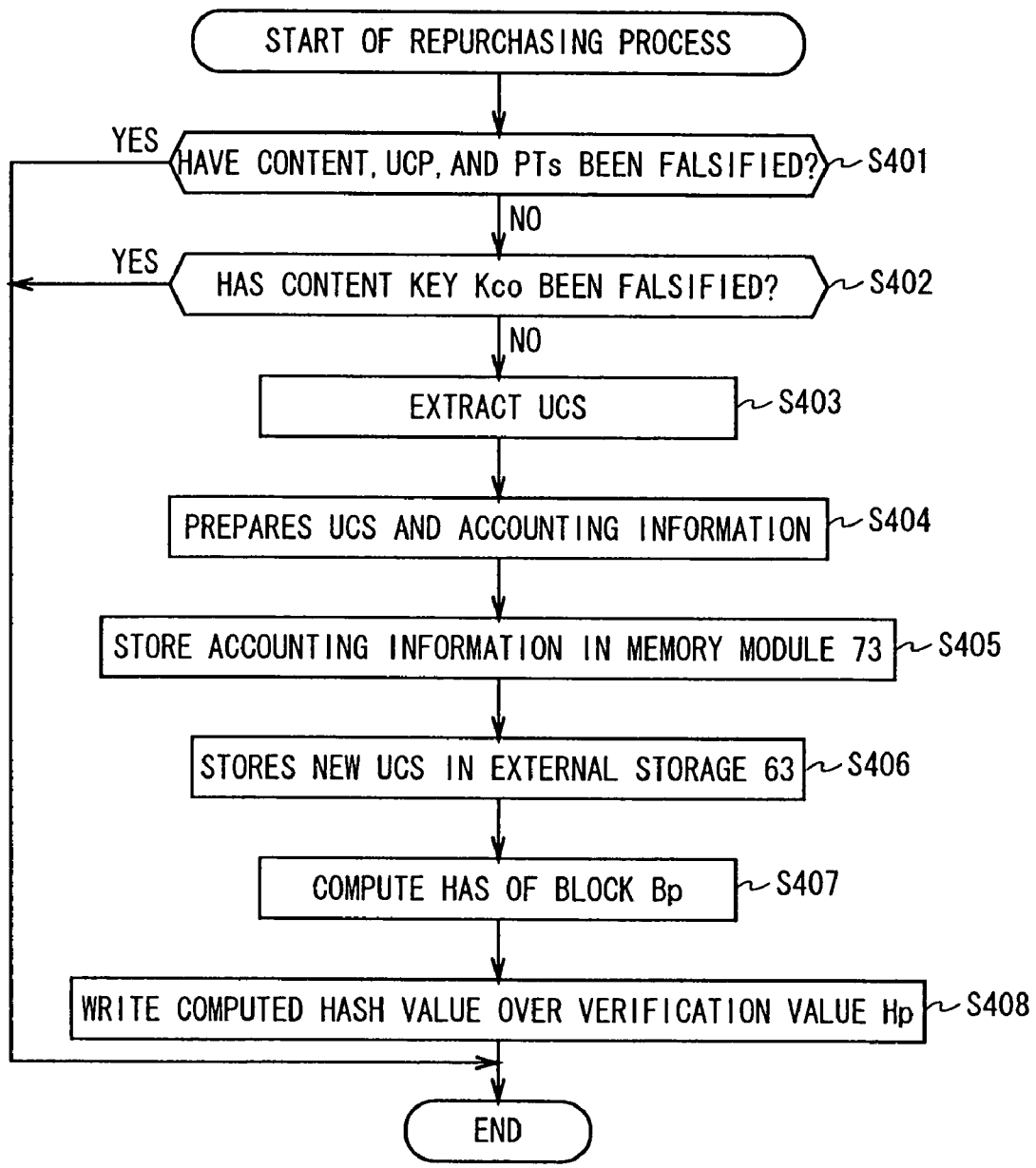
FIG. 43 is a flow chart illustrating a repurchasing process.

Now the processing procedures for repurchasing the rights to use the content on the receiver 51 will be described with reference to the flow chart in FIG. 43, taking the case in which the receiver 51 that has the rights to use content A according to the use type of 'Limited-Time Reproduction' purchases the rights for the use type of 'Purchase and Reproduce.'

In Step S401, the content A, UCP A, PT A-1. and PT A-2 stored on the HDD 52 are checked for falsification. Specifically, the encryption/decryption module 74 of the receiver 51 decrypts the signature stored together with content A, UCP A, PT A-1, and PT A-2 on the HDD 52 in Step S246 of FIG. 40, by using the cryptographic public key, and compares the resulting hash value with the hash value of content A, UCP A, PT A-1, and PT A-2 taken together. If they are proved to be identical, the data is judged to be free of falsification and the repurchasing process goes to Step S402.

In Step S402, the usage information (content key KcoA and UCS A) of content A is checked for falsification. Specifically, the data check module 75 of the receiver 51 computes a hash value by applying a hash function to the data in the block BP (block BP-1, in this example) that contains the usage information of content A and that is located in the usage information storage 63A of the external storage 63, and checks if it matches the verification value HP (HP-1, in this example) that is stored in the memory module 73 and that corresponds to the given block BP. If they match, the usage information is judged to be free of falsification and the repurchasing process goes to Step S403, where SAM 62 of the receiver 51 takes UCS A out of the usage information storage 63A of the external storage 63.

Next, in Step S404, SAM 62 prepares UCS and accounting information. Specifically, the display controller 67 displays details of UCP A, PT A-1, PT A-2, and UCS A on the display unit (not shown). Then, from the fact that "Type" of "Usage Details" for UCS A is set to 'Limited-Time Reproduction' (Type 13), user F learns the price (Price 15 of PT A-1) and the like as well as the fact that the user can use the content according to "Type 15" of "Usage Details 15" of UCP A. In this example, the user F selects "Usage Details 15" of UCP A and PT A-1 by manipulating the operator panel (not shown) of the receiver 51. The input controller 68 receives the signals (ID of "Usage Details 15" of UCP A and ID of PT A-1) that correspond to the user operation, from the operator panel and outputs them to SAM 62. Then, the accounting module 72 of SAM 62 prepares UCS B and accounting information B with "Usage Details" containing the information specified for "Use Type 15" of UCP A, based on the ID of "Usage Details 1" of UCP A and ID of PT A-1 received from the input controller 68, as shown in FIGS. 44 and 45.

Next, in Step S405, SAM 62 of the receiver 51 stores the accounting information B prepared in Step S404 in the memory module 73, and in Step S406 stores the UCS B prepared in Step S404 in the usage information storage 63A of the external storage 63 replacing UCS A with it.

In Step S407, the data check module 75 of the receiver 51 computes a hash value by applying a hash function to the data in the block BP where UCS B was stored in Step S406 and which is located in the usage information storage 63A of the external storage 63. In Step S408, the data check module 75 writes the hash value over the verification value HP that is stored in the memory module 73 and that corresponds to the given block BP. This ends the repurchasing process.

If it is determined in Step S401 that content A, UCP A, PT A-1, and PT A-2 have been falsified or if it is determined in Step S402 that the content key KcoA and UCS A have been falsified, the process is terminated.

Following the procedures described above, the receiver 51 repurchases the rights to use contents A.

The amount posted based on the accounting information B prepared in Step S403 is settled through the account settlement process described with reference to the flow chart in FIG. 42. That is, in this example, the user can purchase content A at a lower price (1,980 yen) than when purchasing it newly (2,000 yen).

(6-7) Repurchasing of Rights (Receiver 301)

Figure 46:
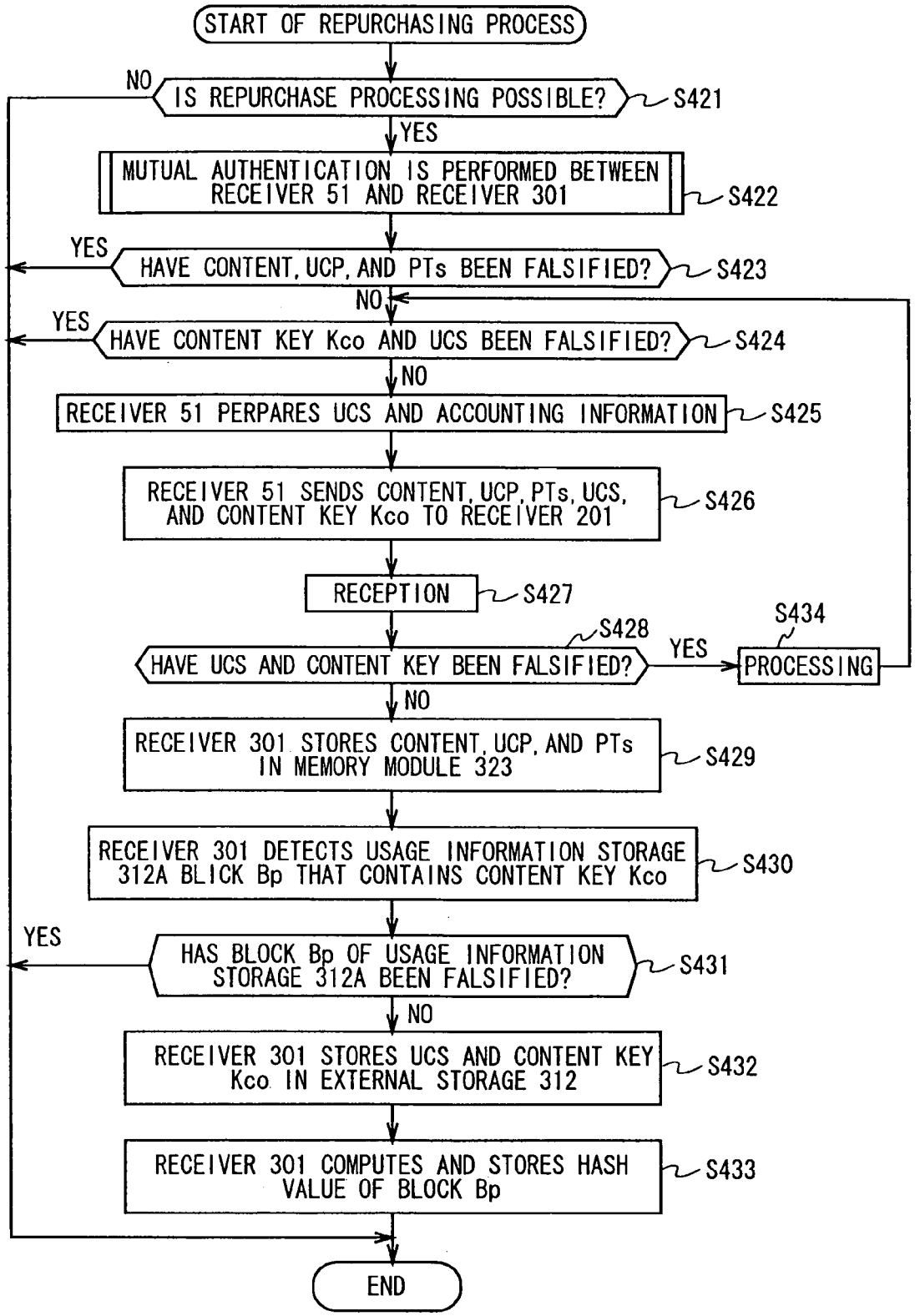
FIG. 46 is a flow chart illustrating another repurchasing process.

Now the processing procedures for repurchasing the rights to use the content on the receiver 301 will be described with reference to the flow chart in FIG. 46, taking the case in which the receiver 51 that has the rights to use content A according to the use type of 'Purchase and Reproduce' as described with reference to the flow chart in FIG. 43 further purchases the rights to use content A on the receiver 301 according to the use type of 'Purchase and Reproduce.'

In Step S421, SAM 62 of the receiver 51 (equipment supplying the content) and SAM 311 of the receiver 301 (equipment receiving the content) checks whether repurchasing is possible, referring to the registration conditions in the respective registration lists they possess. Specifically, the SAM of the master equipment supplying the content (SAM 62 of the receiver 51, in this example) checks to see if its own registration list contains the registration conditions of the slave equipment receiving the content (SAM 311 of the receiver 301, in this example) and if "Master Equipment" in the registration conditions is set to its own SAM ID. The slave equipment checks to see if the desired equipment that will provide the content is specified as "Master Equipment" in its own registration conditions in its own registration list.

In this example, the registration list of the receiver 301 is specified in the registration list of the receiver 51, and the ID of SAM 62 is specified as "Master Equipment" in the registration conditions of the receiver 301 in the registration lists of both receiver 51 and receiver 301. Thus, it is confirmed that repurchasing is possible and repurchasing process goes to Step S422.

In Step S422, mutual authentication is performed between the receiver 51 and receiver 301. This mutual authentication is similar to that described with reference to FIG. 37 and thus description thereof is omitted. As a result of the mutual authentication, the receiver 51 and receiver 301 share temporary keys Ktemp.

In Step S423, the receiver 51 checks the content A, UCP A, PT A-1, and PT A-2 stored on the HDD 52 for falsification. Specifically, the encryption/decryption module 74 of the receiver 51 decrypts the signature stored together with content A, UCP A, PT A-1, and PT A-2 on the HDD 52 in Step S246 of FIG. 40, by using the cryptographic public key, and compares the resulting hash value with the hash value of content A, UCP A, PT A-1, and PT A-2 taken together. If they are proved to be identical, the data is judged to be free of falsification and the repurchasing process goes to Step S424.

In Step S424, the receiver 51 checks the usage information (content key KcoA and UCS B) of content A for falsification.

Specifically, the data check module 75 of the receiver 51 computes a hash value by applying a hash function to the data in the block BP (block BP-1, in this example) that contains the usage information of content A and that is located in the usage information storage 63A of the external storage 63, and checks if it matches the verification value HP (HP-1, in this example) that is stored in the memory module 73 and that corresponds to the given block BP. If they match, the usage information is judged to be free of falsification and the repurchasing process goes to Step S425.

In Step S425, the receiver 51 prepares UCS and accounting information. Specifically, the display controller 67 displays details of UCP A, PT A-1, PT A-2, and UCS B on the display unit (not shown). Then, from the fact that "Type" of "Usage Details" for UCS B is set to 'Type 13→Type 11' (the user currently has the rights to 'Purchase and Reproduce' content A), user F (or user A) learns the price (Price 16 of PT A-1) and the like as well as the fact that the user can use the content according to "Type 16" of "Usage Details 16" of UCP A. In this example, the user selects "Usage Details 16" of UCP A and PT A-1 by manipulating the operator panel (not shown). The input controller 68 receives the signals (ID of "Usage Details 16" of UCP A and ID of PT A-1) that correspond to the user F operation, from the operator panel and outputs them to SAM 62. Then, the accounting module 72 of SAM 62 prepares UCS C and accounting information C with "Usage Details" containing the information specified for "Usage Details 16" of UCP A, based on the ID of "Usage Details 16" of UCP A and ID of PT A-1 received from the input controller 68, as shown in FIGS. 47 and 48.

Next, in Step S426, the content A, UCP A, PT A-1, and PT A-2 stored on the HDD 52; the content key KcoA proved to be free of falsification in Step S423; the UCS B prepared in Step S425; and a signature (signature to the UCS B and content key KcoA) are sent to the receiver 301. The UCS B, content key KcoA, and signature are encrypted with a temporary key Ktemp and sent to the receiver 301 by SAM 62 through the communications block 65. After having been sent to the receiver 301, UCS B is deleted to prevent propagation of rights.

As described above, the receiver 301, which is slave equipment receiving content from other equipment, does not have a display unit for displaying the contents of UCP, PT, and UCS to the user or an operator panel for allowing the user to select usage details and the like. Therefore, it cannot prepare UCS or accounting information by itself. In such cases, UCS and accounting information are prepared in Step S425 by the receiver 51, which supplies content. Also, since the receiver 301 cannot run accounting processes as described above, the accounting information is held by the receiver 51 instead of being sent to the receiver 301, and processed later by the receiver 51.

Next, in Step S427, SAM 311 of the receiver 301 receives the data sent by the receiver 51 in Step S426. The UCS B, content key KcoA, and signature encrypted with the temporary key Ktemp and sent are decrypted with the temporary key Ktemp.

In Step S428, the encryption/decryption module 324 of the receiver 301 checks the UCS B and content key KcoA for falsification by verifying the signature attached to the UCS B and content key KcoA received in Step S427. This process of signature verification is similar to the process of Step S83 in FIG. 37 and thus description thereof is omitted.

If it is determined in Step S428 that UCS B and content key KcoA have not been falsified, the repurchasing process goes to Step S429, where SAM 311 of the receiver 301 stores the content A, UCP A, PT A-1, and PT A-2 received in Step S427, in memory module 323.

In Step S430, the data check module 325 of the receiver 301 searches the usage information storage 312A of the external storage 312 for the block BP that contains the content key KcoA. Then, in Step S431, it computes a hash value by applying a hash function to the data in the block BP detected in Step S430 in the usage information storage 312A of the external storage 312, and checks if the hash value matches the verification value HP that is stored in the memory module 323 and that corresponds to the given block BP. If they are proved to be identical, i.e., the block BP data detected in Step S430 is free of falsification, the data check module 325 goes to Step S432 and stores in matching pairs the UCS B and content key KcoA (received in Step S427) in the block BP.

In Step S433, the data check module 325 of the receiver 301 computes a hash value by applying a hash function to the data in the block BP that stored the UCS B and content key KcoA in Step S432 and that is located in the usage information storage 312A of the external storage 312, and writes the hash value over the verification value HP that is stored in the memory module 323 and that corresponds to the given block BP. This ends the repurchasing process.

If it is determined in Step S428 that the data from the receiver 51 has been falsified, the repurchasing process goes to Step S434, where SAM 311 of the receiver 301 notifies the receiver 51 of the falsification and takes other necessary measures. Then the repurchasing process returns to Step S424. That is, the content A, UCP A, PT A-1, PT A-2, UCS B, content key KcoA, and signature are sent again to the receiver 301. In this example, this transmission from the receiver 51 is retried only a preset number of times. When that number is exceeded, the process is terminated.

If it is determined in Step S421 that repurchasing is impossible, if it is determined in Step S423 that content A, UCP A, PT A-1, and PT A-2 have been falsified, if it is determined in Step S424 that the content key KcoA and UCS B have been falsified, or if it is determined in Step S431 that the detected block BP has been falsified, the process is terminated.

(6-8) Repurchasing of Rights (Receiver 201)

Figure 49:
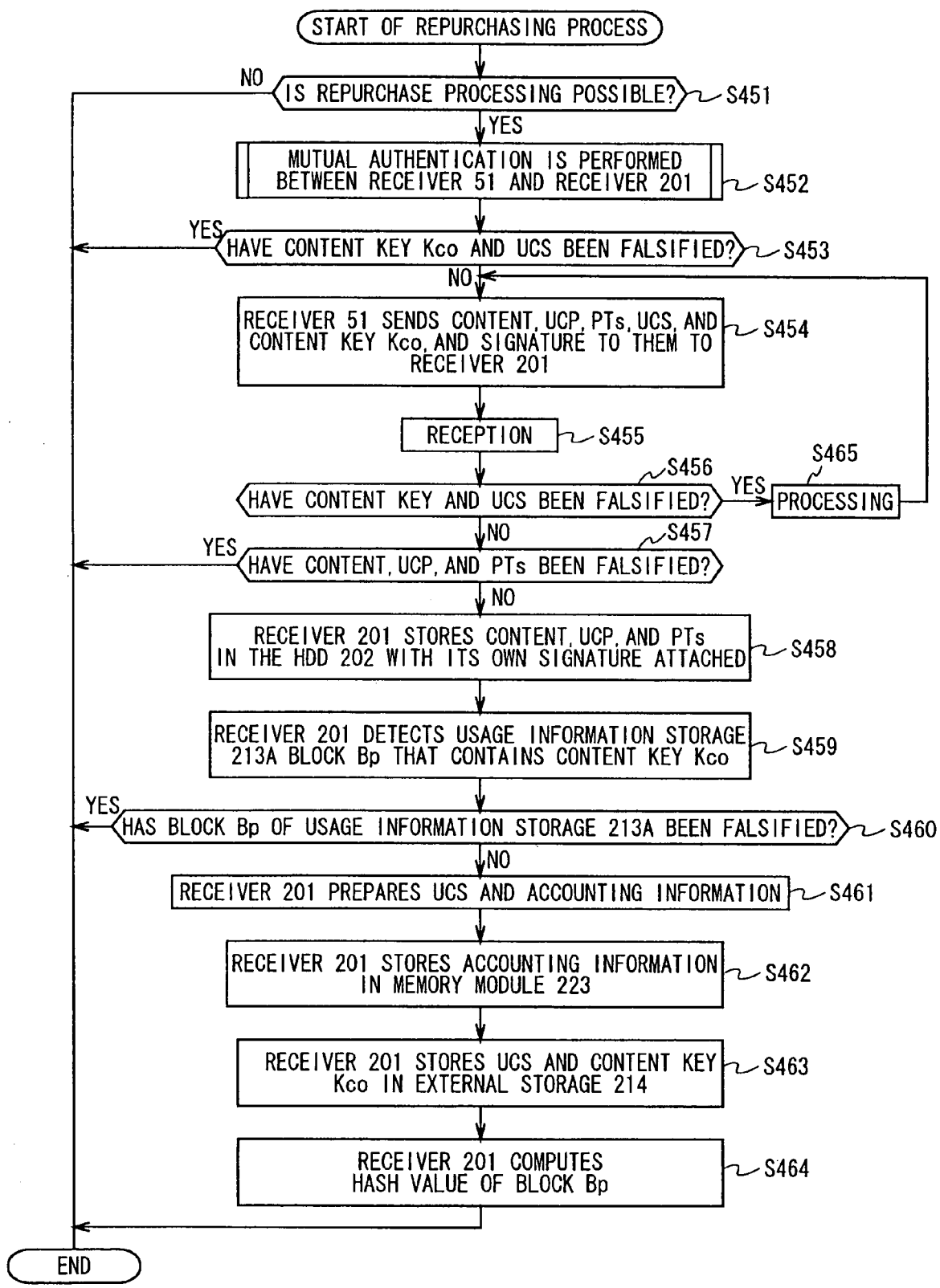
FIG. 49 is a flow chart illustrating another repurchasing process.

Now the processing procedures for repurchasing the rights to use the content on the receiver 201 will be described with reference to the flow chart in FIG. 49, taking the case in which the receiver 51 that has the rights to use content A according to the use type of 'Purchase and Reproduce' as described with reference to the flow chart in FIG. 43 further purchases the rights to use content A on the receiver 201 according to the use type of 'Purchase and Reproduce.'

In Step S451, SAM 62 of the receiver 51 and SAM 212 of the receiver 201 checks whether repurchasing is possible, referring to the registration conditions in the respective registration lists they possess. The specific process is similar to the process of Step S421 in FIG. 46 and thus description thereof is omitted. In this example, it is assumed that repurchasing is possible and the repurchasing process goes to Step S452.

In Step S452, mutual authentication is performed between the receiver 51 and receiver 201. This mutual authentication is similar to that described with reference to FIG. 37 and thus description thereof is omitted. As a result of the mutual authentication, the receiver 51 and receiver 201 share temporary keys Ktemp.

In Step S453, the usage information (content key KcoA and UCS B) of content A is checked for falsification. Specifically, the data check module 75 of the receiver 51 computes a hash value by applying a hash function to the data in the block BP (block BP-1, in this example) that contains the usage information of content A and that is located in the usage information storage 63A of the external storage 63, and checks if it matches the verification value HP (HP-1, in this example) that is stored in the memory module 73 and that corresponds to the given block BP. If they match, the usage information is judged to be free of falsification and the repurchasing process goes to Step S454.

Next, in Step S454, the content A, UCP A, PT A-1, PT A-2, and signature (signature to the content A, UCP A, PT A-1, and PT A-2) stored on the HDD 52 of the receiver 201 in Step S246 of FIG. 40; and the UCS B, content key KcoA, and signature (signature to the UCS B and content key KcoA) proved to be free of falsification in Step S453 are sent to the receiver 201. The UCS B, content key KcoA, and signature are encrypted with a temporary key Ktemp and sent to the receiver 201 by SAM 62 through the communications block 65 by SAM 62.

Next, in Step S455, SAM 212 of the receiver 201 receives the data sent by the receiver 51 in Step S454. The UCS B, content key KcoA, and signature encrypted with the temporary key Ktemp and sent are decrypted with the temporary key Ktemp.

In Step S456, the encryption/decryption module 224 of the receiver 201 checks the UCS B and content key KcoA for falsification by verifying the signature attached to the UCS B and content key KcoA received in Step S455. If they are judged to be free of falsification, the repurchasing process goes to Step S457. This process of signature verification is similar to the process of Step S83 in FIG. 37 and thus description thereof is omitted.

In Step S457, the encryption/decryption module 224 of the receiver 201 checks the content A, UCP A, PT A-1, and PT A-2 received in Step S455 for falsification. Specifically, the encryption/decryption module 224 of the receiver 201 decrypts the signature (signature to content A, UCP A, PT A-1, and PT A-2) received in Step S455, by using the cryptographic public key, and compares the resulting hash value with the hash value of content A, UCP A, PTA-1, and PT A-2 taken together. If they are proved to be identical, the data is judged to be free of falsification and the repurchasing process goes to Step S458.

In Step S458, SAM 212 of the receiver 201 stores the content A, UCP A, PT A-1, and PT A-2 received in Step S455 in the HDD 202 with its own signature attached.

In Step S459, the data check module 225 of the receiver 201 searches the usage information storage 213A of the external storage 213 for the block BP that contains the content key KcoA. Then, in Step S460, it computes a hash value by applying a hash function to the data in the block BP detected in Step S459 in the usage information storage 213A of the external storage 213, and checks if the hash value matches the verification value HP that is stored in the memory module 223 and that corresponds to the given block BP. If they are proved to be identical, i.e., the block BP data detected in Step S459 is free of falsification, the data check module 225 goes to Step S461.

In Step S461, SAM 212 of the receiver 201 prepares UCS and accounting information. Specifically, the display controller 217 displays details of UCP A, PT A-1, PT A-2, and UCS B on the display unit (not shown). Then, from the fact that "Type" of "Usage Details" for UCS B is set to 'Type 13→Type 11' (the user currently has the rights to 'Purchase and Reproduce' content A), user F (or user A) learns the price (Price 16 of PT A-1) and the like as well as the fact that the user can use the content according to "Type 16" of "Usage Details 16" of UCP A. In this example, the user F selects "Usage Details 16" of UCP A and PT A-1 by manipulating the operator panel (not shown) of the receiver 201. The input controller 218 receives the signals (ID of "Usage Details 16" of UCP A and ID of PT A-1) that correspond to the user F operation, from the operator panel and outputs them to SAM 212. Then, the accounting module 222 of SAM 212 prepares UCS D and accounting information D with "Usage Details" containing the information specified for "Usage Details 16" of UCP A, based on the ID of "Usage Details 16" of UCP A and ID of PT A-1 received from the input controller 218, as shown in FIGS. 50 and 51. After UCS D is prepared, the UCS B supplied by the receiver 51 is deleted to prevent propagation of rights.

Next, in Step S462, SAM 212 of the receiver 201 stores the accounting information D prepared in Step S461 in the memory module 223.

Since the receiver 201 has its own display unit and operator panel as described above, it prepares UCS and accounting information by itself. Also, since the receiver 201 can run accounting processes, it holds the accounting information prepared, and processes it at a predetermined time.

In Step S463, SAM 21 of the receiver 201 stores in matching pairs the UCS D and content key KcoA prepared in Step S461, in the block BP detected in Step S459, in the usage information storage 213A of the external storage 213.

In Step S464, the data check module 225 of the receiver 201 computes a hash value by applying a hash function to the data in the block BP that stored the UCS D and content key KcoA in Step S463 and that is located in the usage information storage 213A of the external storage 213, and writes the hash value over the verification value HP that is stored in the memory module 223 and that corresponds to the given block BP. This ends the repurchasing process.

If it is determined in Step S456 that the data from the receiver 51 has been falsified, the repurchasing process goes to Step S465, where SAM 212 of the receiver 201 notifies the receiver 51 of the falsification and takes other necessary measures. Then the repurchasing process returns to Step S454. That is, the content A, UCP A, PT A-1, PT A-2, UCS B, content key KcoA, and signature are sent again to the receiver 201. In this example, this transmission from the receiver 51 is retried only a preset number of times. When that number is exceeded, the process is terminated.

If it is determined in Step S451 that repurchasing is impossible, if it is determined in Step S453 that the UCS B and content key KcoA have been falsified, if it is determined in Step S457 that content A, UCP A, PT A-1, and PT A-2 have been falsified, or if it is determined in Step S460 that the detected block BP has been falsified, the process is terminated.

Although as an illustration, a case has been cited above where the receiver 201 receives content from the receiver 51 (Step S454), it is also possible to make the receiver 201 to receive content otherwise (e.g., directly from the EMD service center 1).

Also, descriptions have been given about cases in which the user that has the rights to use content according to the use type of 'Limited-Time Reproduction' purchases the rights for the use type of 'Purchase and Reproduce' and cases in which the user that has the rights to use content according to the use type of 'Purchase and Reproduce' purchases the rights for the use type of 'Purchase and Reproduce' again for other equipment. However, combinations of other use types can also be used.

Also, in the above description, when "Usage Details" of UCP (e.g., Usage Details 15 or Usage Details 16) indicating the rights for repurchase was selected, "ID" of "Usage Details" of UCP was set to the ID of "Usage Details 15" or ID of "Usage Details 16." However, it is also possible to set it to the ID of "Usage Details 11."

Also, although the public key Kpu and authentication certificate of SAM was stored in SAM (a memory module), they can be stored on an HDD.

Besides, although the content in the above description was music data, it can also be moving picture data, still image data, text data, or program data. Then in using a different type of content, a compression method suitable for the content type can be selected: for example, MPEG (Moving Picture Experts Group) can be used if the content is image data. The type of watermark suitable for the content can also be selected.

As to common-key cryptography, DES which is a block cipher was used. However, FEAL proposed by NTT (trademark), IDEA (International Data Encryption Algorithm), or a stream cipher that encrypts a bit or several bits of data at a time can be employed as well.

Although common-key cryptography was used to encrypt content and content keys Kco, public-key cryptography can also be used.

In the present specification, a system means entire equipment consisting of two or more equipment items.

As for providing medium for use in providing users with the computer programs for running the processes described above, in addition to recording media such as magnetic discs, CD-ROMs, or solid state-memories, communications media such as network or satellites can also be used.

Since the receivers according to the embodiment of the present invention described above can store the usage control policy that contains second usage details that describe the rights that can be purchased again based on purchased rights, second usage control status which identifies second usage details and the pricing details corresponding to them can be prepared.

Also, since the receivers according to the embodiment of the present invention can receive usage control status, information can be utilized based on the rights described by the usage details identified by the usage control status.

Besides, since the receivers according to the embodiment of the present invention can prepare usage control status which identifies first usage details describing purchased rights and the pricing details corresponding to the first usage details, the usage control status can be sent to other information processing equipment.

Furthermore, since the receivers according to the embodiment of the present invention can prepare the second usage control status which identifies second usage details about the rights that can be purchased again based on the rights identified by the usage details contained in the usage control status received from another information processing apparatuses as well as identifies the pricing details corresponding to the second usage details, information can be used based on the rights described by the second usage details.

INDUSTRIAL APPLICABILITY

The present invention can be applied to information processing systems that encrypt and distribute information such as music data, moving picture data, still image data, text data, or program data.

The invention claimed is:

1. An information processing system which includes a server and one or more information processing apparatuses and enables the information processing apparatuses to purchase rights to decrypt and use encrypted information, comprising:

first preparation means, located at the server, for preparing a first usage control status which identifies first usage details describing purchased rights and pricing details corresponding to said first usage details;

storage means for storing, located at the server, said encrypted information, said first usage control status, a usage control policy that contains a second use type that describes rights available for purchase at a subsequent time based on the first usage details of said purchased rights, price tags that contain pricing details corresponding to second usage details, and a key needed to decrypt said encrypted information; and second preparation means, located at the server, for preparing a second usage control status that identifies said second usage details and pricing details corresponding to said second usage details, based on said usage control policy and said price tags, when rights are purchased again by said one or more information processing apparatuses;

wherein said encrypted information is accessed, at a first information processing apparatus, for a first pre-selected period of time, as a function of said purchased rights and usage control policy, wherein said encrypted information is accessed, by a second information processing apparatus, using second rights, for a second pre-selected period of time, wherein the second information processing apparatus accesses said encrypted information independent of a connection to the first information processing apparatus, wherein the first usage control status and the second usage control status includes at least system registration information; and wherein the system registration information includes at least an equipment number, a settlement number, account-settling user information, subordinate user information, and use point information.

2. The information processing apparatus according to claim 1, further comprising:

first execution means for executing a process to utilize said encrypted information, based on said second usage control status prepared by said second preparation means.

3. The information processing apparatus according to claim 2, further comprising:

third preparation means for preparing accounting information that corresponds to said first usage control status and said second usage control status; and second execution means for executing an account settlement process to settle amounts posted based on said accounting information prepared by said third preparation means.

4. An information processing method for providing rights to encrypted information to one or more information processing apparatuses, comprising the steps of:

preparing a first usage control status, at a server location, which identifies first usage details describing purchased rights and pricing details corresponding to said first usage details, for use by a first information processing apparatus;

storing said encrypted information, at the server location, said first usage control status, a usage control policy that contains a second use type that describes rights that can be purchased again based on said purchased rights, price tags that contain pricing details corresponding to second usage details, and a key needed to decrypt said encrypted information;

preparing a second usage control status, at the server location, that identifies said second usage details and said pricing details corresponding to said second usage details, based on said usage control policy and said price tags, when rights are purchased again through a second information processing apparatus; and a first access step of accessing said encrypted information, for a first pre-selected period of time, at the first information processing apparatus, as a function of said purchased rights and usage control policy; and a second access step of subsequently accessing said encrypted information, for a second pre-selected period of time, at the second information processing apparatus, independent of a connection to the first information processing apparatus, wherein the first usage control status and the second usage control status includes at least system registration information; and wherein the system registration information includes at least an equipment number, a settlement number, account-settling user information, subordinate user information, and use point information.

5. A providing medium, which provides a computer-readable program for executing a process at a server apparatus which is connected to one or more other information processing apparatus, which purchases rights to decrypt and use encrypted information, comprising the steps of:

a first preparation step, at the server apparatus, of preparing a first usage control status which identifies first usage details describing purchased rights and pricing details corresponding to said first usage details;

a storage step of storing, at the server, said encrypted information, said first usage control status, a usage control policy that, contains a second use type that describes rights that can be purchased again based on details of said purchased rights, price tags that contain pricing details corresponding to said second usage details, and a key needed to decrypt said encrypted information;

a second preparation step of preparing, at the server, a second usage control status that identifies said second usage details and said pricing details corresponding to said second usage details, based on said usage control policy and said price tags, when rights are purchased again through said one or more other information processing apparatuses;

a first access step of accessing, at a first information processing apparatus, said encrypted information, for a first pre-selected period of time, as a function of said purchased rights and usage control policy; and a second access step of subsequently accessing, at a second information processing apparatus, said encrypted information, for a second pre-selected period of time, independent of a connection to the first information processing apparatus, wherein the first usage control status and the second usage control status includes at least system registration information; and wherein the system registration information includes at least an equipment number, a settlement number, account-settling user information, subordinate user information, and use point information.

6. A first information processing apparatus, which is connected to one or more second information processing apparatuses and which purchases rights to decrypt and use encrypted information, comprising:

receiving means for receiving, at a first information processing apparatus, said encrypted information, a key needed to decrypt said encrypted information, and usage control status which identifies first usage details describing first purchase rights as well as first pricing details corresponding to said first usage details, wherein said receiving means receives second usage details describing second purchase rights and second pricing details corresponding to said second usage details;

wherein said encrypted information is accessed, for a first pre-selected period of time, as a function of said purchased rights and usage control policy, by the first information processing apparatus wherein said encrypted information is accessed, for a second pre-selected period of time, at one of more second information processing apparatus, independent of a connection to the first information processing apparatus, wherein the first usage control status and the second usage control status includes at least system registration information; and wherein the system registration information includes at least an equipment number, a settlement number account-settling user information, subordinate user information and use point information.

7. An information processing method for a first information processing apparatus which is connected to one or more second information processing apparatuses and which purchases rights to decrypt and use encrypted information, comprising the steps of:

a receiving step of receiving, at the first information processing apparatus, said encrypted information, a key needed to decrypt said encrypted information, and a usage control status which identifies first usage details describing first purchase rights as well as first pricing details corresponding to said first usage details, wherein said receiving step receives second usage details describing second purchase rights and second pricing details;

a first access step of accessing, at the first information processing apparatus, said encrypted information, for a first pre-selected period of time, as a function of said purchased rights and usage control policy; and a second access step of subsequently accessing, at one or more second information processing apparatus, said encrypted information, for a second pre-selected period of times wherein the usage control status includes at least system registration information; and wherein the system registration information includes at least an equipment number, a settlement number, account-settling user information, subordinate user information, and use point information.

8. A providing medium, which provides a computer-readable program for executing a process to a first information processing apparatus which is connected to one or more second information processing apparatuses and which purchases rights to decrypt and use encrypted information, comprising the steps of:

a receiving step of receiving, at the first information processing apparatus, said encrypted information, a key needed to decrypt said encrypted information, and usage control status which identifies first usage details describing first purchased rights as well as first pricing details corresponding to said first usage details, wherein said receiving step receives second usage details describing second purchase rights and second pricing details;

a first access step of accessing said encrypted information, at the first information processing apparatus, for a first pre-selected period of time, as a function of said purchased rights and usage control policy; and a second access step of subsequently accessing said encrypted information, at one or more second information processing apparatus, for a second pre-selected period of time, independent of a connection to the first information processing apparatus, wherein the usage control status includes at least system registration information; and wherein the system registration information includes at least an equipment number, a settlement number, account-settling user information, subordinate user information, and use point information.

9. An information processing system that enables the purchase of rights to decrypt and use encrypted information, comprising:

storage means for storing said encrypted information, at a server location, a usage control policy that contains usage details that describe purchasable rights, price tags that contain pricing details corresponding to said usage details, and a key needed to decrypt said encrypted information; and preparation means for preparing, at the server location, a usage control status which identifies said usage details and the pricing details corresponding to said usage details, based on said usage control policy and said price tags stored on said storage means;

wherein said encrypted information is accessed, at a first information processing apparatus, for a first pre-selected period of time, as a function of said purchased rights and usage control policy, and wherein said encrypted information is accessed, at a second information processing apparatus, for a second pre-selected period of time, independent of a connection to the first information processing apparatus, wherein the usage control status includes at least system registration information; and wherein the system registration information includes at least an equipment number, a settlement number, account-settling user information, subordinate user information, and use point information.

10. An information processing method for purchasing rights to decrypt and use encrypted information, comprising the steps of:
- a storage step of storing at a server location, said encrypted information, a usage control policy that contains usage details that describe purchasable rights, price tags that contain pricing details corresponding to said usage details, and a key needed to decrypt said encrypted information;
- a preparation step of preparing, at the server location, a usage control status which identifies said usage details and the pricing details corresponding to said usage details, based or said usage control policy and said price tags stored during said storage step;
- a first access step of accessing said encrypted information, at a first information processing apparatus, for a first pre-selected period of time, as a function of said purchased rights and usage control policy; and
- a second access step of subsequently accessing said encrypted information, at a second information processing apparatus, for a second pre-selected period of time, independent of a connection to the first information processing apparatus,
- wherein the usage control status includes at least system registration information; and
- wherein the system registration information includes at least an equipment number, a settlement number, account-settling user information, subordinate user information, and use point information.

11. A providing medium, which provides a computer-readable program for executing a process to purchase rights to decrypt and use encrypted information, comprising:
- a storage step of storing, at a server location, said encrypted information, a usage control policy that contains usage details that describe purchasable rights, price tags that contain pricing details corresponding to said usage details, and a key needed to decrypt said encrypted information;
- a preparation step of preparing, at the server location, a usage control status which identifies said usage details and the pricing details corresponding to said usage details, based on said usage control policy and said price tags stored during said storage step;
- a first access step of accessing said encrypted information, at a first information processing apparatus, for a first pre-selected period of time, as a function of said purchased rights and usage control policy; and
- a second access step of subsequently accessing said encrypted information, at a second information processing apparatus, for a second pre-selected period of time, independent of a connection to the first information processing apparatus,
- wherein the usage control status includes at least system registration information; and
- wherein the system registration information includes at least an equipment number, a settlement number, account-settling user information, subordinate user information, and use point information.

12. An information processing apparatus, which includes a server connected to one or more information processing apparatuses and which purchases rights to decrypt and use encrypted information, comprising:
- receiving means for receiving, at the server location, said encrypted information, a key adapted to decrypt said encrypted information, and a first usage control status which identifies a first use type describing predetermined rights and pricing details corresponding to said first use type;
- storage means for storing, at the server location, a usage control policy that contains second usage details that describe rights that can be purchased again based on said first usage control status and price tags that contain pricing details corresponding to said second usage details; and
- first preparation means for preparing, at the server location, a second usage control status which identifies said second usage details and pricing details corresponding to said second usage details, based on said usage control policy and said price tags stored by said storage means,
- wherein said encrypted information is accessed, for a first pre-selected period of time, at the first information processing apparatus, as a function of said purchased rights and usage control policy,
- wherein said encrypted information is accessed, for a second pre-selected period of time, at a second information processing apparatus, independent of a connection to the first information processing apparatus,
- wherein the first usage control status and the second usage control status includes at least system registration information; and
- wherein the system registration information includes at least an equipment number, a settlement number, account-settling user information, subordinate user information, and use point information.

13. The information processing apparatus according to claim 12, further comprising:
- second preparation means for preparing accounting information that corresponds to said second usage control status prepared by said first preparation means; and
- execution means for executing an account settlement process to settle amounts posted based on said accounting information prepared by said second preparation means.

14. An information processing method for purchasing rights to decrypt and use encrypted information, comprising:
- a receiving step of receiving, at a server location, said encrypted information, a key adapted to decrypt said encrypted information, and a usage control status which identifies a first use type describing predetermined rights and pricing details corresponding to said first use type;
- a storage step of storing a usage control policy, at the server location, that contains second usage details that describe rights that can be purchased again based on said first use type and price tags that contain pricing details corresponding to said second usage details;
- a first preparation step of preparing, at the server location, a second usage control status which identifies said second usage details and pricing details corresponding to said second usage details, based on said usage control policy and said price tags stored during said storage step;
- a first access step of accessing said encrypted information, at a first information processing apparatus, for a first pre-selected period of time, as a function of said purchased rights and usage control policy;
- a second access step of subsequently accessing said encrypted information, at a second information processing apparatus, for a second pre-selected period of time, independent of a connection to the first information processing apparatus, wherein the first usage control status and the second usage control status includes at least system registration information; and wherein the system registration information includes at least an equipment number, a settlement number, account-settling user information, subordinate user information, and use point information.

15. A providing medium, which provides a computer-readable program for executing a process to a first information processing apparatus which is connected to one or more second information processing apparatuses and which purchases rights to decrypt and use encrypted information, comprising:

a receiving step of receiving, at a server location, said encrypted information, a key adapted to decrypt said encrypted information, and a first usage control status which identifies a first use type describing predetermined rights and pricing details corresponding to said first use type;

a storage step of storing, at the server location, a usage control policy that contains second usage details that describe rights that can be purchased again based on said first use type, and price tags that contain pricing details corresponding to said second usage details;

a first preparation step of preparing, at the server location, a second usage control status which identifies said second usage details and the pricing details corresponding to said second usage details, based on said usage control policy and said price tags stored during said storage step;

a first access step of accessing said encrypted information, at a first information processing apparatus, for a first pre-selected period of time, as a function of said purchased rights and usage control policy; and a second access step of subsequently accessing said encrypted information, at a second information processing apparatus, for a second pre-selected period of time, independent of a connection to the first information processing apparatus, wherein the first usage control status and the second usage control status includes at least system registration information; and wherein the system registration information includes at least an equipment number, a settlement number, account-settling user information, subordinate user information, and use point information.

16. A computer-readable medium, storing program code for a method for modifying a price associated with content, the program code when executed causes a processor to perform a process comprising:

providing a first price associated with particular content;

utilizing, at a first occurrence, at least a portion of the particular content at one or more reception locations, for a first pre-selected period of time;

providing a second price associated with the particular content as a function of the utilizing step;

utilizing, at a second occurrence, at least a portion of the particular content at one or more reception locations, the second utilization being for a second pre-selected period of time, and independent of a connection to one or more reception locations;

generating billing information as a function of the first price and the second price; and determining a fee for the particular content based on the billing information, wherein the first usage control status and the second usage control status includes at least system registration information; and wherein the system registration information includes at least an equipment number, a settlement number, account-settling user information, subordinate user information, and use point information.

17. The method according to claim 16, wherein the second price is less than the first price.

18. The method according to claim 16, further comprising:

a step of decrypting the particular content at the one or more reception locations.

19. An apparatus for modifying a price associated with content comprising:

means for providing a first price associated with particular content;

means for utilizing, at a first occurrence, at least a portion of the particular content at one or more reception locations;

means for providing a second price associated with the particular content as a function of the means for utilizing;

means for utilizing, at a second occurrence, at least a portion of the particular content at one or more reception locations;

wherein said encrypted information is accessed for a first pre-selected period of time, at a first reception location, as a function of said purchased rights and usage control policy, wherein said encrypted information is accessed, at a second reception location, for a second pre-selected period of time, independent of a connection to one or more information processing apparatus, wherein the first usage control status and the second usage control status includes at least system registration information, wherein the system registration information includes at least an equipment number, a settlement number, account-settling user information, subordinate user information, and use point information; and means for generating billing information as a function of the first price and the second price.

20. The apparatus according to claim 19, wherein the second price is less than the first price.

21. The apparatus according to claim 19, further comprising:

means for decrypting the particular content at the one or more reception locations.

* * * * *

UNITED STATES PATENT AND TRADEMARK OFFICE
CERTIFICATE OF CORRECTION

PATENT NO. : 7,099,846 B1  
APPLICATION NO. : 09/719056  
DATED : August 29, 2006  
INVENTOR(S) : Yoshihito Ishibashi et al.

It is certified that error appears in the above-identified patent and that said Letters Patent is hereby corrected as shown below:

In claim 5, column 42, line 58, " that, contains" should read --that contains--.

In claim 6, column 43, line 37, " apparatus" should read --apparatus,--.

In claim 7, column 44, line 4, " times" should read --time,--.

In claim 10, column 45, line 15, " or" should read --on--.

Signed and Sealed this

Twenty-sixth Day of December, 2006

JON W. DUDAS  
*Director of the United States Patent and Trademark Office*